(12) United States Patent
Saito et al.

(10) Patent No.: US 9,609,291 B2
(45) Date of Patent: *Mar. 28, 2017

(54) IMAGE PROCESSING APPARATUS AND IMAGE PROCESSING METHOD, AND PROGRAM

(71) Applicant: Sony Corporation, Tokyo (JP)

(72) Inventors: Yasushi Saito, Saitama (JP); Isao Hirota, Kanagawa (JP)

(73) Assignee: Sony Corporation, Tokyo (JP)

(*) Notice: Subject to any disclaimer, the term of this patent is extended or adjusted under 35 U.S.C. 154(b) by 236 days.

This patent is subject to a terminal disclaimer.

(21) Appl. No.: 14/269,754

(22) Filed: May 5, 2014

(65) Prior Publication Data

US 2014/0240567 A1 Aug. 28, 2014

Related U.S. Application Data

(63) Continuation of application No. 13/132,044, filed as application No. PCT/JP2010/064031 on Aug. 19, 2010, now Pat. No. 8,755,640.

(30) Foreign Application Priority Data

Oct. 20, 2009 (JP) ................................. 2009-241239

(51) Int. Cl.
  *G06K 9/00* (2006.01)
  *H04N 9/04* (2006.01)
  (Continued)

(52) U.S. Cl.
  CPC .......... *H04N 9/045* (2013.01); *G06T 3/4015* (2013.01); *H04N 1/4092* (2013.01)

(58) Field of Classification Search
  CPC .... G06T 3/4015; H04N 1/4092; H04N 9/045; H04N 5/2351
  (Continued)

(56) References Cited

U.S. PATENT DOCUMENTS 8,125,543 B2 *  2/2012  Cho .................... H04N 5/2351
                                                      348/241
8,320,714 B2   11/2012  Omata
(Continued)

FOREIGN PATENT DOCUMENTS

CN   101375610 A   2/2009
CN   101543041 A   9/2009
(Continued)

OTHER PUBLICATIONS

International Search Report from the Japanese Patent Office for International Application No. PCT/JP2010/064031, mailing date Nov. 22, 2010.
(Continued)

*Primary Examiner* — Mekonen Bekele
(74) *Attorney, Agent, or Firm* — Sheridan Ross P.C.

(57) ABSTRACT

To provide an apparatus that generates an RGB pattern data from an image pickup signal by an image pickup element having an RGBW pattern and a method. An edge detection unit analyzes an output signal of the image pickup signal of the RGBW pattern to obtain edge information corresponding to the respective pixels, and a texture detection unit generates texture information. Furthermore, a parameter calculation unit executes an interpolation processing in which an applied pixel position is changed in accordance with an edge direction of a transform target pixel to generate parameters equivalent to an interpolation pixel value. In a blend processing unit, the parameters generated by the parameter calculation unit, the edge information, and the texture information are input, in accordance with the edge information and the texture information corresponding to the transform pixel, a blend ratio of the parameters calculated by the parameter calculation unit is changed, the blend processing is executed, and a transform pixel value is decided.

15 Claims, 35 Drawing Sheets

(51) Int. Cl.
*G06T 3/40* (2006.01)
*H04N 1/409* (2006.01)

(58) Field of Classification Search
USPC ..... 382/300, 167, 162, 165; 348/241, 222.1, 348/223.1, 273, 242
See application file for complete search history.

(56) References Cited

U.S. PATENT DOCUMENTS

| | | | |
|---|---|---|---|
| 8,755,640 B2 * | 6/2014 | Saito | G06T 3/4015 382/300 |
| 2003/0117507 A1 * | 6/2003 | Kehtarnavaz | H04N 9/045 348/242 |
| 2004/0105015 A1 * | 6/2004 | Tsukioka | H04N 9/045 348/222.1 |
| 2005/0058361 A1 | 3/2005 | Tajima | |
| 2005/0094007 A1 | 5/2005 | Nomura et al. | |
| 2006/0115184 A1 | 6/2006 | Michel | |
| 2006/0170798 A1 | 8/2006 | Lee et al. | |
| 2007/0024879 A1 | 2/2007 | Hamilton, Jr. et al. | |
| 2007/0024934 A1 | 2/2007 | Andams et al. | |
| 2008/0012969 A1 | 1/2008 | Kasai | |
| 2008/0030603 A1 * | 2/2008 | Masuno | H04N 9/045 348/273 |
| 2008/0089580 A1 * | 4/2008 | Marcu | H04N 1/603 382/162 |
| 2008/0124000 A1 * | 5/2008 | Sato | H04N 9/045 382/300 |
| 2008/0218597 A1 * | 9/2008 | Cho | H04N 5/2351 348/222.1 |
| 2008/0284880 A1 | 11/2008 | Numata | |
| 2008/0303919 A1 * | 12/2008 | Egawa | G06T 1/0007 348/223.1 |
| 2009/0115870 A1 | 5/2009 | Sasaki | |
| 2009/0167893 A1 | 7/2009 | Susanu et al. | |
| 2010/0150440 A1 | 6/2010 | Kwak et al. | |
| 2010/0165157 A1 | 7/2010 | Hyun et al. | |
| 2011/0050918 A1 | 3/2011 | Tachi | |
| 2012/0257821 A1 | 10/2012 | Saito et al. | |
| 2013/0051665 A1 * | 2/2013 | Shinozaki | G06T 5/00 382/167 |
| 2014/0198985 A1 * | 7/2014 | Chen | G06T 5/20 382/167 |

FOREIGN PATENT DOCUMENTS

| | | |
|---|---|---|
| JP | 2004-048465 | 2/2004 |
| JP | 2007-288395 | 11/2007 |
| JP | 2007-306447 | 11/2007 |
| JP | 2008-219598 | 9/2008 |
| JP | 2009-17544 | 1/2009 |
| JP | 2009-017544 | 1/2009 |
| JP | 2011-055038 | 3/2011 |

OTHER PUBLICATIONS

Supplementary European Search Report in Application No. 10824722.2, dated Oct. 12, 2012, 7 pages.

Notification of First Office Action, issued Jun. 19, 2013, seven pages, by Chinese Patent Office in Chinese Patent Application No. 201080003486.3

Second Office Action from the Chinese State Intellectual Property Office for Chinese Application No. 2010/0003488.3, dated Nov. 21, 2013. English translation attached.

Official Action (with English translation) for Korean Patent Application No. 10-2011-7012850 mailed Nov. 20, 2015, 13 pages.

* cited by examiner

FIG. 1

FIG. 7
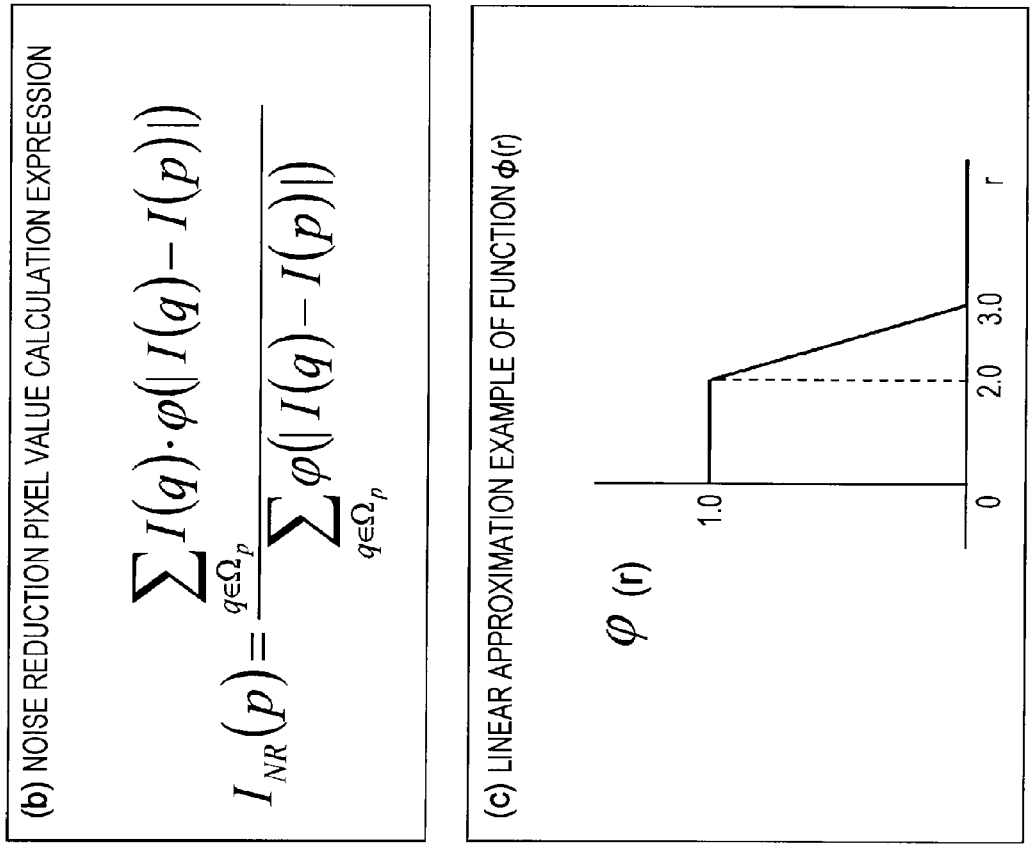
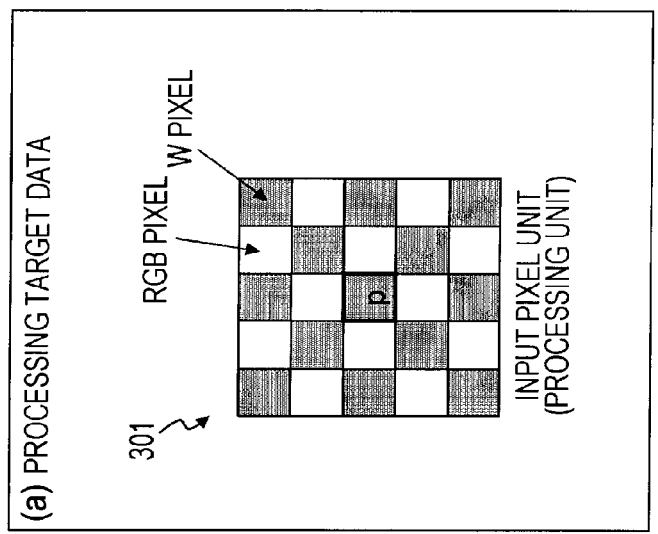

FIG. 24
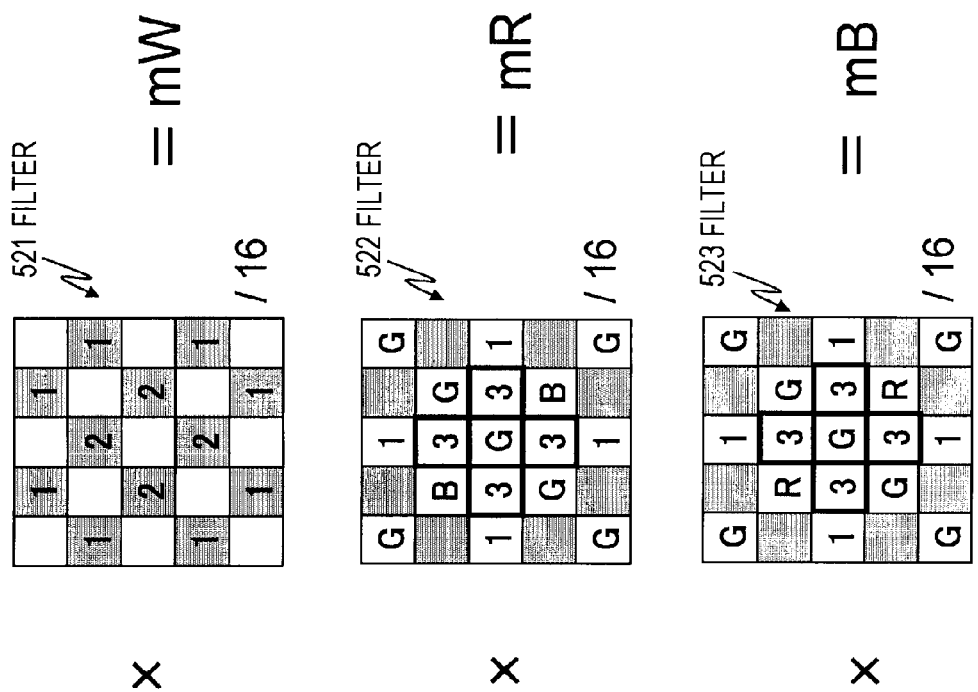
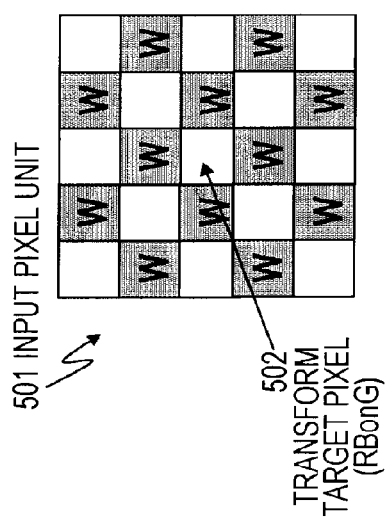

FIG. 31
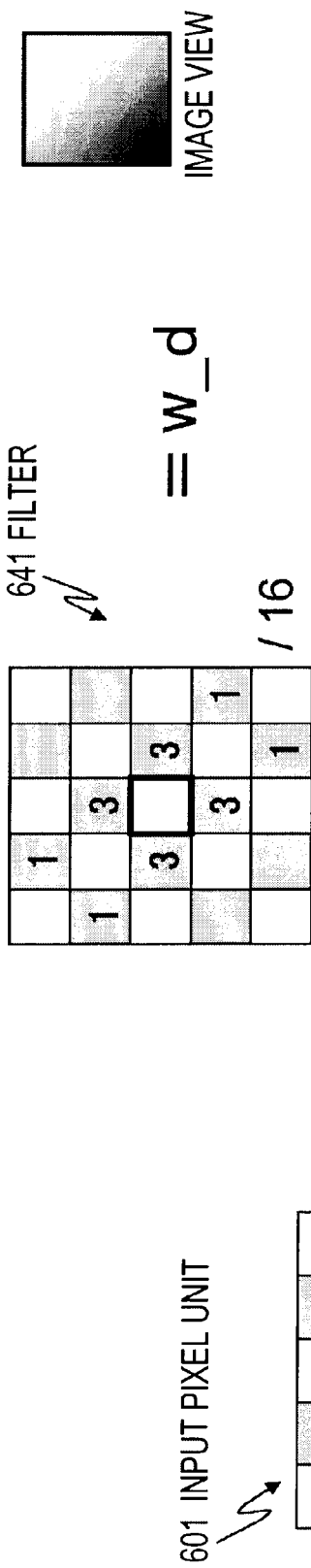
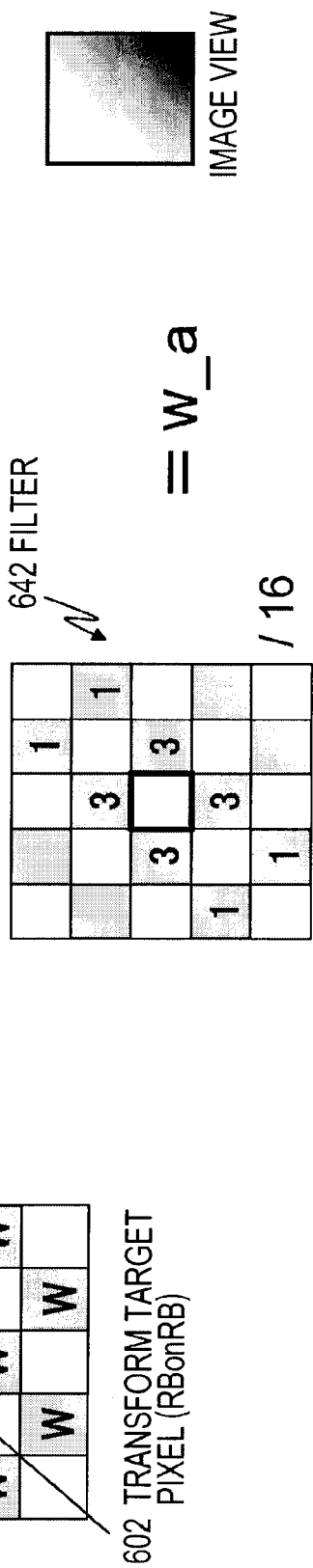

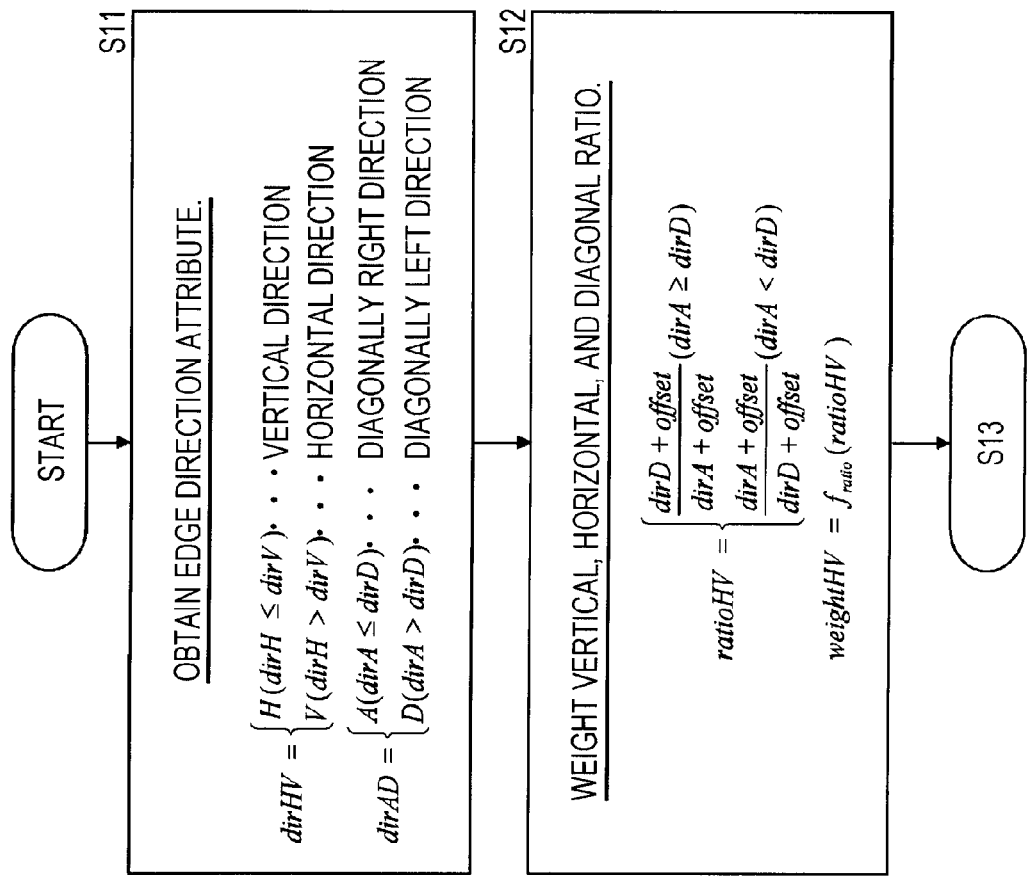

FIG. 33

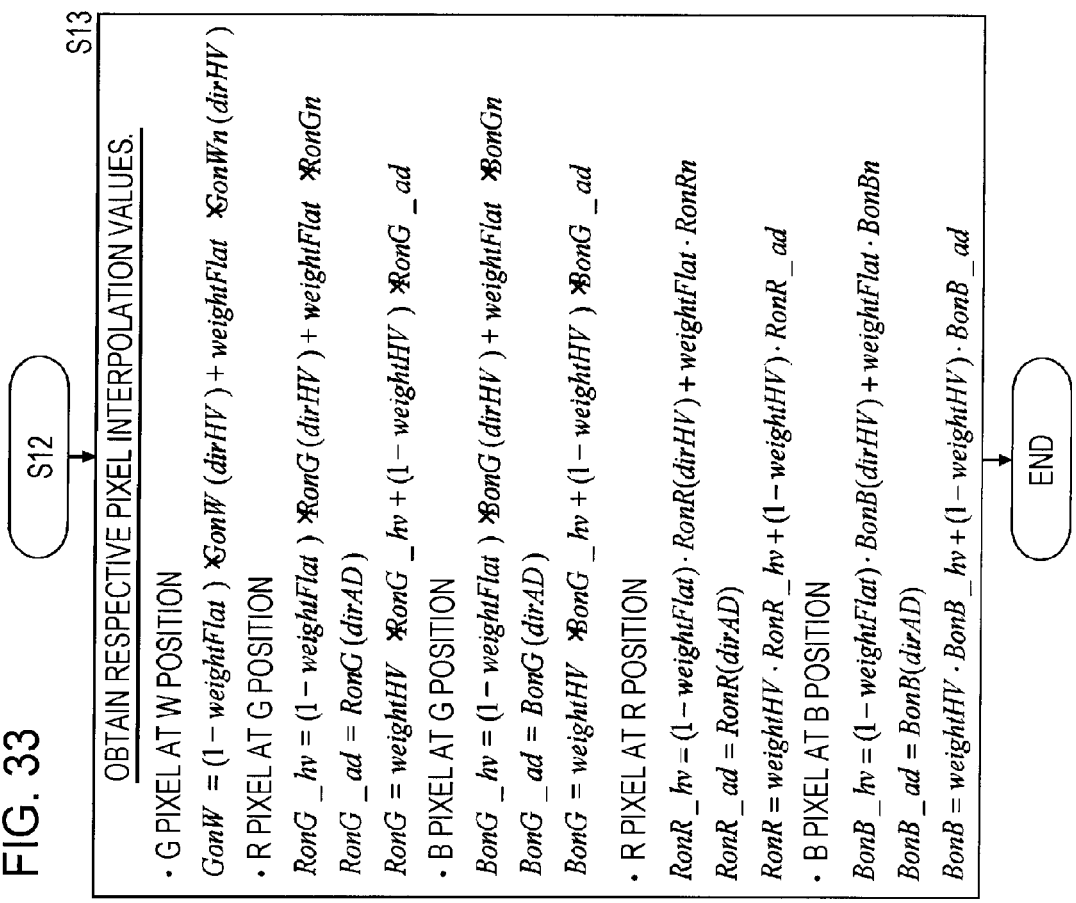

S12 → OBTAIN RESPECTIVE PIXEL INTERPOLATION VALUES.

· G PIXEL AT W POSITION
$GonW\_hv = (1-weightFlat) \cdot GonW(dirHV) + weightFlat \cdot GonWn(dirHV)$ · R PIXEL AT G POSITION
$RonG\_hv = (1-weightFlat) \cdot RonG(dirHV) + weightFlat \cdot RonGn$
$RonG\_ad = RonG(dirAD)$
$RonG = weightHV \cdot RonG\_hv + (1-weightHV) \cdot RonG\_ad$ · B PIXEL AT G POSITION
$BonG\_hv = (1-weightFlat) \cdot BonG(dirHV) + weightFlat \cdot BonGn$
$BonG\_ad = BonG(dirAD)$
$BonG = weightHV \cdot BonG\_hv + (1-weightHV) \cdot BonG\_ad$ · R PIXEL AT R POSITION
$RonR\_hv = (1-weightFlat) \cdot RonR(dirHV) + weightFlat \cdot RonRn$
$RonR\_ad = RonR(dirAD)$
$RonR = weightHV \cdot RonR\_hv + (1-weightHV) \cdot RonR\_ad$ · B PIXEL AT B POSITION
$BonB\_hv = (1-weightFlat) \cdot BonB(dirHV) + weightFlat \cdot BonBn$
$BonB\_ad = BonB(dirAD)$
$BonB = weightHV \cdot BonB\_hv + (1-weightHV) \cdot BonB\_ad$

→ END

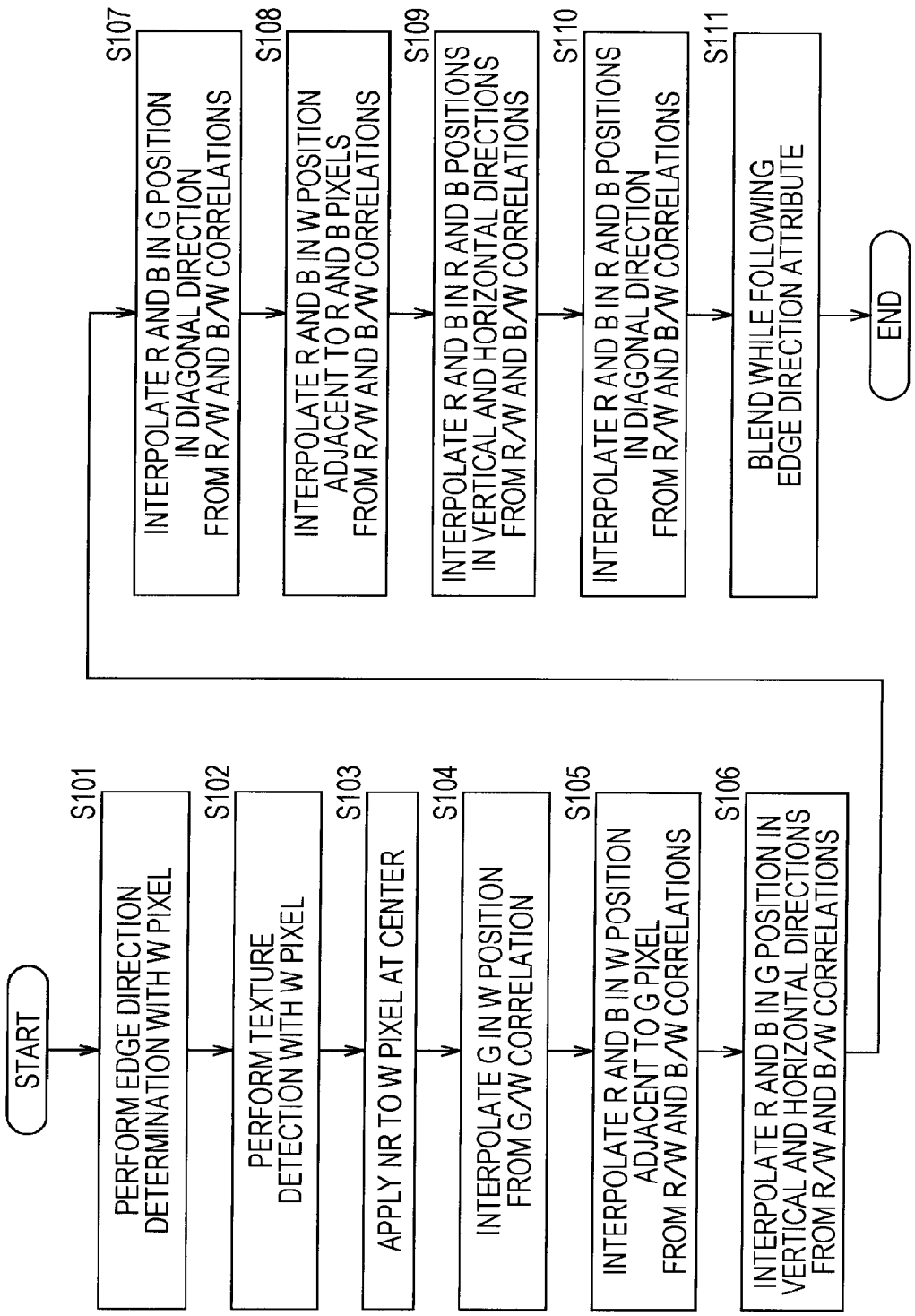

IMAGE PROCESSING APPARATUS AND IMAGE PROCESSING METHOD, AND PROGRAM

CROSS-REFERENCE TO RELATED APPLICATION(S)

This is a continuation of U.S. patent application Ser. No. 13/132,044, filed May 31, 2011, entitled "IMAGE PROCESSING APPARATUS AND IMAGE PROCESSING METHOD, AND PROGRAM," which is a national phase of international application No. PCT/JP2010/064031, filed Aug. 19, 2010, which claims priority to Japanese Patent Application No. 2009-241239, filed Oct. 20, 2009, in Japan. The contents of all of the above-mentioned prior applications are expressly incorporated herein by reference.

TECHNICAL FIELD

The present invention relates to an image processing apparatus and an image processing method, and a program. In particular, an image processing apparatus that performs a signal processing on an output of an image pickup element having an RGBW pattern and an image processing method, and a program.

BACKGROUND ART

An image pickup element (image sensor) used, for example, in an image pickup apparatus has a structure in which a color filter that transmits a particular wavelength component light (R, G, and B) is affixed onto an element front surface in unit of respective pixels. For example, a filter having an RGB pattern illustrated in FIG. 1(a) is utilized. In a color image generation processing using an output signal of the image pickup element, a processing of reconstructing necessary color components by a set of a plurality of pixels is performed. Various types exists for color patterns of the color filter, but Bayer pattern illustrated in FIG. 1(a) constructed by three types of filters that transmit only a particular wavelength light of red (R), green (G), and blue (B) is often utilized.

In recent years, a miniaturization of the pixel in the image pickup element (image sensor) has advanced, and along with this, a problem has occurred that the amount of incident light on the respective pixels is reduced, and an S/N ratio deteriorates. To solve this problem, as illustrated in FIG. 1(b), an image sensor (image pickup element) further having white (W: White) that widely transmits light in a visible light range in addition to the filters that transmit only the particular wavelength light such as RGB is proposed. FIG. 1(b) illustrates an example of a filter having an RGBW pattern. A W pixel in the RGBW pattern illustrated in FIG. 1(b) is a filter that widely transmits the light in the visible light range.

Such an image pickup element mounted with the color filter having the white (W: White) pixel is disclosed, for example, in Patent Literature 1 (US Patent No. 2007/0024879) and Patent Literature 2 (US Patent No. 2007/0024934).

By using the image pickup element (image sensor) having the color filter having the white (W: White) pixel illustrated in FIG. 1(b), a transmission light factor of the filter is increased, and a higher sensitivity can be realized.

However, as a problematic point for the RGBW-type element, the following problematic point exists.

Either the RGB pattern illustrated in FIG. 1(a) or the RGBW pattern illustrated in FIG. 1(b) is a one sheet of the element where filters of any of R, G, B, and W are arrayed in a mosaic manner, that is, a single image sensor. Therefore, when a color image is generated, a demosaic processing serving as a color coding for generating RGB pixel values corresponding to the respective pixels is necessary.

In the RGBW pattern illustrated in FIG. 1(b), sampling rates for R, G, and B components are decreased as compared with the RGB pattern illustrated in FIG. 1(a). As a result, at the time of a color image generation processing, in a case where obtained data of the element with the RGBW pattern illustrated in FIG. 1(b) is used, as compared with the RGB pattern illustrated in FIG. 1(a), a problem occurs that a false color tends to be generated. Also, as a wavelength component of white (W) includes all the wavelength components of R, G, and B, when an optical lens with a large chromatic aberration is used, light collecting rates for the RGB wavelength components drop as compared with one with a single color component, and a problem also occurs that a decrease in resolution is invited. This problematic point becomes further conspicuous as the miniaturization of the pixel advances.

As a prevention technique for the resolution degrease due to the chromatic aberration of the optical lens, it is effective to suppress the generation of the chromatic aberration by combining lenses different in refractive index, but in this case, a new problem occurs that costs are increased as the number of optical lenses is increased. Furthermore, with such a configuration, a problem also occurs that the false color problem due to the decrease in sampling rates for the above-mentioned RGB components becomes more conspicuous.

Also, as the respective pixels of the single image sensor has only information on a signal color component, a demosaic processing of obtaining RGB pixel values corresponding to all the pixels is performed to obtain a color image from discretely obtained R, G, B, and W signals. At the time of this demosaic processing, an interpolation processing is performed while it is assumed that the color ratio is kept substantially constant and a strong color correlation exists in a local area. To be specific, when a pixel value of a particular color of a certain pixel is calculated, an interpolation method using surrounding pixel values is widely employed. With regard to this method, for example, a description is made in Patent Literature 3 (Japanese Unexamined Patent Application Publication No. 2009-17544). However, in the vicinity of an edge, the above-mentioned assumption, that is, the color ratio is kept substantially constant and the strong color correlation exists in the local area, is not established. As a result, a problem occurs that a false color tends to be generated in the vicinity of the edge.

CITATION LIST

Patent Literature

PTL 1: US Patent No. 2007/0024879
PTL 2: US Patent No. 2007/0024934
PTL 3: Japanese Unexamined Patent Application Publication No. 2009-17544

SUMMARY OF INVENTION

Technical Problem

An object of the present invention is to provide an image processing apparatus and an image processing method, and a program with which generation of a high quality color image with little false color is realized in a color image generation processing applying obtained data of an image pickup element (image sensor) having, for example, an RGBW-type color film including white (W: White).

Solution to Problem

A first aspect of the present invention resides in an image processing apparatus including a data transform processing unit that performs a pixel transform by analyzing two-dimensional pixel array signals where pixels functioning as a main component of a luminance signal are arranged in a checkered manner and pixels of a plurality of colors functioning as color information components are arranged in a rest of a part.

Furthermore, in an embodiment of the image processing apparatus according to the present invention, a color functioning as the main component of the luminance signal is white or green.

Furthermore, in an embodiment of the image processing apparatus according to the present invention, the data transform processing unit includes: an edge detection unit that generates edge information by analyzing the two-dimensional pixel array signals; a texture detection unit that generates texture information by analyzing the two-dimensional pixel array signals; a parameter calculation unit that calculates parameters applied to a pixel transform processing by analyzing the two-dimensional pixel array signals; and a blend processing unit that inputs the parameters calculated by the parameter calculation unit, the edge information, and the texture information, changes a blend ratio of the parameters calculated by the parameter calculation unit in accordance with the edge information and the texture information corresponding to a transform pixel and executes a blend processing to decide a transform pixel value.

Furthermore, in an embodiment of the image processing apparatus according to the present invention, there are provided:

an edge detection unit that generates edge information including an edge direction and intensity information corresponding to respective pixels by analyzing RGBW pattern signals composed of RGB pixels and white (W) pixels;

a texture detection unit that generates texture information indicating a texture ratio corresponding to respective pixels by analyzing the RGBW pattern signals;

a parameter calculation unit that calculates parameters for transforming an RGBW pattern into an RGB pattern and generates parameters equivalent to interpolation pixel values calculated through an interpolation processing in which an applied pixel position is changed in accordance with the edge direction corresponding to the transform pixel; and a blend processing unit that inputs the parameters calculated by the parameter calculation unit, the edge information, and the texture information, changes a blend ratio of the parameters calculated by the parameter calculation unit in accordance with the edge information and the texture information corresponding to the transform pixel, and executes the blend processing to decide the transform pixel value.

Furthermore, in an embodiment of the image processing apparatus according to the present invention, the parameter calculation unit has a configuration of generating the parameters through the interpolation processing in which the pixel position applied to the interpolation processing is set to a pixel position along the edge direction.

Furthermore, in an embodiment of the image processing apparatus according to the present invention, the parameter calculation unit has a configuration of generating the parameters through the interpolation processing utilizing a correlation in a local area between W pixels and the other RGB pixels constituting the RGBW pattern.

Furthermore, in an embodiment of the image processing apparatus according to the present invention, the image processing apparatus further includes a temporary pixel setting unit that sets a pixel value of one of the RGB pixels with respect to a W pixel position through the interpolation processing utilizing the correlation in the local area between W pixels constituting the RGBW pattern and the other RGB pixels, and the parameter calculation unit has a configuration of generating the parameters through the interpolation processing applying the temporary pixel setting data.

Furthermore, in an embodiment of the image processing apparatus according to the present invention, the parameter calculation unit generates a plurality of parameters equivalent to the interpolation pixel values calculated through the interpolation processing in which an applied pixel position is set at a pixel position along the edge direction in accordance with edge directions being four types of vertical, horizontal, diagonally up left, and diagonally up right edge directions, and the blend processing unit executes an intensity comparison among the four types of vertical, horizontal, diagonally up left, and diagonally up right edge directions and execute the blend processing in which the blend ratio of the plurality of parameters is changed in accordance with a comparison result.

Furthermore, in an embodiment of the image processing apparatus according to the present invention, the blend processing unit calculates an edge direction ratio (ratioFlat) of a vertical horizontal direction edge and a diagonal direction edge corresponding to the transform pixel and further calculates a vertical horizontal direction edge direction weight (weightHV) indicating that the vertical horizontal direction edge is more intense than the diagonal direction edge as the value is larger and the diagonal direction edge is more intense than the vertical horizontal direction edge as the value is smaller on the basis of the edge direction ratio (ratioFlat) and executes the blend processing by increasing the blend ratio of the parameters calculated while the edge direction is set as the vertical or horizontal direction in a case where the vertical horizontal direction edge corresponding to the transform pixel is more intense than the diagonal direction edge and by increasing the blend ratio of the parameters calculated while the edge direction is set as the diagonal direction in a case where the vertical horizontal direction edge corresponding to the transform pixel is weaker than the diagonal direction edge.

Furthermore, in an embodiment of the image processing apparatus according to the present invention, the texture detection unit calculates a flatness weight (weightFlat) corresponding to the respective pixels which indicates a high value with regard to a pixel area with a small texture and a high flatness and indicates a low value with regard to a pixel area with a large texture and a low flatness as the texture information, the parameter calculation unit calculates a contrast emphasis processing applicable parameter in which a contrast emphasis processing is executed on the interpolation pixel value and a contrast emphasis processing non-applicable parameter in which the contrast emphasis processing is not executed on the interpolation pixel value, and the blend processing unit executes the blend processing by setting the blend ratio of the contrast emphasis processing non-applicable parameter to be large with regard to the pixel with the large flatness weight and setting the blend ratio of the contrast emphasis processing applicable parameter to be large with regard to the pixel with the small flatness weight.

Furthermore, in an embodiment of the image processing apparatus according to the present invention, the edge detection unit has a configuration of generating the edge information corresponding to the respective pixels through an analysis processing utilizing only the white (W) pixel of the RGBW pattern signals and generates the edge information including the edge direction and the intensity information corresponding to the respective pixels by calculating a signal value gradient of a W pixel in a vicinity of a processing target pixel.

Furthermore, in an embodiment of the image processing apparatus according to the present invention, the texture detection unit generates the texture information indicating a texture ratio corresponding to the respective pixels through the analysis processing utilizing only the white (W) pixel of the RGBW pattern signals.

Furthermore, a second aspect of the present invention resides in an image processing method of executing an image signal processing in an image processing apparatus, the image processing method including:

an edge detection step of generating edge information including an edge direction and intensity information corresponding to respective pixels by analyzing RGBW pattern signals composed of RGB pixels and white (W) pixels by an edge detection unit;

a texture detection step of generating texture information indicating a texture ratio corresponding to respective pixels by analyzing the RGBW pattern signals by a texture detection unit;

a parameter calculation step of generating parameters equivalent to interpolation pixel values calculated through an interpolation processing in which an applied pixel position is changed in accordance with the edge direction corresponding to the transform pixel by a parameter calculation unit that is a parameter calculation unit that calculates parameters for transforming an RGBW pattern into an RGB pattern; and a blend processing step of inputting the parameter calculated by the parameter calculation unit, the edge information, and the texture information, changing a blend ratio of the parameters calculated by the parameter calculation unit in accordance with the edge information and the texture information corresponding to the transform pixel, and executing the blend processing to decide the transform pixel value by a blend processing unit.

Furthermore, a third aspect of the present invention resides in a program for causing an image processing apparatus to execute an image signal processing, the program comprising:

an edge detection step of causing an edge detection unit to generate edge information including an edge direction and intensity information corresponding to respective pixels by analyzing RGBW pattern signals composed of RGB pixels and white (W) pixels;

a texture detection step of causing a texture detection unit to generate texture information indicating a texture ratio corresponding to respective pixels by analyzing the RGBW pattern signals;

a parameter calculation step of causing a parameter calculation unit to calculates parameters for transforming an RGBW pattern into an RGB pattern and generate parameters equivalent to interpolation pixel values calculated through an interpolation processing in which an applied pixel position is changed in accordance with the edge direction corresponding to the transform pixel; and a blend processing step of causing a blend processing unit to input the parameter calculated by the parameter calculation unit, the edge information, and the texture information, change a blend ratio of the parameters calculated by the parameter calculation unit in accordance with the edge information and the texture information corresponding to the transform pixel, and execute the blend processing to decide the transform pixel value.

It should be noted that the program of the present invention is, for example, a program that can be provided by a storage medium or a communication medium provided in a computer-readable manner to an image processing apparatus and a computer system capable of executing various program codes. By providing such a program in the computer-readable manner, the processing in accordance with the program is realized on the image processing apparatus or the computer system.

Further objects, features, and advantages of the present invention will become apparent from a more detailed description based on embodiments of the present invention which will be described below and the attached drawings. It should be noted that a system in the present specification is a logical aggregate configuration of a plurality of apparatuses, and the apparatuses of the respective configurations are not limited to ones in a same casing.

Advantageous Effects of Invention

According to the configuration of the embodiment of the present invention, it is possible to generate the RGB pattern data for generating the high quality color image with little false color by inputting the obtained data of the image pickup element (image sensor) including white (W: White), for example, having the RGBW-type color filter. To be specific, the edge detection unit analyzes the output signal of the image pickup element of the RGBW pattern to obtain the edge information corresponding to the respective pixels, and the texture detection unit generates the texture information. Furthermore, the parameter calculation unit executes the interpolation processing in which the applied pixel position is changed in accordance with the edge direction of the transform pixel to generate the parameters equivalent to the interpolation pixel values. In the blend processing unit, the parameters generated by the parameter calculation unit, the edge information, and the texture information are input, in accordance with the edge information and the texture information corresponding to the transform pixel, the blend ratio of the parameters calculated by the parameter calculation unit is changed, the blend processing is executed, and the transform pixel value is decided. Through these processings, it is possible to generate the RGB pattern data for generating the high quality color image with little false color.

BRIEF DESCRIPTION OF DRAWINGS

FIG. 1 is an explanatory diagram for describing Bayer pattern as a color pattern used in a general color filter and an example of an RGBW pattern applied in the present invention.

FIG. 7 is an explanatory diagram for describing a processing executed by a noise removal unit 201 illustrated in FIG. 6.

FIG. 24 is an explanatory diagram for describing a processing executed by a second pixel interpolation parameter calculation unit (RBonGofHV) 204 illustrated in FIG. 6.

FIG. 31 is an explanatory diagram for describing a processing executed by a fifth pixel interpolation parameter calculation unit (RBonRBofAD) 208 illustrated in FIG. 6.

FIG. 32 is an explanatory diagram for describing a processing executed by a blend processing unit 211 illustrated in FIG. 6.

FIG. 33 is an explanatory diagram for describing the processing executed by the blend processing unit 211 illustrated in FIG. 6.

FIG. 35 is a flow chart for describing a sequence of a processing executed by a data transform processing unit 200 illustrated in FIG. 6.

DESCRIPTION OF EMBODIMENTS

Hereinafter, with reference to the drawings, an image processing apparatus and an image processing method, and a program according to the present invention will be described. The description will be made in the following order.

1. Regarding an outline on a processing according to the present invention
2. Regarding configuration examples and processing examples of an image pickup apparatus and an image processing apparatus
3. Regarding a detail of a processing by a data transform processing unit
  3-1. Regarding a processing by a noise removal unit
  3-2. Regarding a processing by an edge detection unit
  3-3. Regarding a processing by a texture detection unit
  3-4. Regarding a processing by a pixel interpolation parameter calculation unit
  3-5. Regarding a processing by a blend processing unit
4. Remosaic processing sequence executed by a data transform processing unit of an image processing apparatus

[1. Regarding an Outline on a Processing According to the Present Invention]

First, with reference to FIG. 2, an outline on a processing executed by an image processing apparatus such as an image pickup apparatus according to the present invention the present invention will be described. The image processing apparatus according to the present invention performs a processing on obtained data of an image pickup element (image sensor) having an RGBW-type color filter that transmits all the respective RGB wavelength lights including a white (W: White) in addition to an RGB filter that selectively transmits wavelength light of the respective RGB colors. To be specific, a pixel transform is performed by analyzing two-dimensional pixel array signals where pixels functioning as a main component of a luminance signal are arranged in a checkered manner and pixels of a plurality of colors functioning as color information components are arranged in a rest of a part. It should be noted that a color functioning as the main component of the luminance signal is white or green.

The image processing apparatus according to the present invention executes a calculation processing for a parameter applied to a processing of transforming the obtained data of the image pickup element (image sensor) having, for example, the RGBW-type color filter including white (W: White) illustrated in FIG. 2(1) into an RGB pattern (for example, Bayer pattern) illustrated in FIG. 2(2). Furthermore, at the time of this transform processing, a processing of reducing the generation of a false color is executed as well.

Figure 2:
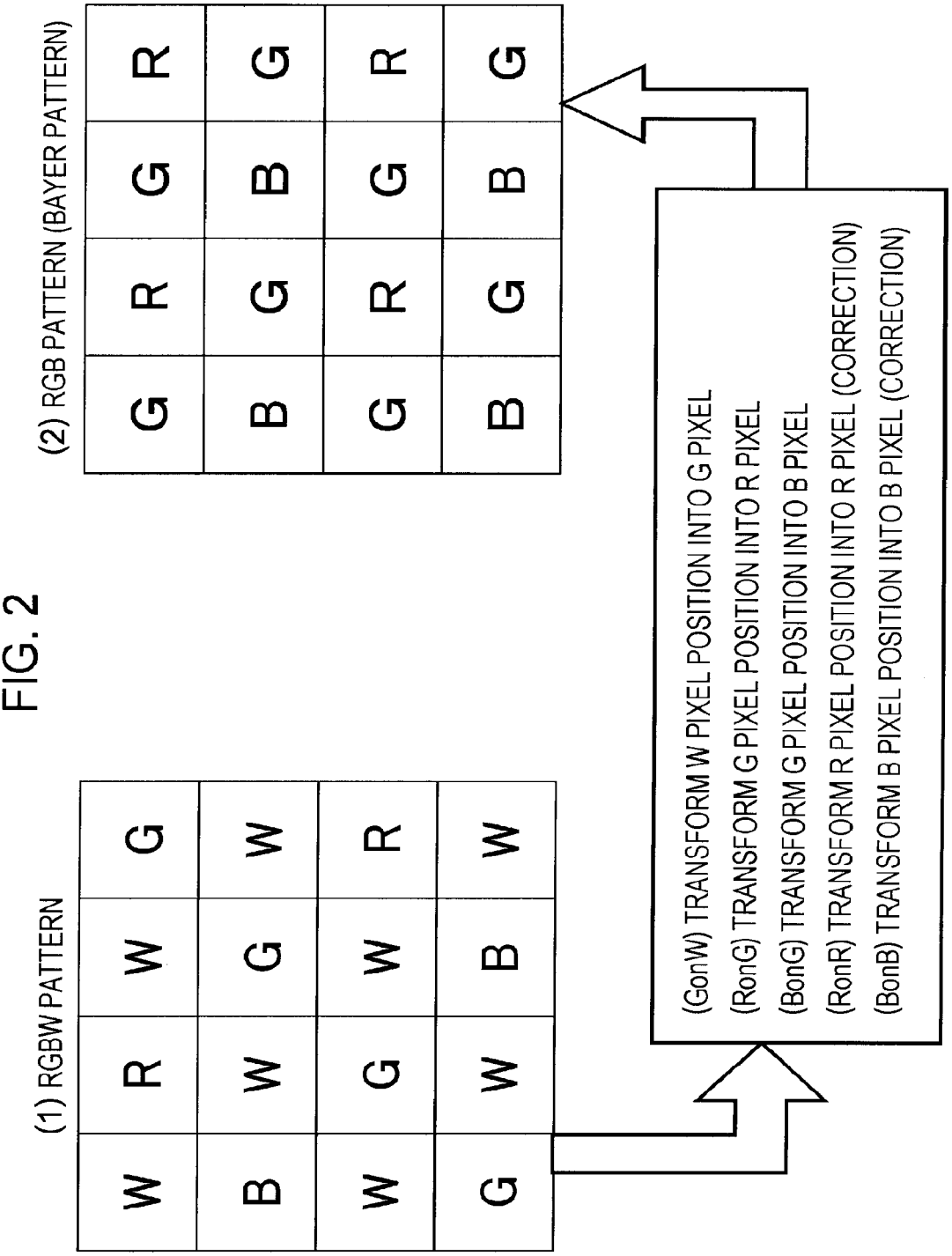
FIG. 2 is an explanatory diagram for describing a remosaic processing performed as a transform processing from an RGBW pattern to an RGB pattern that is a processing according to an embodiment of the present invention.

As illustrated in FIG. 2, a processing of transforming or correcting at least a part of the respective RGBW pixels set in the RGBW color pattern into another color (one of RGB) is performed. To be specific, in the transform processing from the RGBW pattern into the RGB Bayer pattern, the following five transform and correction processings are executed.

(a) Transform W pixel position into G pixel (estimate G pixel value)=(GonW)

(b) Transform G pixel position into R pixel (estimate R pixel value)=(RonG)

(c) Transform G pixel position into B pixel (estimate B pixel value)=(BonG)

(d) Transform R pixel position into R pixel (correct R pixel value)=(RonR)

(e) Transform B pixel position into B pixel (correct B pixel value)=(BonB)

The above-mentioned respective transform processings (a) to (e) are performed as a pixel value estimation or a correction processing of transforming the respective RGBW pixels in the RGBW pattern into the RGB pixels in the RGB pattern. By executing these processings, the RGB pattern illustrated in FIG. 2(2) is generated from the RGBW color pattern illustrated in FIG. 2(1).

Hereinafter, such a color pattern transform processing will be referred to as remosaic processing.

In the following embodiment, a configuration will be described in which the remosaic processing of transforming the RGBW-type color pattern having white (W) into the RGB-type color pattern (Bayer pattern) is executed, and also the processing of reducing the generation of the false color is executed at the time of this remosaic processing.

For the pixel transform processing in the image processing apparatus according to the present invention, the transform processing is performed while a rectangular pixel area of n×n pixels is set as an input pixel unit. That is, to decide a transform pixel value of one pixel at the center of the n×n pixels, pixel information of the rectangular pixel area of n×n pixels is utilized. To be specific, for example, the processing is performed in the unit of 5×5 pixels (5 pixels in width and 5 pixels in height) of the image or the unit of 7×7 pixels (7 pixels in width and 7 pixels in height). For example, in a case where the processing is performed while the processing unit is set as the 5×5 pixels, the image processing apparatus inputs the pixel information in the unit of 5×5 pixels and uses the pixel information of the 5×5 pixels to decide the transform pixel value of the center pixel. The center pixel of the 5×5 pixels is a pixel of any of RGBW, and these RGBW are transformed while following the above-mentioned transform patterns (a) to (e).

In the following description, the rectangular pixel of n×n pixels that is set as the unit for the pixel transform processing is referred to as "input pixel unit" and the description is given. The processing (a) is one of the above-described transform patterns (a) to (e), that is, (a) Transform W pixel position into G pixel (estimate G pixel value)=(GonW).

Figure 3:
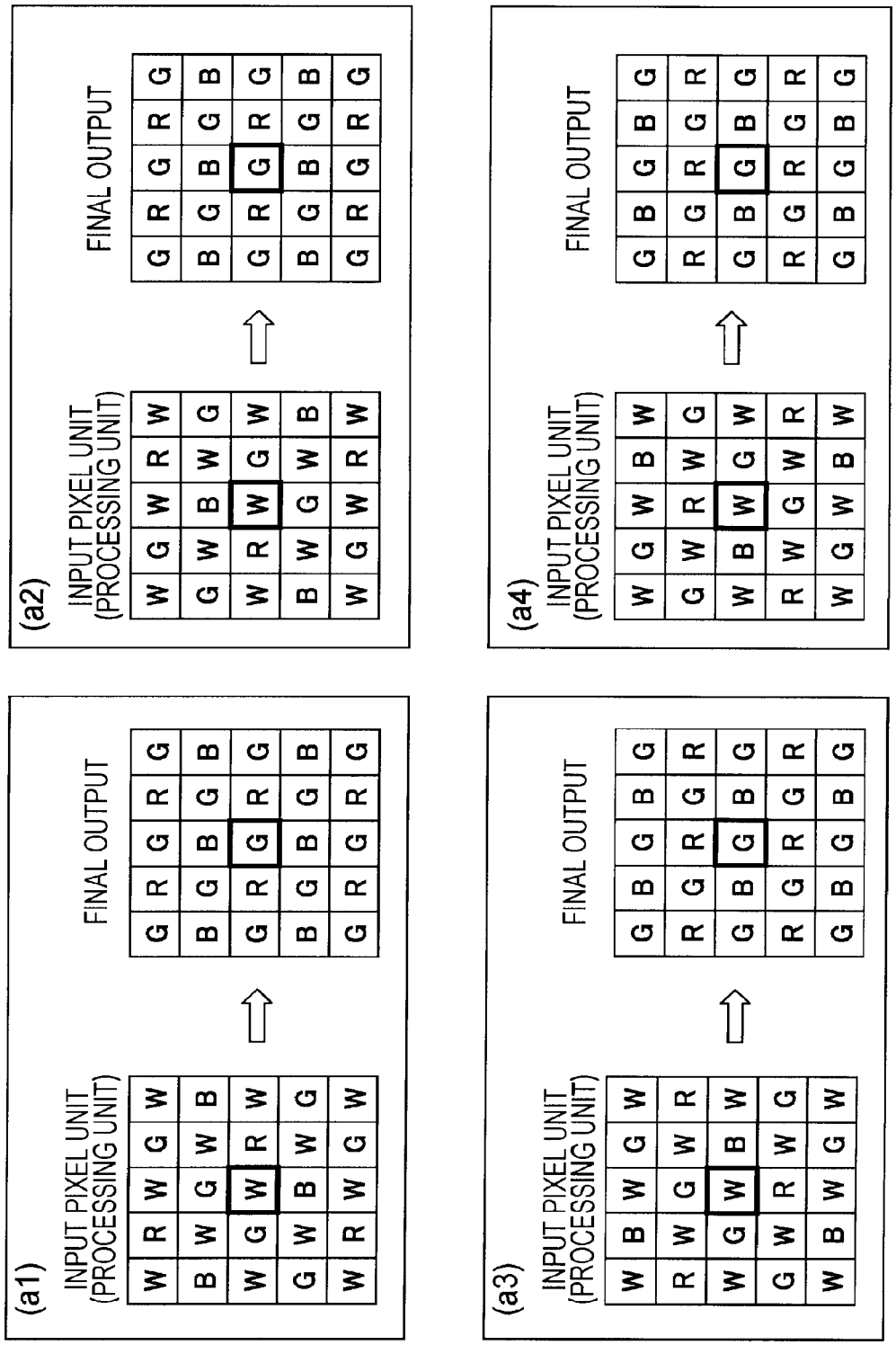
FIG. 3 is an explanatory diagram for describing individual processings of the remosaic processing performed as the transform processing from the RGBW pattern to the RGB pattern according to the present invention.

In a case where this transform processing is performed, a pixel pattern of the 5×5 pixels functioning as the input pixel unit includes four different patterns (*a*1) to (*a*4) illustrated in FIG. 3.

In FIGS. 3, (*a*1) to (*a*4) illustrate input pixel units (processing units) where the W pixel is at the center position of the 5×5 pixels. The left side is the input pixel unit, and the right side is RGBW pattern data which becomes a final processing result.

An input where the center position of the 5×5 pixels is the W pixel includes four different patterns illustrated in FIGS. 3(*a*1) to (*a*4). In a case where the 5×5 pixels in one of the patterns are input, (a) Transform W pixel position into G pixel (estimate G pixel value)=(GonW)

this processing is executed.

It should be noted that the right side of FIGS. 3(*a*1) to (*a*4) indicates the final change results, and with respect to the input pixel units indicated on the left side of FIG. 3(*a*1) to (*a*4), only the processing of transforming the center pixel W into the G pixel is executed. After that, while the processing unit is shifted by one each, the transform processing (one of the above-mentioned processings (a) to (e)) is executed, and the final change results indicated on the right side of FIG. 3(*a*1) to (*a*4) are obtained.

Also, the processings (b) to (e) of the transform patterns of the above-described (a) to (e) are, that is, (b) Transform G pixel position into R pixel (estimate R pixel value)=(RonG)

(c) Transform G pixel position into B pixel (estimate B pixel value)=(BonG)

(d) Transform R pixel position into R pixel (correct R pixel value)=(RonR)

(e) Transform B pixel position into B pixel (correct B pixel value)=(BonB).

Figure 4:
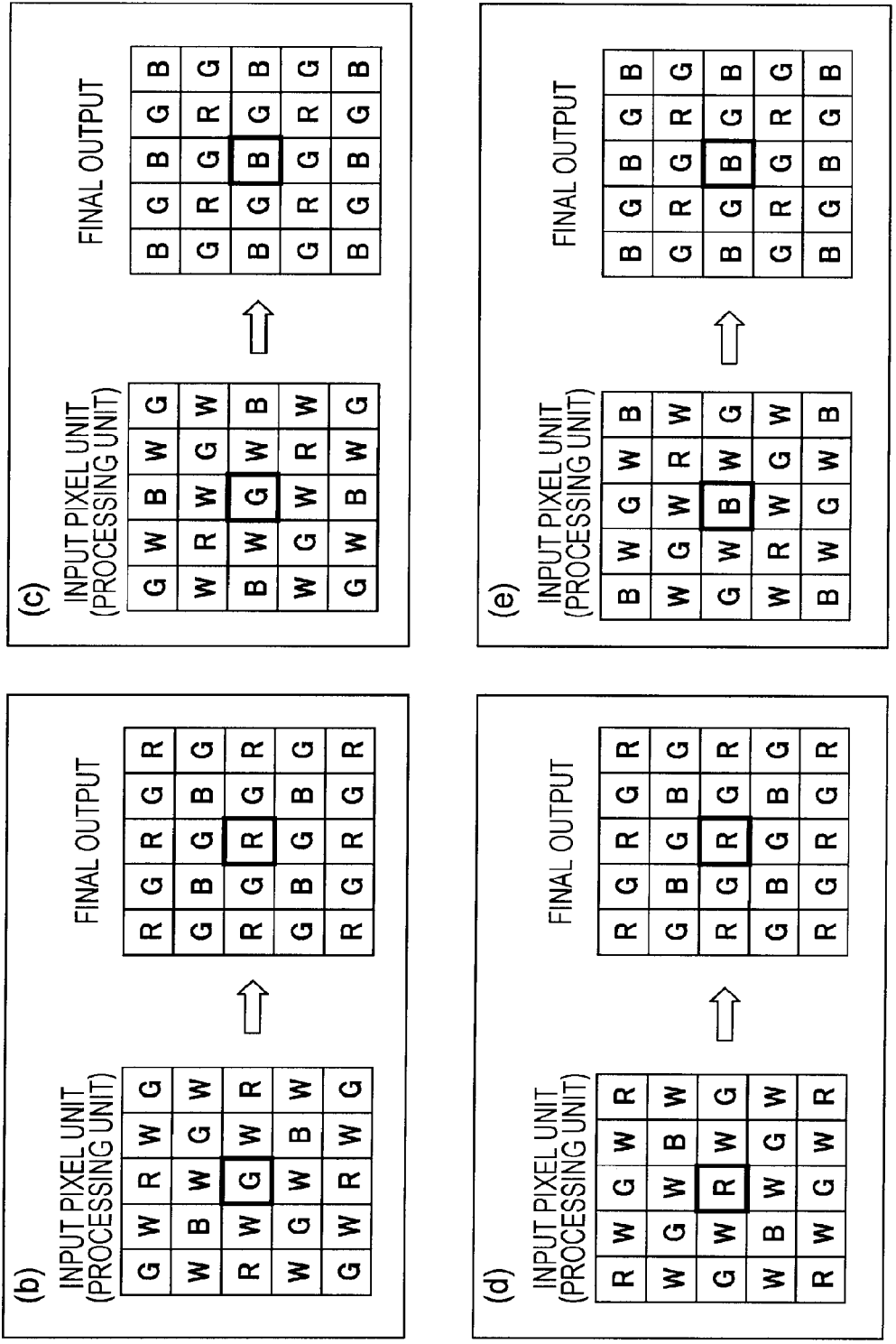
FIG. 4 is an explanatory diagram for describing the individual processings of the remosaic processing performed as the transform processing from the RGBW pattern to the RGB pattern according to the present invention.

Relations between the input pixel unit (processing unit) and the final outputs of the transform processings in a case where these transform processings are performed are as indicated by FIG. 4(*b*) to (*e*).

[2. Regarding Configuration Examples and Processing Examples of an Image Pickup Apparatus and an Image Processing Apparatus]

Figure 5:
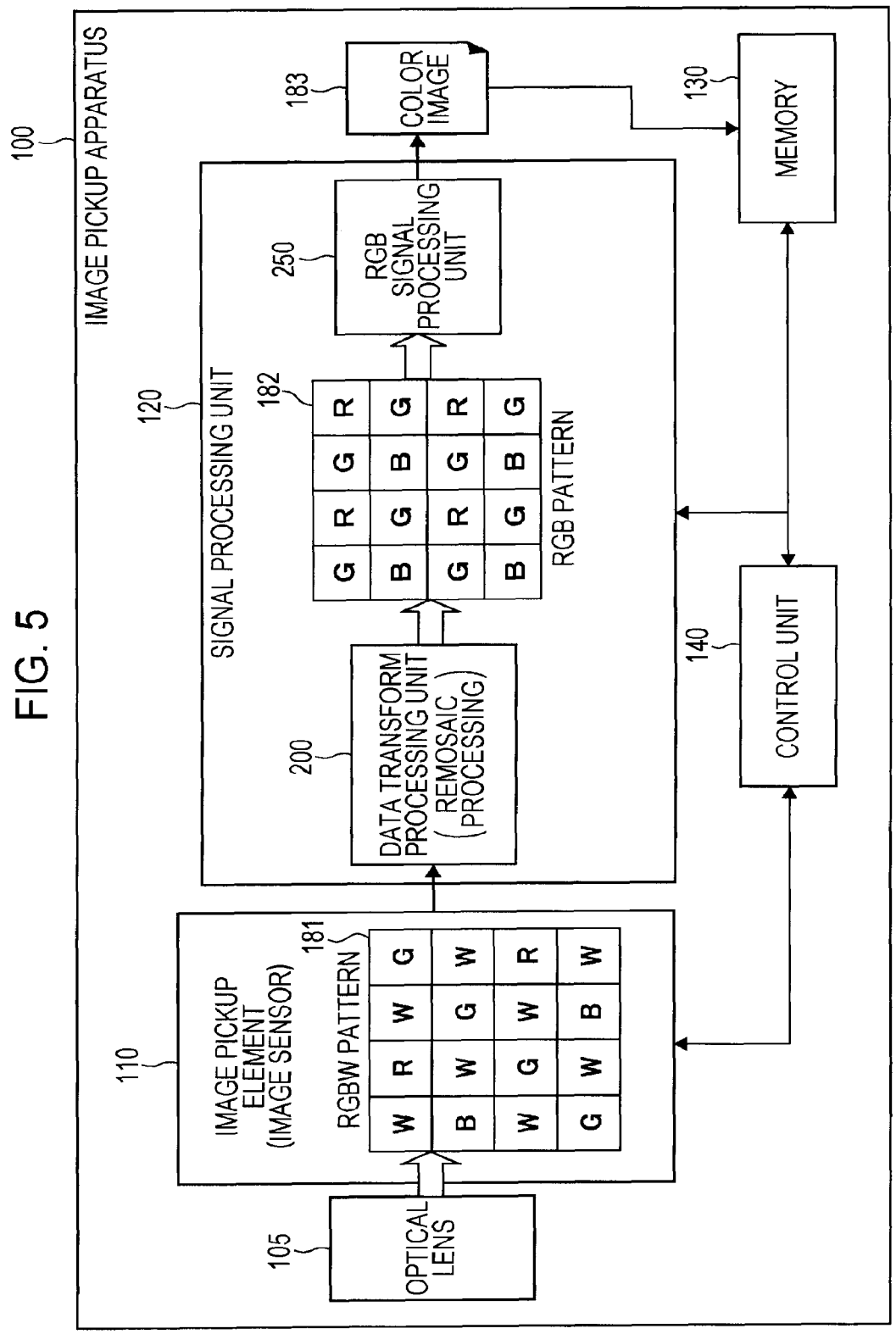
FIG. 5 is an explanatory diagram for describing a configuration example of an image pickup apparatus related to an image processing apparatus according to an embodiment of the present invention.
Figure 6:
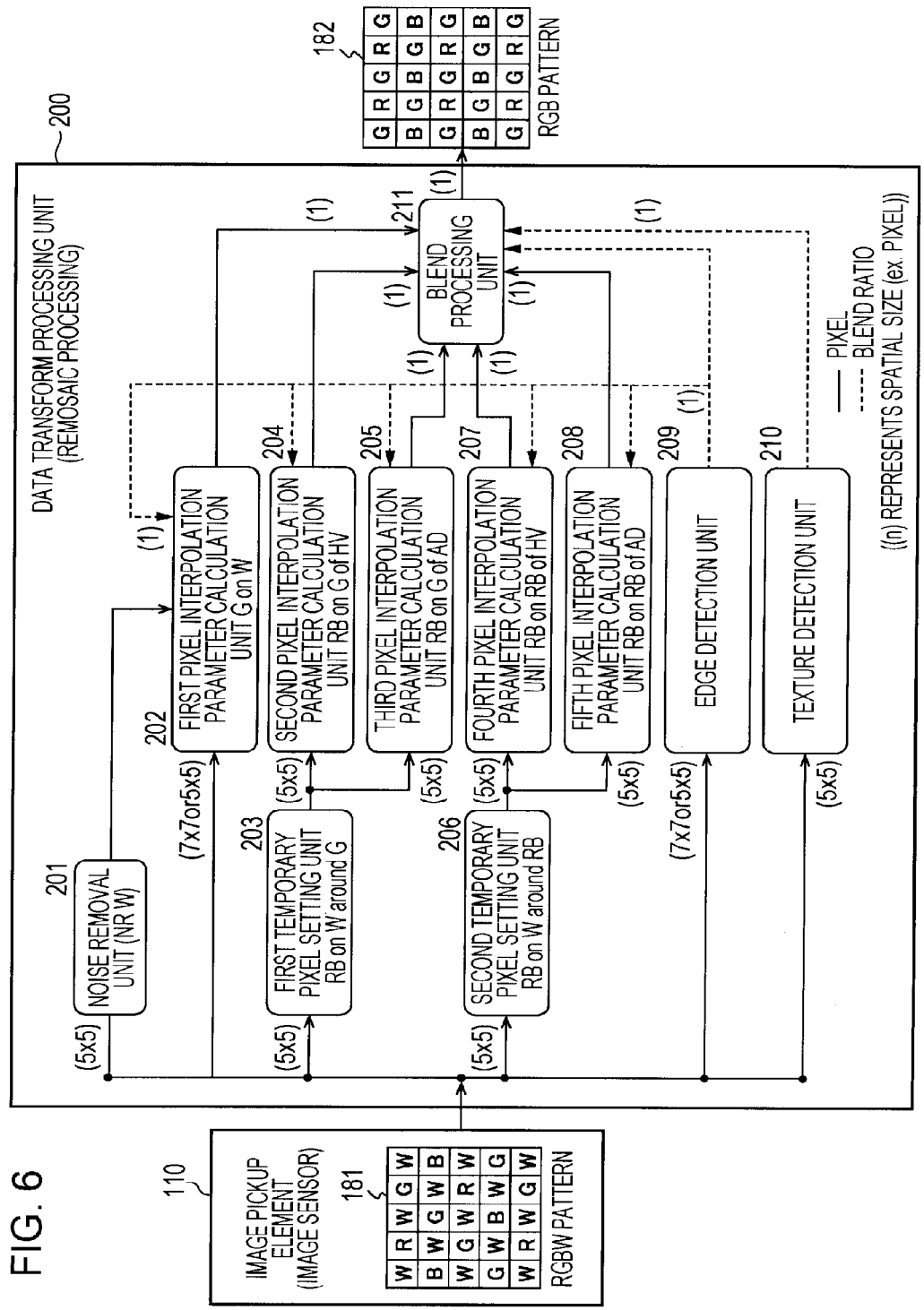
FIG. 6 is an explanatory diagram for describing a configuration and a processing of a data transform processing unit.

With reference to FIG. 5 and FIG. 6, configuration examples and processing examples of an image pickup apparatus and an image processing apparatus according to an embodiment of the present invention will be described.

FIG. 5 illustrates a configuration example of an image pickup apparatus 100 according to an embodiment of the present invention. The image pickup apparatus 100 has an optical lens 105, the image pickup element (image sensor) 110, a signal processing unit 120, a memory 130, and a control unit 140. It should be noted that the image pickup apparatus is one mode of the image processing apparatus. The image processing apparatus also includes an apparatus such as, for example, a PC. The image processing apparatus such as the PC does not have the optical lens 105 and the image pickup element 110 of the image pickup apparatus 100 illustrated in FIG. 3 but is configured by other components and has a configuration having an input unit for the obtained data of the image pickup element 100 or a storage unit. To be specific, the image pickup apparatus 100 is a still camera, a video camera, or the like, and the image processing apparatus 100 includes an information processing apparatus capable of performing an image processing such as a PC.

Figure 1:
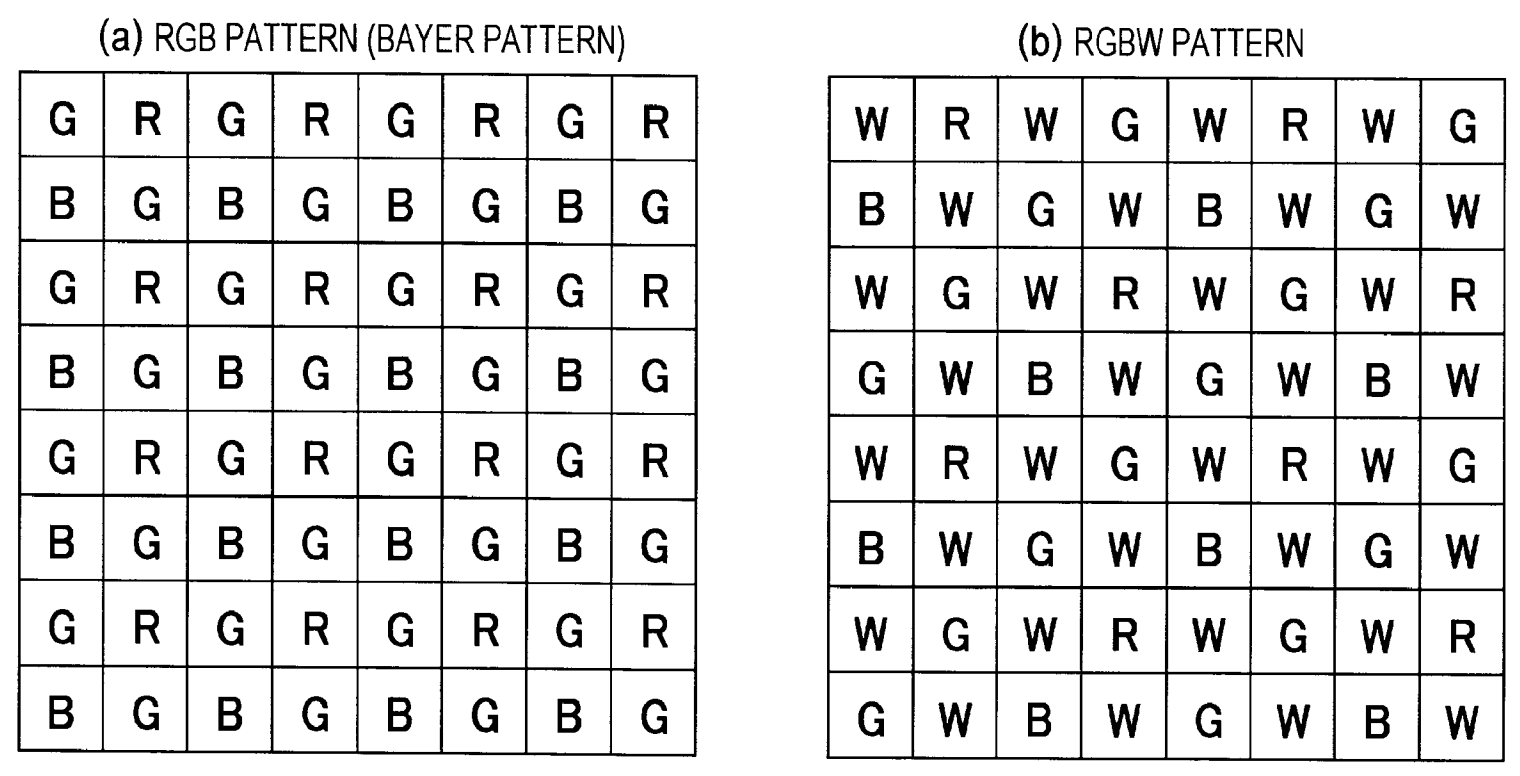

Hereinafter, the image pickup apparatus 100 will be described as a representative example of the image processing apparatus according to the present invention. The image pickup element (image sensor) 110 of the image pickup apparatus 100 illustrated in FIG. 5 has a configuration provided with a filter having an RGBW pattern 181 including white (W) which is described with reference to FIG. 1(b) or FIG. 2(1). To be specific, the pixel transform is performed by analyzing the two-dimensional pixel array signals where the pixels functioning as the main component of the luminance signal are arranged in the checkered manner and the pixels of the plurality of colors functioning as the color information components are arranged in the rest of the part. It should be noted that the color functioning as the main component of the luminance signal is white or green.

The image pickup element (image sensor) 110 is an image pickup element provided with a filter having these four types of spectral characteristics.

Red (R) that transmits a wavelength in the vicinity of red,

Green (G) that transmits a wavelength in the vicinity of green,

Blue (B) that transmits a wavelength in the vicinity of blue, and in addition to these, White (W) that transmits all the RGB.

The image pickup element 110 having this RGBW pattern 181 filter receives any light of the RGBW via the optical lens 105 in the unit of the respective pixels and generates an electric signal corresponding to a received light signal intensity through a photoelectric conversion to be output. A mosaic image composed of the four types of RGBW spectra is obtained by this image pickup element 110.

An output signal of the image pickup element (image sensor) 110 is input to a data transform processing unit 200 of the signal processing unit 120.

As previously described with reference to FIG. 2, the data transform processing unit 200 executes a transform processing from the RGBW pattern 181 to an RGB pattern 182. At the time of this transform processing, as described above, these five transform and correction processings are executed.

Transform W pixel position into G pixel (estimate G pixel value)=(GonW)

Transform G pixel position into R pixel (estimate R pixel value)=(RonG)

Transform G pixel position into B pixel (estimate B pixel value)=(BonG)

Transform R pixel position into R pixel (correct R pixel value)=(RonR)

Transform B pixel position into B pixel (correct B pixel value)=(BonB)

At the time of this transform/correction processing, the processing of suppressing the false color is executed as well.

The RGB pattern 182 generated by the data transform processing unit 200, that is, the data having the Bayer pattern is data having a color pattern obtained by an image pickup element such as a conventional camera. This color array data is input to an RGB signal processing unit 250.

The RGB signal processing unit 250 executes processings similar to a signal processing unit provided to the conventional camera or the like. To be specific, by executing a demosaic processing, a white balance adjustment processing, a γ correction processing, and the like, a color image 183 is generated. The generated color image 183 is recorded in the memory 130.

The control unit 140 executes a control on a series of these processings. For example, a program for executing the series of processings is stored in the memory 130, and the control unit 140 executes the series of processings by executing the program read out from the memory 130.

A detailed configuration of the data transform processing unit 200 will be described with reference to FIG. 6. The data transform processing unit 200 executes a transform processing from the RGBW color pattern to the RGB pattern 182. Furthermore, at the time of this processing, the processing of suppressing the false color is executed as well.

The data transform processing unit 200 has, as illustrated in FIG. 6, a noise removal unit 201, first to fifth pixel interpolation parameter calculation units 202 to 208, an edge detection unit 209, a texture detection unit 210, and a blend processing unit 211. The data transform processing unit 200 sequentially inputs pixel values from the RGBW pattern 181 that is the processing image in the processing unit of the n×n pixels and decides the transform pixel value of the pixel at the center of the n×n pixels to be output. When the transform processing for all the pixels is completed, the RGB pattern 182 is completed and provided to the RGB signal processing unit 250 illustrated in FIG. 5.

The noise removal unit 201 executes noise removal on the W pixel located at the center in the input pixel unit.

The first pixel interpolation parameter calculation unit (GonW) 202 executes a calculation processing for a parameter applied to a processing of transforming the W pixel into the G pixel.

The first temporary pixel setting unit (RBonWaroundG) 203 executes a processing of transforming the W pixel around the G pixel into a temporary pixel (R') or (B') of the R or B pixel as a preliminary processing for a processing of transforming the W pixel position adjacent to the G pixel into the R pixel or the B pixel.

The second pixel interpolation parameter calculation unit (RBonGofHV) 204 calculates a parameter corresponding to a vertical or horizontal edge as a parameter applied to a processing of transforming the G pixel into the R pixel or the B pixel.

The third pixel interpolation parameter calculation unit (RBonGofAD) 205 calculates a parameter corresponding to a diagonal edge as a parameter applied to a processing of transforming the G pixel into the R pixel or the B pixel.

The second temporary pixel setting unit (RBonWaroundRB) 206 executes a processing of transforming the W pixel around the R or B pixel into a temporary pixel (R') or (B') of the R or B pixel as a preliminary processing for a processing of transforming the W pixel position adjacent to the R pixel or the B pixel into the R pixel or the B pixel The fourth pixel interpolation parameter calculation unit (RBonRBofHV) 207 calculates a parameter corresponding to the vertical or horizontal edge as the parameter applied to a processing of transforming the R pixel into the R pixel or the B pixel into the B pixel.

The fifth pixel interpolation parameter calculation unit (RBonRBofAD) 208 calculates a parameter corresponding to the diagonal edge as the parameter applied to the processing of transforming the R pixel into the R pixel or the B pixel into the B pixel.

The edge detection unit 209 executes an edge direction detection processing using the W pixels.

The texture detection unit 210 executes a texture detection processing using the W pixels.

The blend processing unit 211 executes a processing of blending the pixels output through the above-mentioned respective processings.

[3. Regarding a Detail of a Processing by a Data Transform Processing Unit]

Next, details of processings executed by the respective processing units constituting the data transform processing unit 200 illustrated in FIG. 6 will be described.

(3-1. Processing by a Noise Removal Unit)

First, a processing of the noise removal unit 201 will be described with reference to FIG. 7. The noise removal unit 201 executes the noise removal processing on the data where the center pixel in the input pixel unit (5×5 pixels) is the W pixel. The noise removal is performed as a calculation processing for a noise reduction pixel value on the W pixel located at the center in the input pixel unit.

As a technique for the noise removal, various techniques can be applied. Herein, a noise reduction processing example using a bilateral filter will be described with reference to FIG. 7. FIG. 7 is an explanatory diagram illustrating a case where the input pixel unit is 5×5 pixels for describing an example in which the noise removal is applied to the W pixel located at the center (pixel p).

FIG. 7 illustrates these.

(a) Processing target data (b) Noise reduction pixel value calculation expression (c) Linear approximation example of function ϕ(r)

As illustrated in (a) the processing target data, the noise removal unit 201 performs the processing in a case where the center pixel (p) in the input pixel unit (5×5 pixels) having the RGBW pattern is the W pixel. A gray part in the input pixel unit (5×5 pixels) illustrated in the drawing is the W pixel, and the other white part is one of the RGB pixels. It should be noted that also in the drawings used for the following description, the gray part is set as the W pixel, and the other white part is set as one of the RGB pixels.

The noise removal unit 201 calculates a noise reduction pixel value $I_{NR}(p)$ while following a noise reduction pixel value calculation expression illustrated in FIG. 7(2) by using a pixel value I(p) of the W pixel that is the center pixel (p) of a processing target data 301 and a pixel value I(q) of the pixel included in the input pixel unit (5×5 pixels). That is, while following the expression (Expression 1) below, the noise reduction pixel value $I_{NR}(p)$ is calculated.

[Numeric Expression 1]

$$I_{NR}(p) = \frac{\sum_{q \in \Omega_p} I(q) \cdot \varphi(|I(q) - I(p)|)}{\sum_{q \in \Omega_p} \varphi(|I(q) - I(p)|)} \quad \text{(Expression 1)}$$

In the above-mentioned expression, $\Omega_p$ denotes a set of the pixels included in the input pixel unit (5×5 pixels) which is the processing target data 301, I(q) denotes a pixel value thereof, and I(p) denotes a pixel value of the center pixel p (=W pixel).

A function ϕ(r) generally uses an exponential function. However, to suppress the computation amount, as illustrated in FIG. 7(3), a linearly approximated function may be used.

The linear approximation illustrated in FIG. 7(3) is a linear approximation example in the following setting while thresholds are set as Th1=2.0 and Th2=3.0.

r=0 to Th1 (2.0)→ϕ(r)=1.0 r=Th1 (2.0) to Th2 (3.0)→ϕ(r)=1.0 to 0 (linear change)

r=larger than or equal to Th2→ϕ(r)=0

The noise removal unit 201 calculates the noise reduction pixel value $I_{NR}(p)$ of the W pixel at the center in the input pixel unit (5×5 pixels) while following the above-mentioned expression (Expression 1) by applying the bilateral filter in this manner. The calculated noise reduction W pixel value ($I_{NR}(p)$) is output to the first pixel interpolation parameter calculation unit (GonW) 202 illustrated in FIG. 6.

It should be noted that the processing applying the bilateral filter described with reference to FIG. 7 is an example of the noise removal processing, and the noise removal unit 201 is not limited to the processing applying the bilateral filter described with reference to FIG. 7, and a configuration using another noise removal system may also be employed.

(3-2. Regarding a Processing by an Edge Detection Unit)

Next, a processing by the edge detection unit 209 will be described. The edge detection unit 209 verifies the discrete white (W) signals included in the RGBW pattern that is the input signal and generates the edge information included in the image, for example, the edge information including the edge direction and the edge intensity, to be output to the blend processing unit 211 and further to the plurality of pixel interpolation parameter calculation units.

Figure 8:
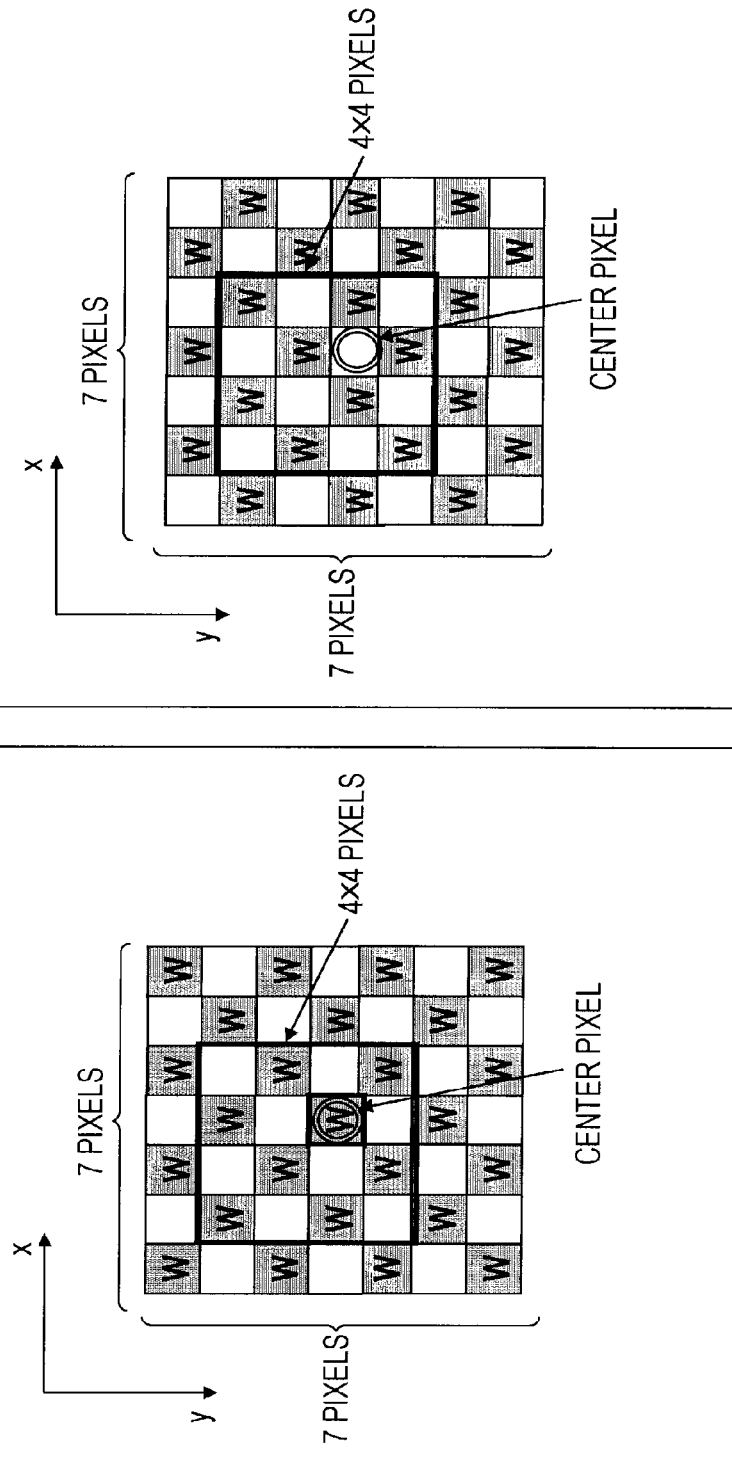
FIG. 8 is an explanatory diagram for describing an edge detection processing executed by an edge detection unit 209 illustrated in FIG. 6.

With reference to FIG. 8 and subsequent drawings, the determination method using the W pixel for the edge direction and the edge intensity which is executed by the edge detection unit 209 will be described.

The edge detection unit 209 determines the edge direction and the edge intensity by only utilizing the white (W) signal among the signals of the input RGBW pattern 181. The edge detection unit 209 executes the edge detection processing on the input data in the area unit of the 7×7 pixels. The edge detection unit 209 executes the edge detection processing sequentially while shifting the area of the 7×7 pixels. Through the processing on one 7×7 pixel area, the edge information (the edge direction and the edge intensity) corresponding to the center pixel of the 7×7 pixel area is obtained. The edge information corresponding to the respective pixels is output to the blend processing unit 211 and the first to fifth pixel interpolation parameter calculation units.

Figure 9:
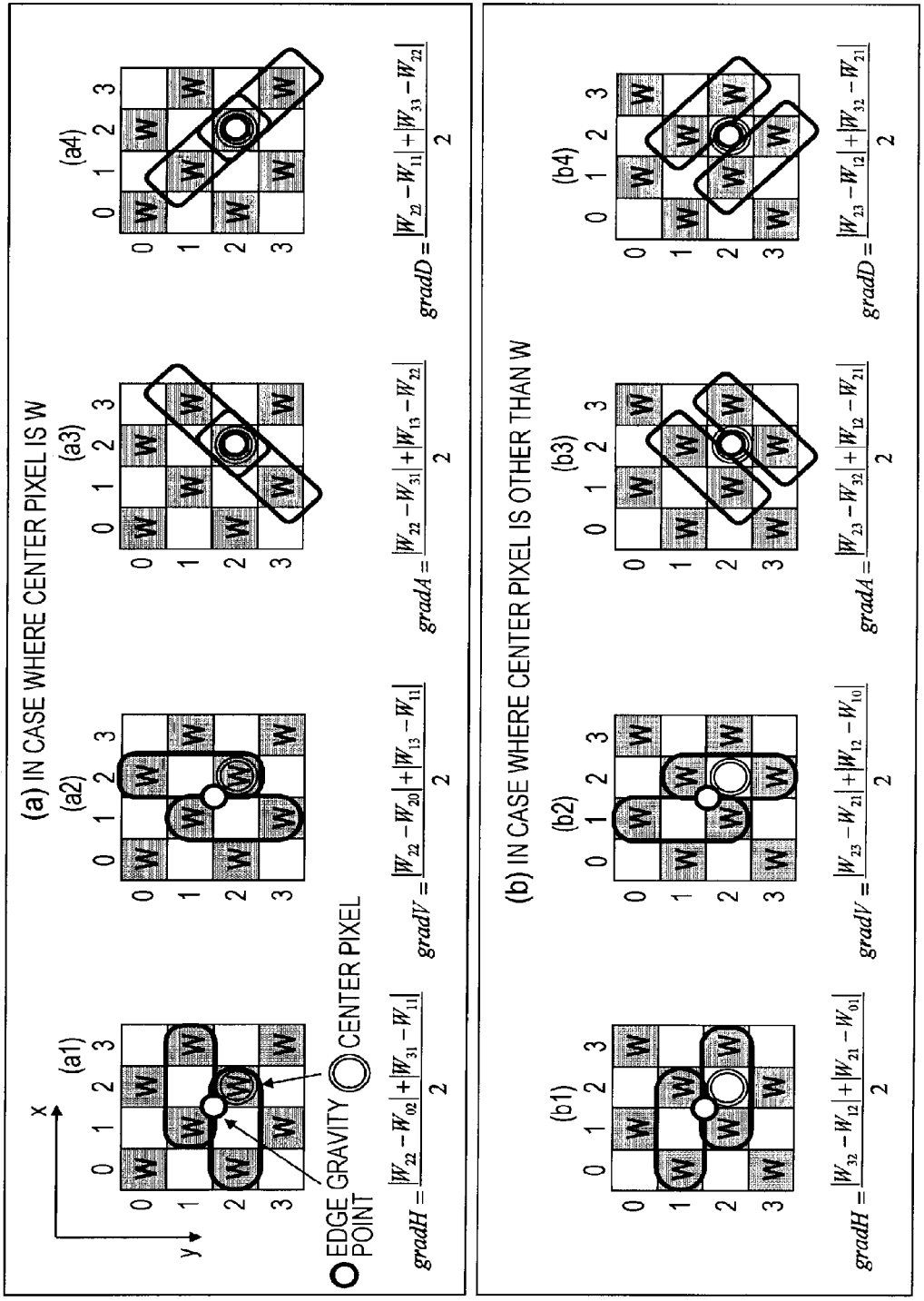
FIG. 9 is an explanatory diagram for describing the edge detection processing executed by the edge detection unit 209 illustrated in FIG. 6.

Various techniques can be applied to the edge detection processing. With reference to FIG. 8 and FIG. 9, one technique thereof will be described. In the method which will be described below, 4×4 pixels in the vicinity of the center of the 7×7 pixel area are utilized.

As illustrated in FIG. 8, the center pixel which is set as the processing target of the 7×7 pixels has these two cases:

(a) In the case of the W pixel; and (b) In the case of a pixel except for the W pixel.

It should be noted that the pixel represented by gray in FIG. 8 is the W pixel, and the other corresponds to one of the RGB pixels.

With respect to these two types of cases (a) and (b), by using respectively different calculation expressions, the edge determination processing of estimating which one of four directions the edge direction is horizontal, vertical, diagonally up right, and diagonally up left and also an intensity thereof.

A specific processing will be described with reference to FIG. 9.

In FIG. 9, calculation expressions applied to the determination processing for the edge direction and the edge intensity in these cases (a) and (b) are represented.

(a) Case where the center pixel is the W pixel (b) Case where the center pixel is a pixel except for the W.

The applied calculation expressions are expressions for calculating a gradient of the pixel value in a particular direction of the image and are calculation expressions of the following respective values.

gradH: Gradient absolute value average in the horizontal direction gradV: Gradient absolute value average in the vertical direction gradA: Gradient absolute value average in the diagonally up right direction gradD: Gradient absolute value average in the diagonally up left direction These gradH, gradV, gradA, and gradD are equivalent to average values for absolute values of gradients (differences) of the pixel values in the respectively different directions. Hereinafter, a specific calculation processing will be described.

(a) Regarding a Processing in a Case where the Center Pixel is the W Pixel

First, a processing in a case where the center pixel is the W pixel will be described with reference to FIG. 9(a). In FIGS. 9(a), (a1) to (a4) represent calculation processing examples for gradH, gradV, gradA, and gradD in a case where the center pixel is the W pixel.

A position indicated by a double circle [⊙] is the center pixel position in the 7×7 pixels.

Also, a position indicated by a circle [○] is the edge gravity point position.

In a case where the center pixel is the W pixel, gradH, gradV, gradA, and gradD are calculated through the following calculation expression (Expression 2).

[Numeric Expression 2]

$$gradH = \frac{|W_{22} - W_{02}| + |W_{31} - W_{11}|}{2}$$

$$gradV = \frac{|W_{22} - W_{20}| + |W_{13} - W_{11}|}{2}$$

$$gradA = \frac{|W_{22} - W_{31}| + |W_{13} - W_{22}|}{2}$$

$$gradD = \frac{|W_{22} - W_{11}| + |W_{33} - W_{22}|}{2}$$

(Expression 2)

It should be noted that Wxy denotes a W pixel value at an xy coordinate position in a coordinate system where the horizontal direction is set as (x) and the vertical direction is set as (y), and coordinates of the upper left end pixel of the 4×4 pixels illustrated in FIG. 9 are set as (0,0) and pixel coordinates of the lower right end are set as (3,3).

gradH is the gradient absolute value average in the horizontal direction and corresponds to the average value of the difference absolute values of the W pixel adjacent in the horizontal direction.

As illustrated in FIG. 9(a1), the average value of the difference absolute values of the two W pixels adjacent in the horizontal direction of the two horizontal lines in the center section of the 4×4 pixel area is calculated as gradH.

gradV is the gradient absolute value average in the vertical direction and corresponds to the average value of the difference absolute values of the W pixel adjacent in the vertical direction.

As illustrated in FIG. 9(a2), the average value of the difference absolute values of the two W pixels adjacent in the vertical direction of the two vertical lines in the center section of the 4×4 pixel area is calculated as gradV.

gradA is the gradient absolute value average in the diagonally up right direction and corresponds to the average value of the difference absolute values of the W pixel adjacent in the diagonally up right direction.

As illustrated in FIG. 9(a3), the average value of the difference absolute values of the two W pixels adjacent in the diagonally up right direction of the two diagonally up right lines in the center section of the 4×4 pixel area is calculated as gradA.

gradD is the gradient absolute value average in the diagonally up left direction and corresponds to the average value of the difference absolute values of the W pixel adjacent in the diagonally up left direction.

As illustrated in FIG. 9(a4), the average value of the difference absolute values of the two W pixels adjacent in the diagonally up left direction of the two diagonally up left lines in the center section of the 4×4 pixel area is calculated as gradD.

As the value of the gradient absolute value average gradH in the horizontal direction is larger, a probability that the edge intensity in the vertical direction is large is higher.

As the value of the gradient absolute value average gradV in the vertical direction is larger, a probability that the edge intensity in the horizontal direction is large is higher.

As the value of the gradient absolute value average gradA in the diagonally up right direction is larger, a probability that the edge intensity in the diagonally up left direction is large is higher.

As the value of the gradient absolute value average gradD in the diagonally up left direction is larger, a probability that the edge intensity in the diagonally up right direction is large is higher.

In this manner, it is possible to determine the edge direction and the edge intensity on the basis of the calculated values of the respective values of gradH, gradV, gradA, and gradD.

(b) Regarding a Processing in a Case where the Center Pixel is Other than the W Pixel Next, a processing in a case where the center pixel is other than the W pixel will be described with reference to FIG. 9(b). In FIGS. 9(b), (b1) to (b4) represent calculation processing examples for gradH, gradV, gradA, and gradD in a case where the center pixel is a pixel other than the W pixel.

A position indicated by a double circle [⊙] is the center pixel position in the 7×7 pixels.

Also, a position indicated by a circle [○] is the edge gravity point position.

In a case where the center pixel is other than the W pixel, gradH, gradV, gradA, and gradD are calculated through the following calculation expression (Expression 3).

[Numeric Expression 3]

$$gradH = \frac{|W_{32} - W_{12}| + |W_{21} - W_{01}|}{2}$$

$$gradV = \frac{|W_{23} - W_{21}| + |W_{12} - W_{10}|}{2}$$

$$gradA = \frac{|W_{23} - W_{32}| + |W_{12} - W_{21}|}{2}$$

$$gradD = \frac{|W_{23} - W_{12}| + |W_{32} - W_{21}|}{2}$$

(Expression 3)

It should be noted that Wxy denotes the W pixel value at the xy coordinate position in the coordinate system where the horizontal direction is set as (x) and the vertical direction is set as (y), and coordinates of the upper left end pixel of the 4×4 pixels illustrated in FIG. 9 are set as (0,0) and pixel coordinates of the lower right end are set as (3,3).

gradH is the gradient absolute value average in the horizontal direction and corresponds to the average value of the difference absolute values of the W pixel adjacent in the horizontal direction.

As illustrated in FIG. 9(b1), the average value of the difference absolute values of the two W pixels adjacent in the horizontal direction of the two horizontal lines in the center section of the 4×4 pixel area is calculated as gradH.

gradV is the gradient absolute value average in the vertical direction and corresponds to the average value of the difference absolute values of the W pixel adjacent in the vertical direction.

As illustrated in FIG. 9(b2), the average value of the difference absolute values of the two W pixels adjacent in the vertical direction of the two vertical lines in the center section of the 4×4 pixel area is calculated as gradV.

gradA is the gradient absolute value average in the diagonally up right direction and corresponds to the average value of the difference absolute values of the W pixel adjacent in the diagonally up right direction.

As illustrated in FIG. 9(b3), the average value of the difference absolute values of the two W pixels adjacent in the diagonally up right direction of the two diagonally up right lines in the center section of the 4×4 pixel area is calculated as gradA.

gradD is the gradient absolute value average in the diagonally up left direction and corresponds to the average value of the difference absolute values of the W pixel adjacent in the diagonally up left direction.

As illustrated in FIG. 9(b4), the average value of the difference absolute values of the two W pixels adjacent in the diagonally up left direction of the two diagonally up left lines in the center section of the 4×4 pixel area is calculated as gradD.

As the value of the gradient absolute value average gradH in the horizontal direction is larger, the probability that the edge intensity in the vertical direction is large is higher.

As the value of the gradient absolute value average gradV in the vertical direction is larger, the probability that the edge intensity in the horizontal direction is large is higher.

As the value of the gradient absolute value average gradA in the diagonally up right direction is larger, the probability that the edge intensity in the diagonally up left direction is large is higher.

As the value of the gradient absolute value average gradD in the diagonally up left direction is larger, the probability that the edge intensity in the diagonally up right direction is large is higher.

In this manner, it is possible to estimate the edge direction and the edge intensity on the basis of the calculated values of the respective values of gradH, gradV, gradA, and gradD.

The edge detection unit 209 obtains the edge information corresponding to the respective pixels (the edge direction and the edge intensity) on the basis of the respective values of gradH, gradV, gradA, and gradD in this manner. The obtained edge information is output to the blend processing unit 211.

It should be noted that the above-described edge direction•intensity detection method is an example, and a configuration using another edge detection method may also be employed. For example, the edge detection method described with reference to FIG. 9 uses particular pixel value information in an extremely narrow range, and it is expected that an erroneous determination occurs when the noise is large. An obtaining processing example for the edge information in which this erroneous determination is prevented will be described with reference to FIG. 10.

Figure 10:
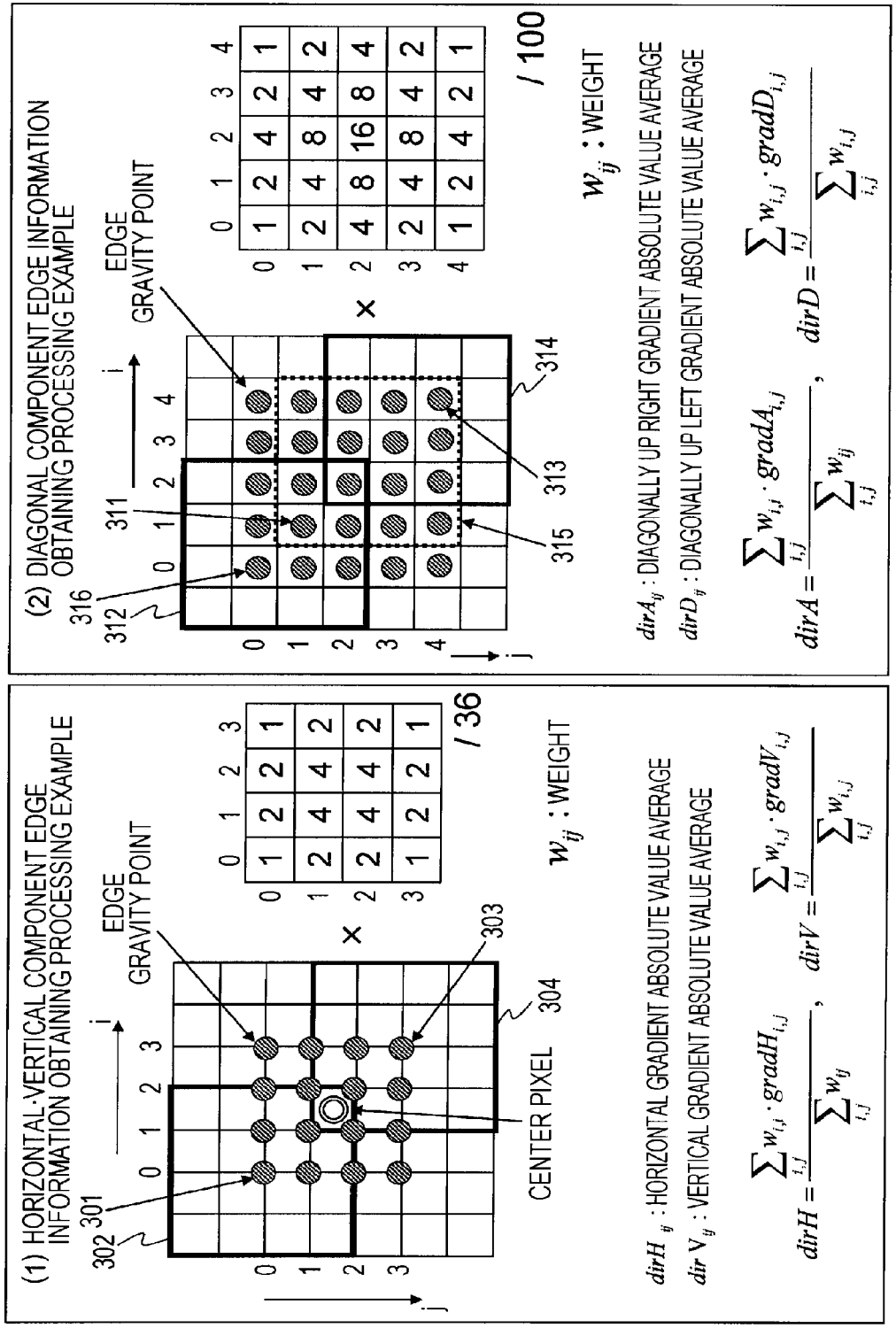
FIG. 10 is an explanatory diagram for describing the edge detection processing executed by the edge detection unit 209 illustrated in FIG. 6.

The edge information obtaining processing example illustrated in FIG. 10 is a technique using a processing of performing a weighted addition of the gradient absolute value average that is the calculation value described with reference to FIG. 9. FIG. 10 illustrates these respective processing examples.

(1) Horizontal•vertical component edge information obtaining processing example (2) Diagonal component edge information obtaining processing example FIGS. 10(1) and (2) illustrate image data of the 7×7 pixels. This data is data set as the processing target by the edge detection unit 209 and is data where only the W pixel values are discretely arrayed similarly as illustrated in FIG. 9. The edge information (the edge direction and the edge intensity) corresponding to this center pixel located at the center of these 7×7 pixels is obtained.

The horizontal•vertical component edge information obtaining processing example illustrated in FIG. 10(1) will be described. FIG. 10(1) illustrates 16 edge gravity points. These correspond to the edge gravity points illustrated in FIG. 9(a1), (a2), (b1), and (b2). That is, these correspond to the edge gravity points when these following values are calculated.

gradH: Gradient absolute value average in the horizontal direction gradV: Gradient absolute value average in the vertical direction.

In the 7×7 pixel area illustrated in FIG. 10(1), the 4×4 pixel areas illustrated in FIG. 9(a1), (a2), (b1), and (b2) are set. The number of settable 4×4 pixel areas is 16 from a 4×4 pixel area 302 at the upper left end to a 4×4 pixel area 304 at the lower right end illustrated in the drawing. The 16 edge gravity points illustrated in FIG. 10(1) are edge gravity points corresponding to these 16 pieces of 4×4 pixel areas, that is, positions similar to those illustrated in FIG. 9(a1), (a2), (b1), and (b2).

In a case where the coordinate position of the edge gravity point is denoted by (i,j) and scales 0, 1, 2, and 3 illustrated in the drawing are set while the horizontal axis is set as i and the vertical axis is set as j, an edge gravity point (0,0) 301 becomes an edge gravity point corresponding to the 4×4 pixel area 302. In a case where the 4×4 pixel area 302 is set as the 4×4 pixel areas illustrated in FIGS. 9(a1), (a2), (b1), and (b2), the edge gravity point (0,0) 301 corresponds to the gravity point illustrated in the FIGS. 9(a1), (a2), (b1), and (b2).

Also, an edge gravity point (3,3) 303 is an edge gravity point that is set while corresponding to the 4×4 pixel area 304. In a case where the 4×4 pixel area 304 is set as the 4×4 pixel area illustrated in FIG. 9(a1), (a2), (b1), and (b2), the edge gravity point (3,3) 303 corresponds to the gravity point illustrated in FIG. 9(a1), (a2), (b1), and (b2).

In the 7×7 pixel area illustrated in FIG. 10(1), 16 pieces of sets of the 4×4 pixel areas and the edge gravity points. With respect to these 16 pieces of sets, by using the calculation expressions described with reference to FIG. 9(a1), (a2), (b1), and (b2), gradH: Gradient absolute value average in the horizontal direction gradV: Gradient absolute value average in the vertical direction these values can be calculated respectively 16 pieces each.

The gradient absolute value averages (gradH) and (gradV) calculated by using the 4×4 pixel area corresponding to the edge gravity point (i,j) are respectively denoted as follows.

gradH$_{i,j}$
gradV$_{i,j}$

By using these, the weighted addition values of the gradient absolute value averages, that is, they are calculated by using the following calculation expression (Expression 4).

dirH: Horizontal gradient information
dirV: Vertical gradient information

[Numeric Expression 4]

$$dirH = \frac{\sum_{i,j} w_{i,i} \cdot gradH_{i,j}}{\sum_{i,j} w_{ij}}, \quad dirV = \frac{\sum_{i,j} w_{i,j} \cdot gradV_{i,j}}{\sum_{i,j} w_{i,j}} \quad \text{(Expression 4)}$$

In the above-mentioned expression, $w_{ij}$ is the weighting factor corresponding to the edge gravity point at the (i,j) position. The weighting factor is set as a factor where the center section is large and the peripheral section is small, for example, as illustrated in FIG. 10(1). FIG. 10(1) illustrates an example in which as an example of the weighting factor, the weighting factors of (4/36) to (1/36) are associated with the 16 pieces of edge gravities.

Next, the diagonal component edge information obtaining processing example illustrated in FIG. 10(2) will be described. FIG. 10(2) illustrates 25 pieces of edge gravity points. These correspond to the edge gravity points illustrated in FIGS. 9(*a*3), (*a*4), (*b*3), and (*b*4). That is, these correspond to the edge gravity points when these following values are calculated.

gradA: Gradient absolute value average in the diagonally up right direction
gradD: Gradient absolute value average in the diagonally up left direction In the 7×7 pixel area, the 4×4 pixel areas illustrated in FIGS. 9(*a*3), (*a*4), (*b*3), and (*b*4) are set. The number of settable 4×4 pixel areas is 16 from a 4×4 pixel area 312 at the upper left end to a 4×4 pixel area 314 at the lower right end illustrated in the drawing. Among the 25 pieces of edge gravity points illustrated in FIG. 10(2), 16 pieces of edge gravity points in a dotted-line rectangular frame 315 illustrated in FIG. 10(2) are edge gravity points corresponding to these 16 pieces of 4×4 pixel areas, that is, edge gravity points at locations similar to those illustrated in FIGS. 9(*a*3), (*a*4), (*b*3), and (*b*4).

In a case where the coordinate position of the edge gravity point is denoted by (i,j) and scales 0, 1, 2, 3, and 4 illustrated in the drawing are set while the horizontal axis is set as i and the vertical axis is set as j, an edge gravity point (1,1) 311 becomes an edge gravity point corresponding to the 4×4 pixel area 312. In a case where the 4×4 pixel area 312 are set as a 4×4 pixel area illustrated in FIGS. 9(*a*3), (*a*4), (*b*3), and (*b*4), the edge gravity point (1,1) 311 corresponds to the edge gravity point illustrated in FIGS. 9(*a*3), (*a*4), (*b*3), and (*b*4).

Also, an edge gravity point (4, 4) 313 is an edge gravity point set while corresponding to the 4×4 pixel area 314. In a case where the 4×4 pixel area 314 is set as the 4×4 pixel area illustrated in FIGS. 9(*a*3), (*a*4), (*b*3), and (*b*4), the edge gravity point (4, 4) 313 corresponds to the edge gravity point illustrated in FIG. 9(*a*3), (*a*4), (*b*3), and (*b*4).

FIG. 10(2) also illustrates edge gravity points on an outer side of the dotted-line rectangular frame 315. These edge gravity points are located at i=0 and j=0.

(i,j)=(0,0) to (0,4) and (1,0) to (4,0)

As illustrated in FIGS. 9(*a*3), (*a*4), (*b*3), and (*b*4), the pixel positions most highly utilized for calculating these following values are only eight pixels around the edge gravity point.

gradA: Gradient absolute value average in the diagonally up right direction
gradD: Gradient absolute value average in the diagonally up left direction Therefore, even in a case where the edge gravity points are set at the positions of i=0 and j=0 illustrated in FIG. 10(2), it is possible to calculate gradA and gradV.

Therefore, gradA and gradD that can be calculated in which the edge gravity points are set at the different positions by using the 7×7 pixel area become 25 pieces of data corresponding to 25 edge gravity point positions illustrated in FIG. 10(2).

From the 7×7 pixel area illustrated in FIG. 10(2), by using the calculation expressions described with reference to FIG. 9(*a*3), (*a*4), (*b*3), and (*b*4), gradA: Gradient absolute value average in the diagonally up right direction
gradD: Gradient absolute value average in the diagonally up left direction these values can be calculated respectively 25 pieces each.

The gradient absolute value averages (gradA) and (gradD) calculated by using the 4×4 pixel area corresponding to the edge gravity point (i,j) are respectively denoted as follows.

gradA$_{i,j}$
gradD$_{i,j}$

By using these, the weighted added values of the gradient absolute value averages, that is, dirA: Diagonally up right direction gradient information
dirD: Diagonally up left direction gradient information they are calculated by using the following calculation expression (Expression 5).

[Numeric Expression 5]

$$dirA = \frac{\sum_{i,j} w_{i,i} \cdot gradA_{i,j}}{\sum_{i,j} w_{ij}}, \quad dirD = \frac{\sum_{i,j} w_{i,j} \cdot gradD_{i,j}}{\sum_{i,j} w_{i,j}} \quad \text{(Expression 5)}$$

In the above-mentioned expression, $w_{ij}$ is the weighting factor corresponding to the edge gravity point at the (i,j) position. The weighting factor is set as a factor where the center section is large and the peripheral section is small, for example, as illustrated in FIG. 10(2). FIG. 10(2) illustrates as an example of the weighting factor, the weighting factors of (16/100) to (1/100) are associated with the 25 pieces of edge gravities.

The edge information calculated through the processing described with reference to FIG. 10, that is, dirH: Horizontal gradient information
dirV: Vertical gradient information
dirA: Diagonally up right direction gradient information
dirD: Diagonally up left direction gradient information.

These dirH, dirV, dirA, and dirD are edge information calculated by utilizing a large number of pixel values (W pixel values) included in the 7×7 pixel area.

Therefore, as compared with the edge information calculated by applying a small number of pieces of pixel information described with reference to FIG. 9, a probability that an erroneous result occurs because of noise or the like is decreased.

It should be noted that the above-mentioned expression and the setting examples for the weighting factor $w_{ij}$ illustrated in FIG. 10 are examples, and other averaging factor can also be used.

Figure 11:
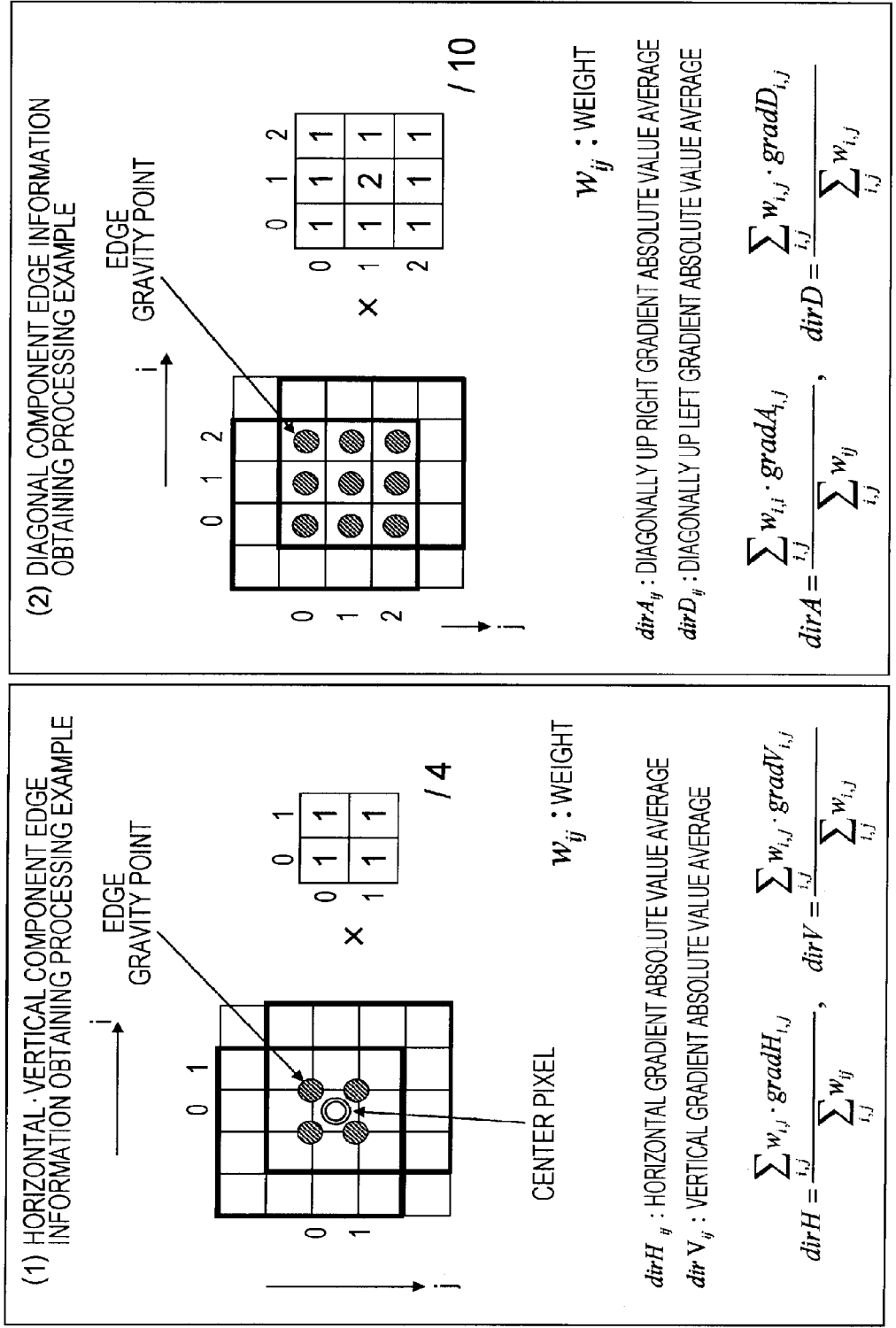
FIG. 11 is an explanatory diagram for describing the edge detection processing executed by the edge detection unit 209 illustrated in FIG. 6.

It should be noted that the example described with reference to FIG. 10 is a processing example of calculating the weighted added values of the gradient absolute value averages (dirH, dirV, dirA, and dirD) by using the area of the 7×7 pixels, but for example, as illustrated in FIG. 11, a configuration may also be employed in which the weighted added values of the gradient absolute value averages (dirH, dirV, dirA, and dirD) are calculated by using an area of 5×5 pixels.

Similarly as in FIG. 10, FIG. 11 illustrates these respective processing examples.

(1) Horizontal•vertical component edge information obtaining processing example (2) Diagonal component edge information obtaining processing example FIGS. 11(1) and (2) illustrate image data of 5×5 pixels. This data is data that is set as a processing target by the edge detection unit 209 and is data where W pixel values are discretely arrayed similarly as illustrated in FIG. 9. The edge information (the edge direction and the edge intensity) corresponding to the center pixel located at this center of the 5×5 pixels.

A description will be given of (1) Horizontal•vertical component edge information obtaining processing example illustrated in FIG. 11(1). Four pieces of sets of the 4×4 pixel areas and the edge gravity points are set in the 5×5 pixel area illustrated in FIG. 11(1). With reference to these four pieces of sets, by using the calculation expressions described with reference to FIG. 9(a1), (a2), (b1), and (b2)f, gradH: Gradient absolute value average in the horizontal direction gradV: Gradient absolute value average in the vertical direction these values can be calculated respectively four pieces each.

The gradient absolute value averages (gradH) and (gradV) calculated by using the 4×4 pixel area corresponding to the edge gravity point (i,j) are respectively denoted as follows.

gradH$_{i,j}$
gradV$_{i,j}$

By using these, the weighted added values of the gradient absolute value averages, that is, dirH: Horizontal gradient information
dirV: Vertical gradient information they are calculated by using the above-described expression (Expression 4).

Next, the diagonal component edge information obtaining processing example illustrated in FIG. 11(2) will be described. FIG. 11(2) illustrates nine pieces of edge gravity points. These correspond to the edge gravity points illustrated in FIGS. 9(a3), (a4), (b3), and (b4). That is, these correspond to the edge gravity points when these following values are calculated.

gradA: Gradient absolute value average in the diagonally up right direction gradD: Gradient absolute value average in the diagonally up left direction From the 5×5 pixel area illustrated in FIG. 11(2), by using the calculation expressions described with reference to FIG. 9(a3), (a4), (b3), and (b4), gradA: Gradient absolute value average in the diagonally up right direction gradD: Gradient absolute value average in the diagonally up left direction these values can be calculated respectively nine pieces each.

The gradient absolute value averages (gradA) and (gradD) calculated by using the 4×4 pixel area corresponding to the edge gravity point (i,j) are respectively denoted as follows.

gradA$_{i,j}$
gradD$_{i,j}$

By using these, the weighted added values of the gradient absolute value averages, that is, dirA: Diagonally up right direction gradient information
dirD: Diagonally up left direction gradient information they are calculated by using the above-mentioned calculation expression (Expression 5).

In this manner, in the processing of calculating the weighted added values of the gradient absolute value averages (dirH, dirV, dirA, and dirD), it is possible to utilize various areas such as the 7×7 pixel area or the 5×5 pixel area.

The edge detection unit 209 outputs the thus obtained edge information, that is, dirH: Horizontal gradient information
dirV: Vertical gradient information
dirA: Diagonally up right direction gradient information
dirD: Diagonally up left direction gradient information these pieces of edge information (dirH, dirV, dirA, and dirD) to the blend processing unit 211 and the plurality of pixel interpolation parameter calculation units.

(3-3. Regarding a Processing by a Texture Detection Unit)

Next, a processing by the texture detection unit 210 will be described. The texture detection unit 210 executes the texture detection processing using the discrete white W pixels included in the RGBW pattern which is the input signal. That is, the texture information corresponding to the respective pixels is detected, and the detected information is output to the blend processing unit 211.

To be specific, it is detected whether the neighborhood image area of the respective pixels is an image with a large texture (low flatness) or an image with a small texture (high flatness), and this detected information is output as the texture information corresponding to the respective pixels to the blend processing unit 211.

A processing of the texture detection unit 210 will be described with reference to FIG. 12 and subsequent drawings.

The texture detection unit 210, first, calculates an average value Wave of the W pixels for each input pixel unit (5×5 pixels) constituting the RGBW pattern image.

In the calculation processing for the W pixel average value Wave, for example, a smoothing filter is used. In a case where the center in the input pixel unit is the W pixel, the average value Wave of the W pixels is obtained by a filter where a factor indicated in FIG. 12 is set, and in a case where the center in the input pixel unit is not the W pixel, the average value Wave of the W pixels is obtained by a filter where a factor indicated in FIG. 13.

Figure 12:
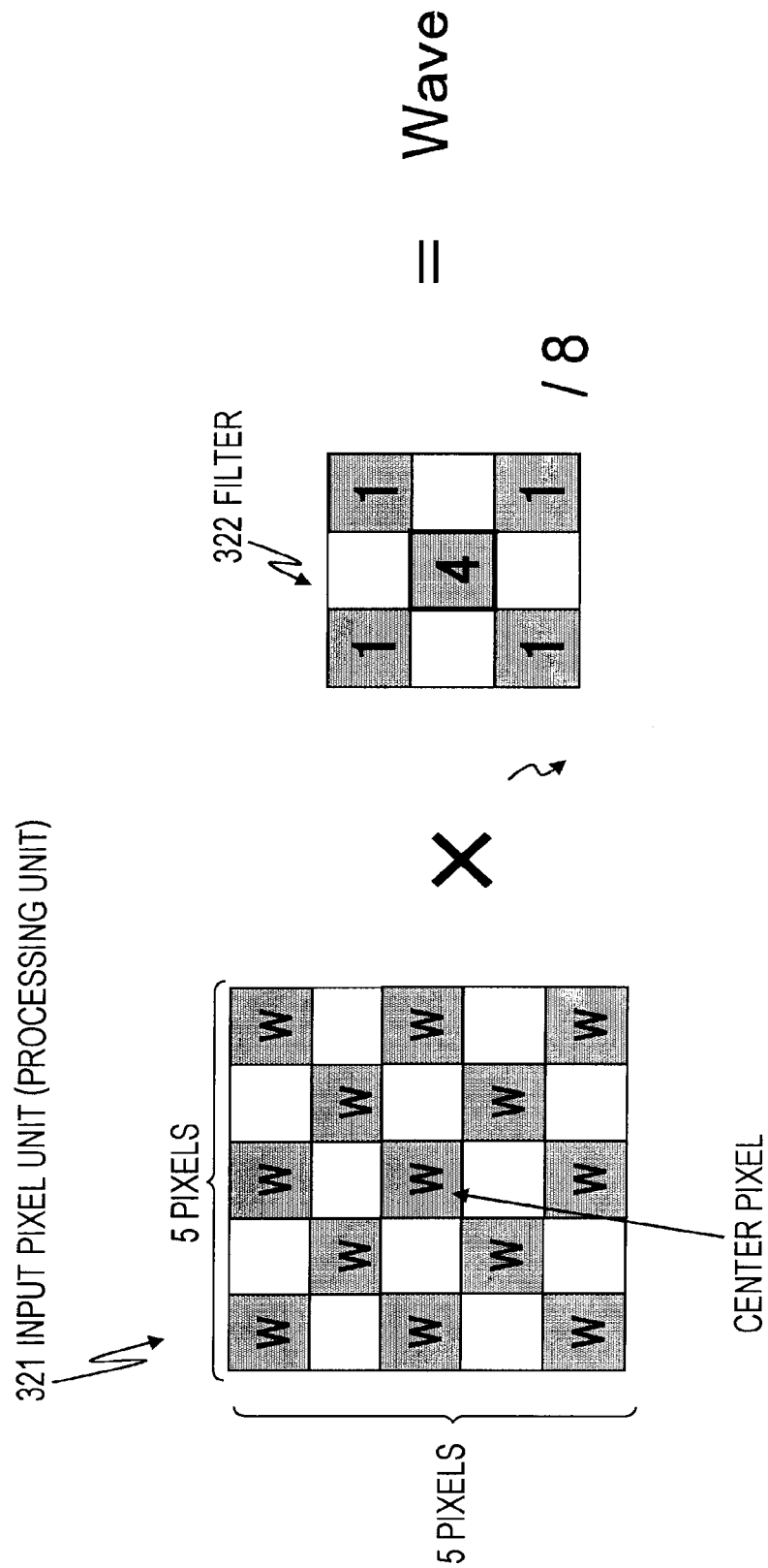
FIG. 12 is an explanatory diagram for describing a texture detection processing executed by a texture detection unit 210 illustrated in FIG. 6.

With reference to FIG. 12, a processing in a case where the center in the input pixel unit is the W pixel will be described. A W pixel value in nine pixels where a W pixel position in an input pixel unit 321 having 5×5 pixels, in which the center pixel becomes the W pixel, is set as the center is multiplied by a filter factor at a corresponding pixel position of a filter 322. Furthermore, an added value of the respective multiplication results is calculated. This addition result is set as the average value Wave of the W signals. This average value Wave is calculated as the average value Wave with respect to the center W pixel in the input pixel unit 321. Furthermore, by using this average value Wave corresponding to the pixel, the texture detection unit 210 calculates the flatness weight (weightFlat) as an index value of the texture ratio corresponding to the center W pixel. This calculation processing will be described below.

It should be noted that the filter factor of the filter 322 illustrated in FIG. 12 has a setting with regard to the center W pixel to the surrounding W pixel (4/8 to 1/8) in the input pixel unit 321 having the 5×5 pixels. As this filter factor is an example, a configuration utilizing another factor may also be employed, and as long as this is a low-pass filter, the factor is not limited to this. Also, a configuration utilizing an area wider than the nine pixels may also be employed.

Next, with reference to FIG. 13, a processing in a case where the center in the input pixel unit is other than the W pixel will be described. A W pixel value in nine pixels where the center pixel position in an input pixel unit 331 having 5×5 pixels, in which the center pixel becomes a pixel other than the W pixel, is set as the center is multiplied by the filter factor at the corresponding pixel position of a filter 332. Furthermore, an added value of the respective multiplication results is calculated. This addition result is set as the average value Wave of the W signals. The calculated average value Wave is calculated as the average value Wave with respect to the center pixel in the input pixel unit 331 (any of RGB).

Figure 13:
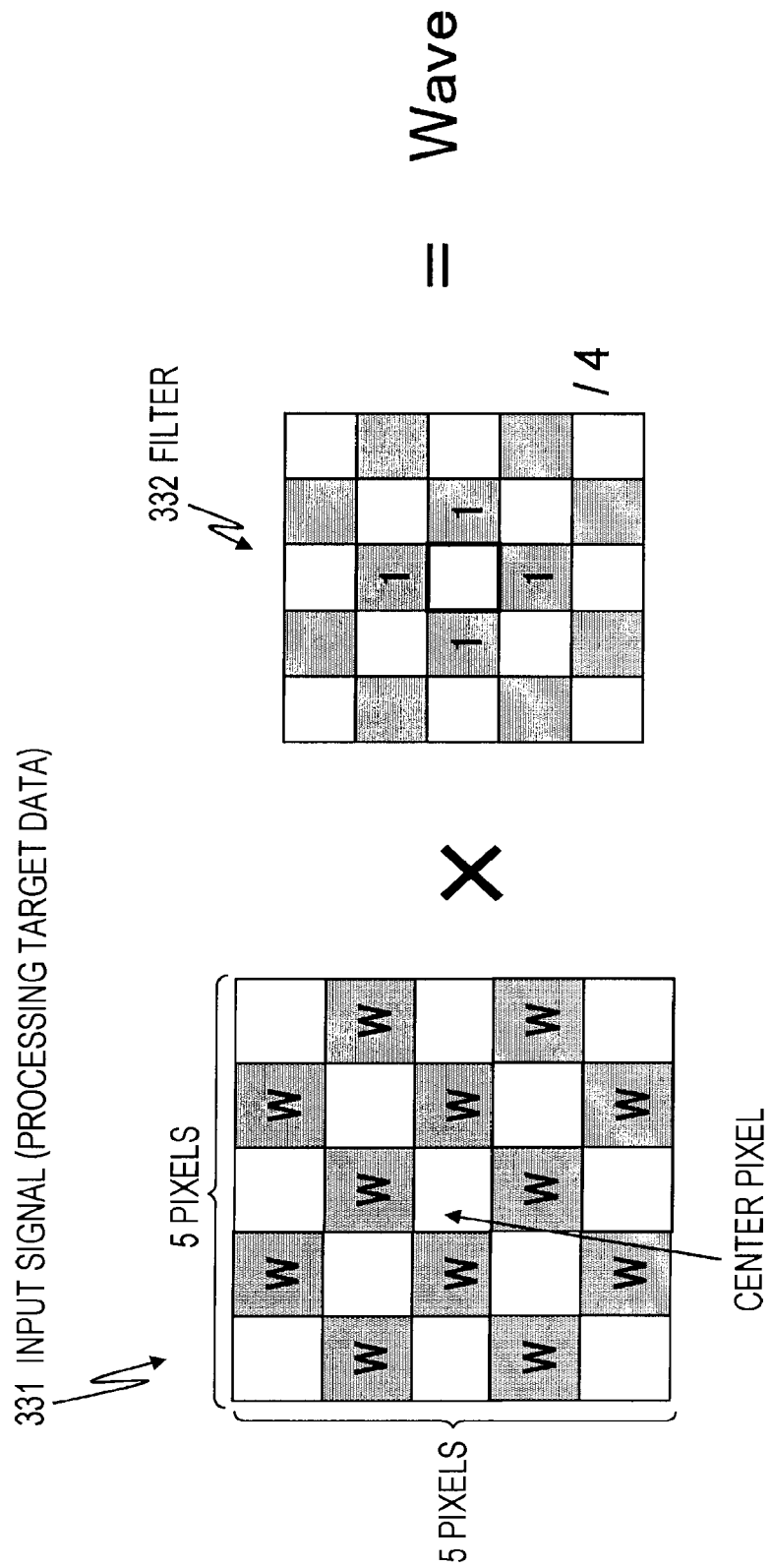
FIG. 13 is an explanatory diagram for describing the texture detection processing executed by the texture detection unit 210 illustrated in FIG. 6.

It should be noted that the filter factor of the filter 332 illustrated in FIG. 13 has each (1/4) setting with regard to the surrounding W pixel around the center pixel in the input pixel unit 331 having the 5×5 pixels. As this filter factor is an example, a configuration utilizing another factor may also be employed, and as long as this is a low-pass filter, the factor is not limited to this. Also, a configuration utilizing an area wider than the nine pixels may also be employed. Also, a configuration utilizing an area wider than the nine pixels may also be employed.

The texture detection unit 210 applies the filter 322 illustrated in FIG. 12 or the filter 332 illustrated in FIG. 13 in accordance with whether the center pixel in the input pixel unit is the W pixel or an RGB pixel other than the W pixel to calculate the W pixel average value Wave corresponding to the center pixel in the input pixel unit in this manner.

The texture detection unit 210 calculates a texture ratio: $W_{TX}(p)$ corresponding to the center pixel $p=(x,y)$ by using the calculated W pixel average value Wave while using the following calculation expression (Expression 6).

[Numeric Expression 6]

$$W_{TX}(p) = \sum_{q \in \Omega_p} \varphi(|I(q) - I_{AVE}(p)|) \quad \text{(Expression 6)}$$

In the above-mentioned expression (Expression 6),
$\Omega p$ denotes an assembly of pixels included in the input pixel unit (5×5 pixels) that is the processing target data,
I(q) denotes a pixel value thereof,
Iave(p) denotes a W pixel average value calculated by applying the filter of FIG. 12 or FIG. 13 (identical value to Wave), and
φ(r) denotes a previously prescribed weight function.

It should be noted that the function φ(r) generally uses an exponential function. However, to suppress the computation amount, the previously described linearly approximated function illustrated in FIG. 7(3) may also be utilized.

The linear approximation illustrated in FIG. 7(3) is a linear approximation example while Th1=2.0 and Th2=3.0 are set as thresholds with the following setting.
r=0 to Th1 (2.0)→φ(r)=1.0
r=Th1 (2.0) to Th2(3.0)→φ(r)=1.0 to 0 (linear change)
r=larger than or equal to Th2→φ(r)=0

Furthermore, the texture detection unit 210 applies the texture ratio: $W_{TX}(p)$ corresponding to the center pixel p calculated while following the above-mentioned expression to calculate the flatness weight (weightFlat) corresponding to the center pixel p=(x,y) while following the expression (Expression 7) below.

$$\text{weightFlat}(x,y) = f_{flat}(W_{TX}(p)) \quad \text{(Expression 7)}$$

Figure 14:
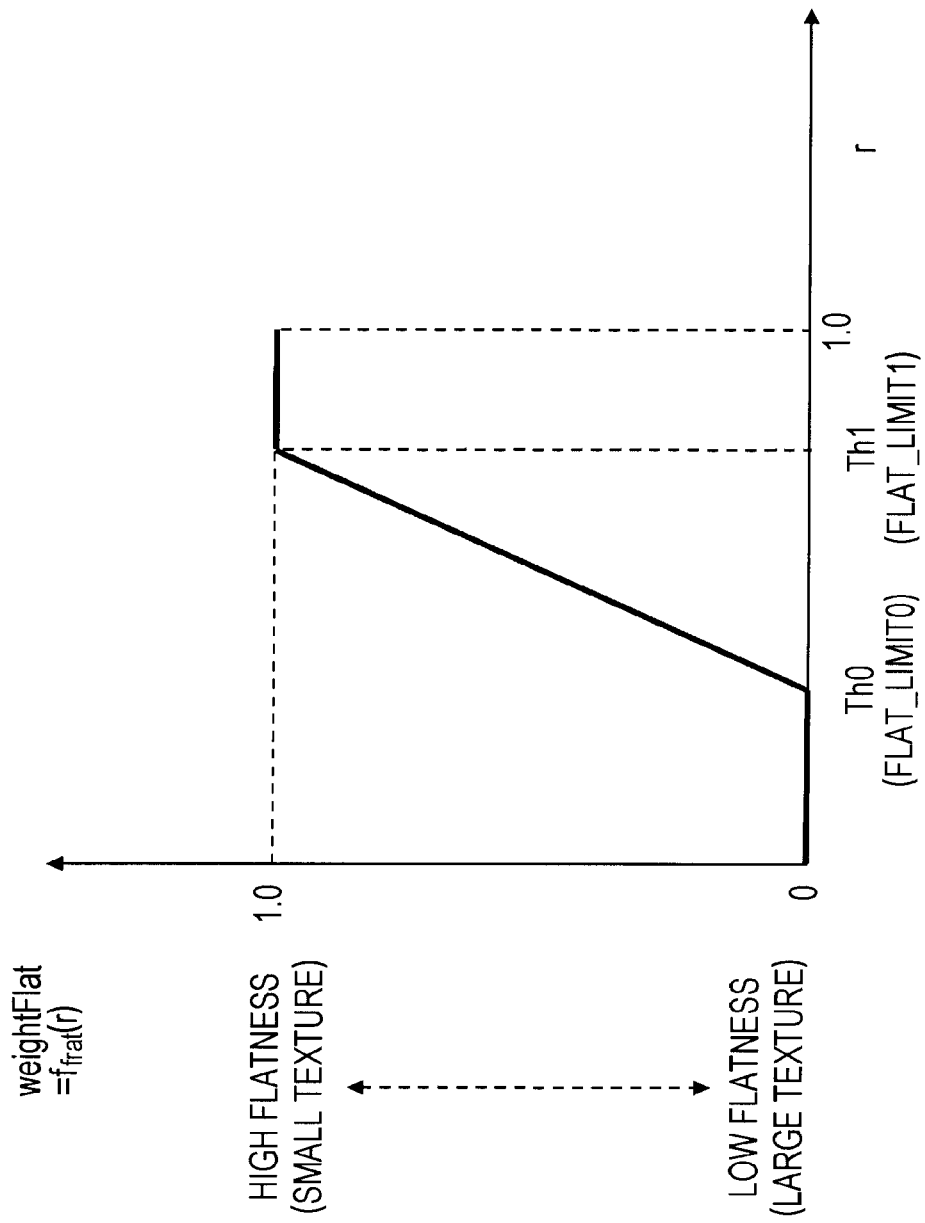
FIG. 14 is an explanatory diagram for describing the texture detection processing executed by the texture detection unit 210 illustrated in FIG. 6.

In the above-mentioned expression (Expression 7),
$f_{flat}(r)$ can use a linearly approximated function illustrated in FIG. 14, for example.

The linearly approximated function illustrated in FIG. 14 is a linearly approximated function while 0<Th0 (FLAT_LIMIT0)<Th1 (FLAT_LIMIT1)<1 are set as thresholds with the following setting.
r=0 to Th0→$f_{flat}(r)=0$
r=Th0 to Th1→$f_{flat}(r)=0$ to 1.0 (linear change)
r=larger than or equal to Th1→$f_{flat}(r)=1$ It should be noted that a probability is higher that as the value of the flatness weight (weightFlat) is smaller, the image area has a low flatness and a large texture, and as the value of the flatness weight (weightFlat) is larger, the image area has a high flatness a small texture.

The texture detection unit 210 outputs the thus calculated flatness weight (weightFlat) to the blend processing unit 211.

(3-4. Regarding a Processing by a Pixel Interpolation Parameter Calculation Unit)

Next, processing by the first to fifth pixel interpolation parameter calculation units 202, 204, 205, 207, and 208, and the first and second temporary pixel setting units 203 and 206 in the data transform processing unit 200 of FIG. 6 will be described. These respective units execute the following processings.

The first pixel interpolation parameter calculation unit (GonW) 202 executes the calculation processing for the parameter applied to the processing of transforming the W pixel into the G pixel.

The first temporary pixel setting unit (RBonWaroundG) 203 executes the processing of transforming the W pixel around the G pixel into the temporary pixel (R') or (B') of the R or B pixel as the preliminary processing for the processing of transforming the W pixel position adjacent to the G pixel into the R pixel or the B pixel.

The second pixel interpolation parameter calculation unit (RBonGofHV) 204 calculates the parameter corresponding to the vertical or horizontal edge as the parameter applied to the processing of transforming the G pixel into the R pixel or the B pixel.

The third pixel interpolation parameter calculation unit (RBonGofAD) 205 calculates the parameter corresponding to the diagonal edge as the parameter applied to the processing of transforming the G pixel into the R pixel or the B pixel.

The second temporary pixel setting unit (RBonWaroundRB) 206 executes the processing of transforming the W pixel around the R or B pixel into the temporary pixel (R')

or (B') of the R or B pixel as the preliminary processing for the processing of transforming the W pixel position adjacent to the R pixel or the B pixel into the R pixel or the B pixel The fourth pixel interpolation parameter calculation unit (RBonRBofHV) 207 calculates the parameter corresponding to the vertical or horizontal edge as the parameter applied to the processing of transforming the R pixel into the R pixel or the B pixel into the B pixel.

The fifth pixel interpolation parameter calculation unit (RBonRBofAD) 208 calculates the parameter corresponding to the diagonal edge as the parameter applied to the processing of transforming the R pixel into the R pixel or the B pixel into the B pixel.

(3-4-1. Processing by the First Pixel Interpolation Parameter Calculation Unit (GonW) 202)

First, a processing by the first pixel interpolation parameter calculation unit (GonW) 202 will be described. The first pixel interpolation parameter calculation unit (GonW) 202 calculates an interpolation parameter applied to the calculation for the G pixel value set at the W pixel position in the RGBW pattern 181.

It should be noted that the first pixel interpolation parameter calculation unit (GonW) 202 performs the processing while the 7×7 or 5×5 pixel area is set as the processing unit (input pixel unit).

First, a case where the processing is performed while the 7×7 pixel area is set as the processing unit (input pixel unit) will be described with reference to FIG. 15 and subsequent drawings.

The first pixel interpolation parameter calculation unit (GonW) 202, first, calculates a low frequency component mW of the W signal in the 7×7 pixel area that is the processing unit.

Figure 15:
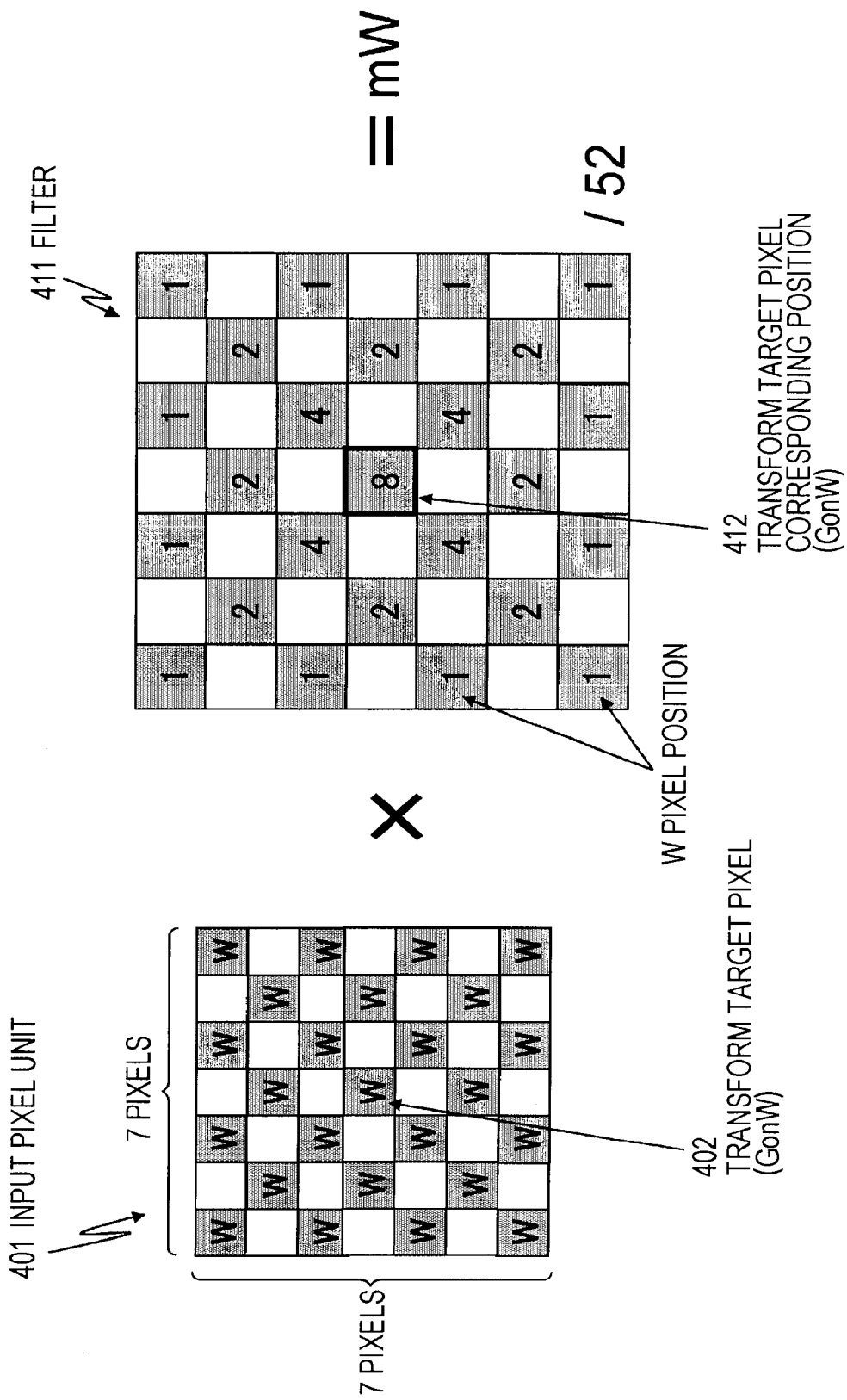
FIG. 15 is an explanatory diagram for describing a processing executed by the first pixel interpolation parameter calculation unit (GonW) 202 illustrated in FIG. 6.

As illustrated in FIG. 15, a filter 411 illustrated in FIG. 15 is applied to a 7×7 pixel input pixel unit 401 to calculate the low frequency component mW corresponding to the 7×7 pixel input pixel unit 401. Herein, the W pixel that is the target to be transformed into the G pixel is a transform target pixel 402 located at the center of the 7×7 pixel input pixel unit 401. The pixel represented by gray in the input pixel unit 401 illustrated in FIG. 15 is the W pixel. Others are RGB pixels. Similarly, the pixel represented by gray in the filter 411 illustrated in FIG. 15 the W pixel corresponding position. Others are RGB pixel corresponding positions. It should be noted that in the following drawings, the W pixel or the W pixel corresponding position is represented by gray, and the RGB pixel position or the corresponding position is represented by white.

The filter 411 is a filter having such a setting that the filter factor of a transform target pixel corresponding position 412 is the highest and the factor is decreased as being away to the surrounding. As the factors, the respective factors of (8/52 to 1/52) are set. By applying this filter 411, the low frequency component mW is calculated. The pixel value at the W pixel position in the 7×7 pixel input pixel unit 401 is multiplied by the filter factor at the corresponding pixel position of the filter 411, and the added value of the respective multiplication results is calculated as the low frequency component mW of the W signal.

It should be noted that the filter factor setting example for the filter 411 illustrated in FIG. 15 is an example, and a filter where another filter factor is set may also be applied. Other than the filter example illustrated in FIG. 15, for example, it is also possible to use another smoothing filter having a low-pass characteristic.

Next, with reference to FIG. 16 and FIG. 17, a calculation processing for a low frequency component mG of the G signal will be described. In calculation processing for the low frequency component mG of the G signal, different filters are applied in accordance with the configuration and the edge direction of the 7×7 pixel input pixel unit 401.

Figure 16:
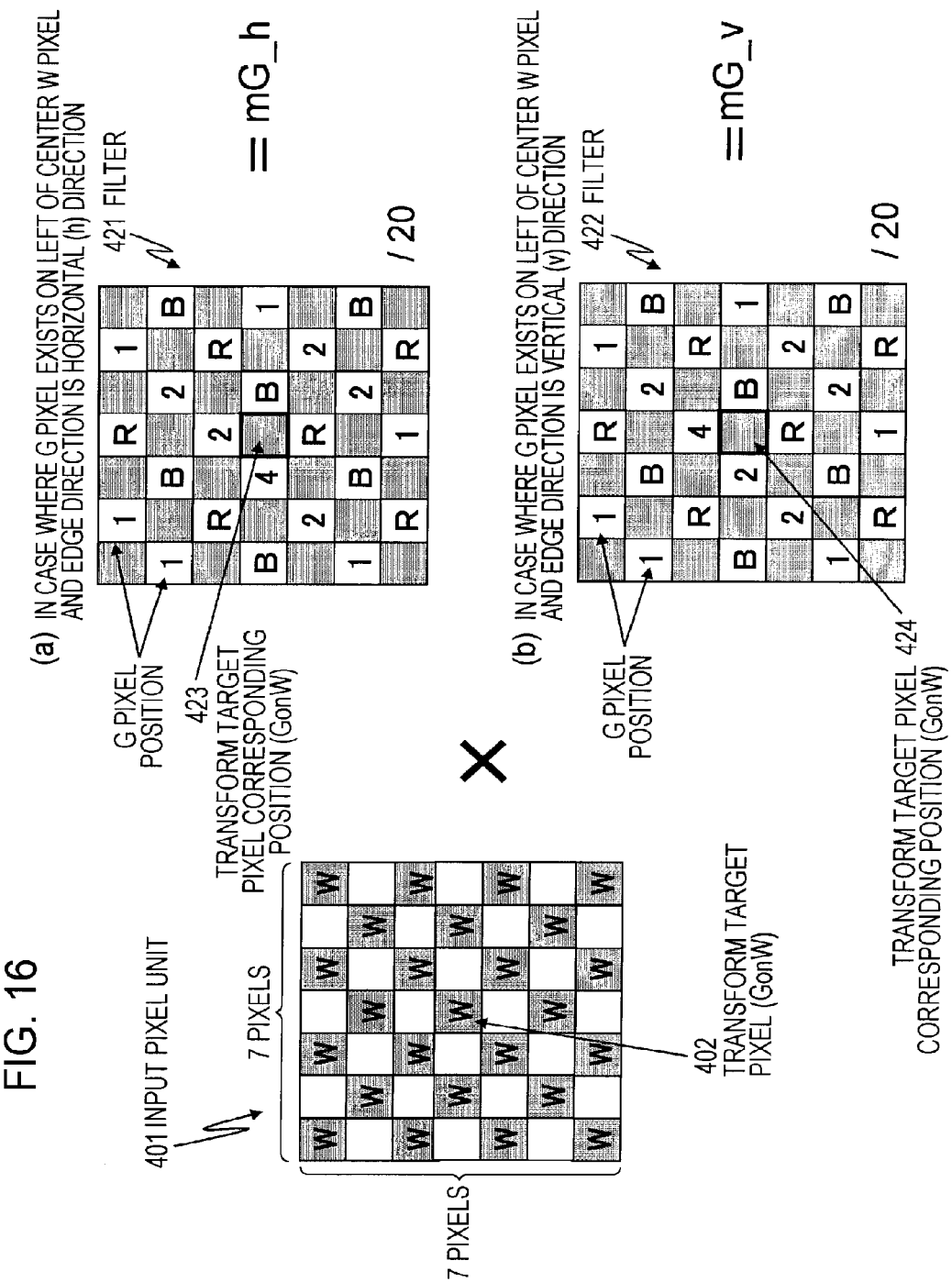
FIG. 16 is an explanatory diagram for describing the processing executed by the first pixel interpolation parameter calculation unit (GonW) 202 illustrated in FIG. 6.
Figure 17:
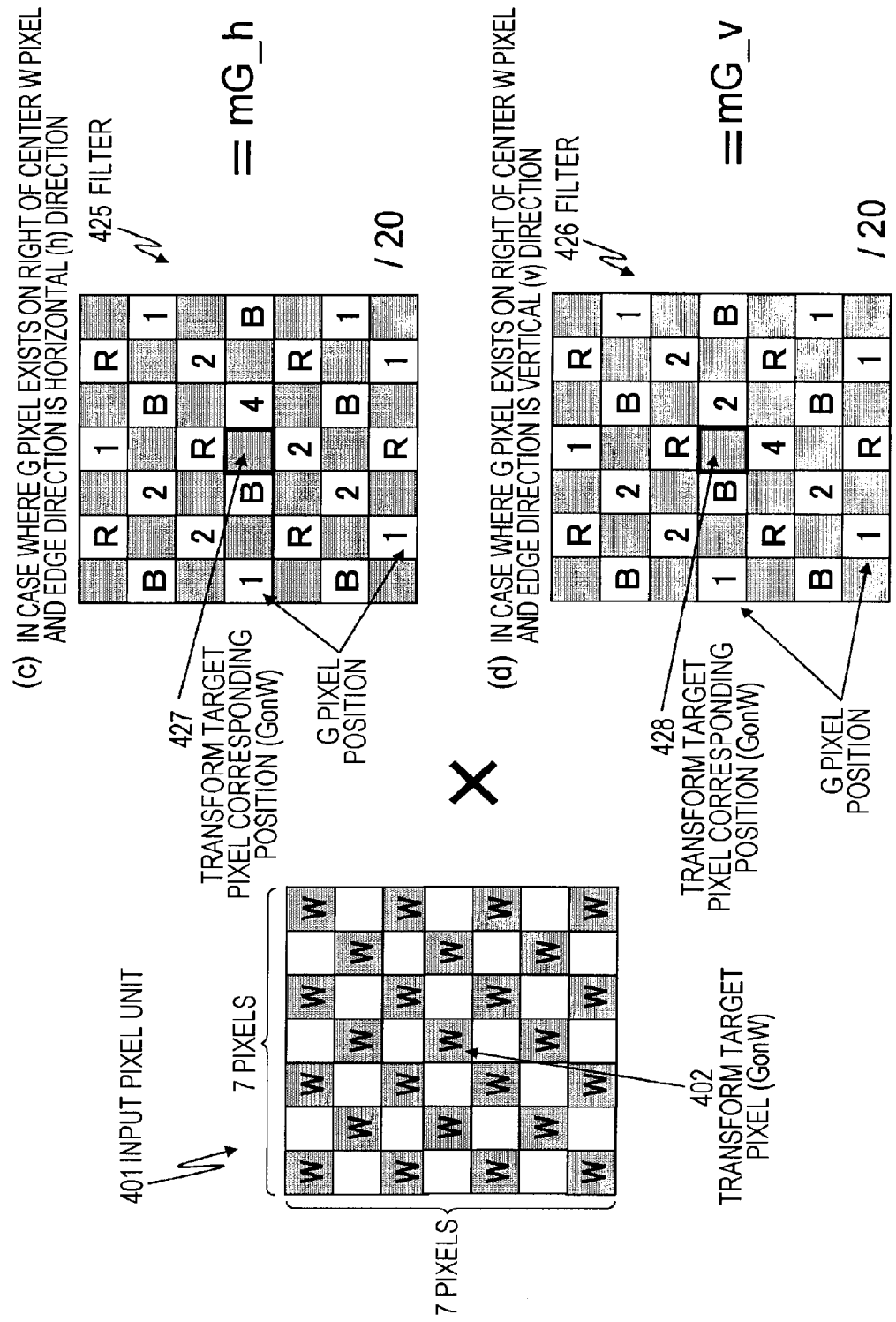
FIG. 17 is an explanatory diagram for describing the processing executed by the first pixel interpolation parameter calculation unit (GonW) 202 illustrated in FIG. 6.

To be specific, as illustrated in FIG. 16 and FIG. 17, (a) Case where the G pixel is on the left of the center W pixel in the input pixel unit 401, and the edge direction is the horizontal (h) direction (b) Case where the G pixel is on the left of the center W pixel in the input pixel unit 401, and the edge direction is the vertical (v) direction (c) Case where the G pixel is on the right of the center W pixel in the input pixel unit 401, and the edge direction is the horizontal (h) direction (d) Case where the G pixel is on the right of the center W pixel in the input pixel unit 401, and the edge direction is the vertical (v) direction In accordance with these four types of patterns, filters 421, 422, 425, and 426 illustrated in FIG. 16 and FIG. 17 are selectively used.

By applying these filters, the low frequency component mG corresponding to the input signal 401 of the 7×7 pixels is calculated. Herein, the W pixel that is the target to be transformed into the G pixel is the transform target pixel 402 located at the center of the input signal 401 of the 7×7 pixels.

(a) In a case where the G pixel is on the left of the center W pixel in the input pixel unit 401, and the edge direction is the horizontal (h) direction, by applying the filter 421 having the factor setting illustrated in FIG. 16(*a*), the low frequency component mG of the G signal_h is calculated. The pixel indicating the numeric value indicating the filter factor is the G pixel corresponding position. The center of the filter 421 is a transform target pixel corresponding position 423.

(b) In a case the G pixel is on the left of the center W pixel in the input pixel unit 401, and the edge direction is the vertical (v) direction, by applying the filter 422 having the factor setting illustrated in FIG. 16(*b*), the low frequency component mG of the G signal_v is calculated. The pixel indicating the numeric value indicating the filter factor is the G pixel corresponding position. The center of the filter 422 is a transform target pixel corresponding position 424.

(c) In a case where the G pixel is on the right of the center W pixel in the input pixel unit 401, and the edge direction is the horizontal (h) direction, by applying the filter 425 having the factor setting illustrated in FIG. 17(*c*), the low frequency component mG of the G signal_h is calculated. The pixel indicating the numeric value indicating the filter factor is the G pixel corresponding position. The center of the filter 425 is a transform target pixel corresponding position 427.

(d) In a case where the G pixel is on the right of the center W pixel in the input pixel unit 401, and the edge direction is the vertical (v) direction, by applying the filter 426 having the factor setting illustrated in FIG. 17(*d*), the low frequency component mG of the G signal_v is calculated. The pixel indicating the numeric value indicating the filter factor is the G pixel corresponding position. The center of the filter 426 is a transform target pixel corresponding position 428.

Any of the applied filters is set as a filter having such a setting that the filter factor at the G pixel corresponding position close to the transform target pixel corresponding position is the highest and the factor is decreased as being away to the surrounding. As the factors, the respective factors of (1/20 to 4/20) are set. By applying one of these filters 421, 422, 425, and 426, the low frequency component mG is calculated. The pixel value at the G pixel position in the 7×7 pixel input pixel unit 401 is multiplied by one of the filters 421, 422, 425, and 426, and the added value of the respective multiplication results is calculated as the low frequency component mG of the G signal.

It should be noted that the filter factor setting example for the filters 421, 422, 425, and 426 illustrated in FIG. 16 and FIG. 17 are examples, and filters where other filter factors are set may also be applied.

In this manner, while the 7×7 pixel area where the W pixel that is the transform target into the G pixel is the center pixel is set as the processing unit, the first pixel interpolation parameter calculation unit 202 calculates the low frequency components mW and mG of the W signal and the G signal.

Figure 18:
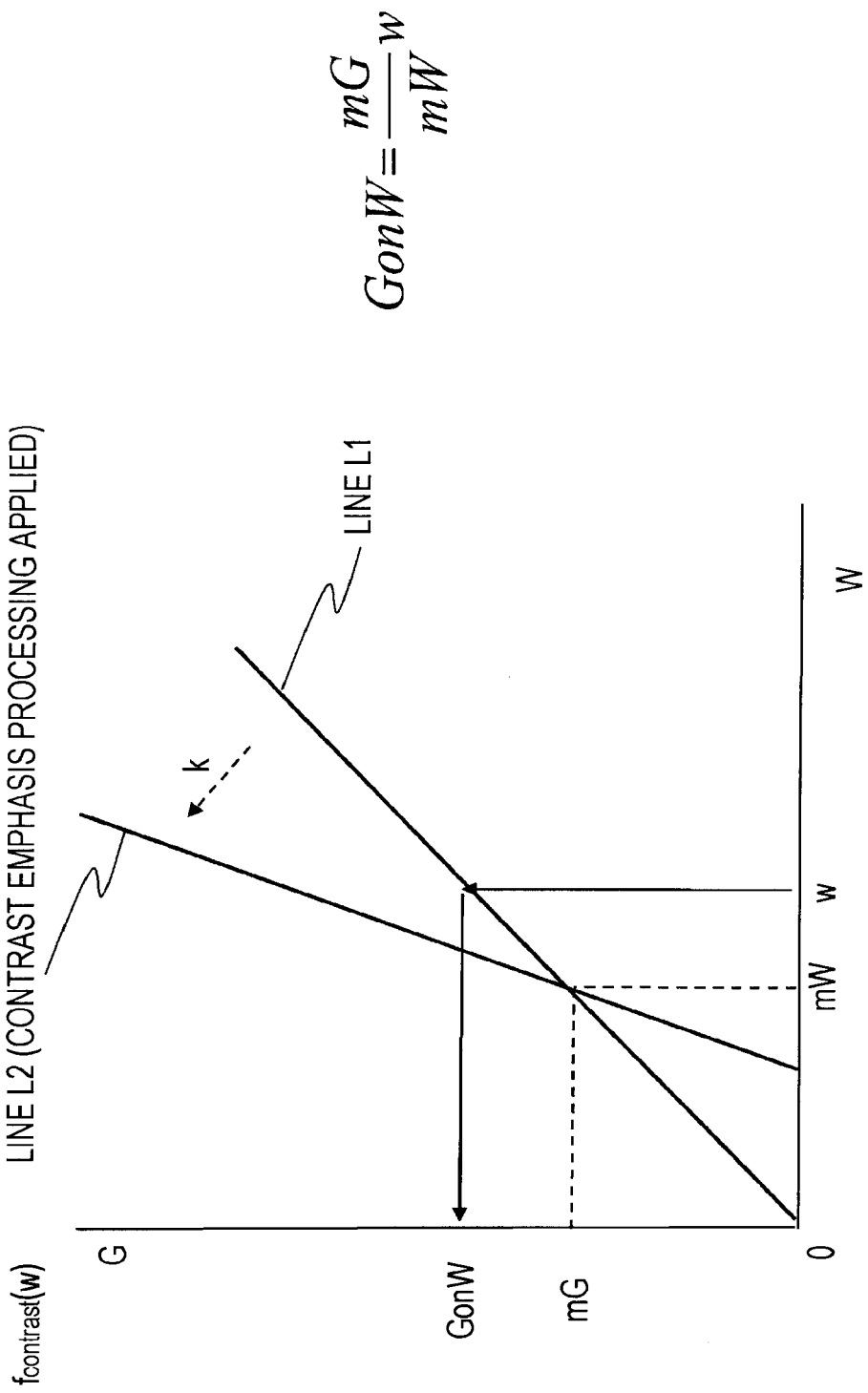
FIG. 18 is an explanatory diagram for describing the processing executed by the first pixel interpolation parameter calculation unit (GonW) 202 illustrated in FIG. 6.

It is assumed that a ratio of the thus calculated mW and mG is maintained in a local area in the image. When this assumption is followed, a correspondence relation of the pixel value ratio of W and G in the local area becomes a correspondence relation indicated by a graph of FIG. 18. In the graph of FIG. 18, the horizontal axis is the W pixel value, and the vertical axis is the G pixel value. In a particular narrow local area of the image, if this ratio of the W pixel value and the G pixel value is constant, it is possible to assume that a proportional relation like a straight line (line L1) illustrated in FIG. 18 is established.

When this assumption is followed, in a case where a pixel value of the center W pixel in the input pixel unit 401, that is, the W signal at the transform target pixel position is set as w, a pixel value GonW of the G signal that should be set at the transform target pixel position can be calculated while following the expression below.

$$GonW = (mG/mW)w$$

This is a pixel value estimation method while it is assumed that the ratio of the W pixel value and the G pixel value is constant.

It should be noted that mW is the low frequency component mW of the W signal calculated through the processing described with reference to FIG. 15.

mG is the low frequency component mG of the G signal calculated through the processing described with reference to FIG. 16 and FIG. 17. For mG, different values are applied in accordance with the configuration in the input pixel unit 401 and the edge direction.

A straight line illustrated in FIG. 18 (line L1) is a line based on the assumption that the ratio of the W pixel value and the G pixel value is constant in the local area. In a case where a contrast emphasis processing is executed at the time of the pixel value transform processing, a line like a straight line (line L2) illustrated in FIG. 18 may also be applied. k is a contrast emphasis processing adjustment parameter.

The pixel value of the G pixel set for the transform target W pixel in a case where the contrast emphasis processing is applied is calculated as follows.

The pixel value of the W signal at the transform target pixel position is set as w, and the pixel value of the G signal that should be set at the transform target pixel position is set as GonW. The G pixel value GonW after the transform can be calculated while following the expression.

$$GonW = f_{contrast}(mG, mW, w, k)$$

$$f_{contrast}(mG, mW, w, k) = k(mG/mW)(w - mW) + mG$$

$$\ldots (\geq 0) = 0 \ldots (< 0)$$

It should be noted that k is the contrast emphasis processing adjustment parameter (no contrast emphasis when k=1).

mW is the low frequency component mW of the W signal calculated through the processing described with reference to FIG. 15.

mG is the low frequency component mG of the G signal calculated through the processing described with reference to FIG. 16 and FIG. 17. For mG, different values (mG_h, mG_v) are applied in accordance with the configuration in the input pixel unit 401 and the edge direction.

The first pixel interpolation parameter calculation unit 202 calculates the following parameters as the interpolation parameters applied to transform the W pixel in the RGBW pattern into the G pixel.

$$GonW(H) = (mG\_h/mW)w \quad (a)$$

$$GonW(V) = (mG\_v/mW)w \quad (b)$$

$$GonWn(H) = (mG\_h/mW)w \quad (c)$$

$$GonWn(V) = (mG\_v/mW)w \quad (d)$$

It should be noted that $$GonW(H) = (mG\_h/mW)w \quad (a)$$

$$GonW(V) = (mG\_v/mW)w \quad (b)$$

they are values to be calculated by applying the contrast emphasis.

On the other hand, $$GonWn(H) = (mG\_h/mW)w \quad (c)$$

$$GonWn(V) = (mG\_v/mW)w \quad (d)$$

they are values to be calculated without applying the contrast emphasis.

The first pixel interpolation parameter calculation unit 202 calculates these interpolation parameters to be output to the blend processing unit 211.

The blend processing unit executes the blend processing where these parameters are applied and decides the final G pixel value, that is, the G pixel value set at the W pixel position in the RGBW pattern. This blend processing will be described below.

It should be noted that the first pixel interpolation parameter calculation unit (GonW) 202 performs the processing while the 7×7 or 5×5 pixel area is set as the processing unit (input pixel unit) as described above. The above-described explanation is on the explanation on the case where the processing is performed while the 7×7 pixel area is set as the processing unit (input pixel unit), but in a case where the processing is performed while the 5×5 pixel area is set as the processing unit (input pixel unit), the settings on the filters applied to the calculation for the low frequency component mW of the W signal and the calculation for the low frequency component mG of the G signal vary, Configuration examples of the filters applied to the calculation of the calculation for the low frequency component mW of the W signal and the calculation for the low frequency component mG of the G signal in a case where the processing is performed while the 5×5 pixel area is set as the processing unit (input pixel unit) will be described with reference to FIG. 19 to FIG. 21.

Figure 19:
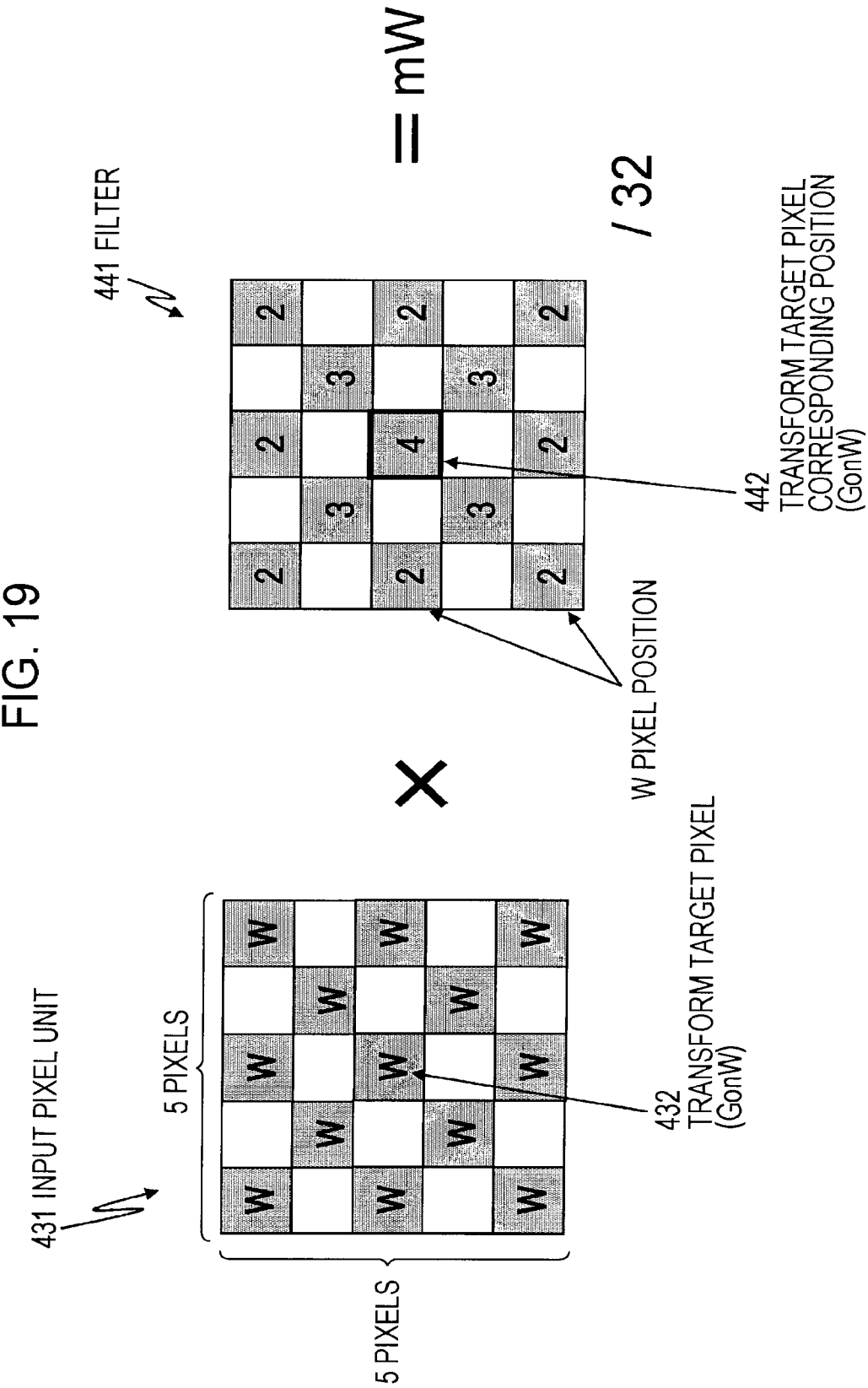
FIG. 19 is an explanatory diagram for describing the processing executed by the first pixel interpolation parameter calculation unit (GonW) 202 illustrated in FIG. 6.

As illustrated in FIG. 19, by applying a filter 441 illustrated in FIG. 19 to an input pixel unit 431 of the 5×5 pixels, the low frequency component mW corresponding to the input pixel unit 431 of the 5×5 pixels is calculated. The W pixel that becomes the target to be transformed into the G pixel is a transform target pixel 432 located at the center in the input pixel unit 431 of the 5×5 pixels. In the input pixel unit 431 illustrated in FIG. 19, the pixel represented by gray is the W pixel. Others are RGB pixels. Similarly, in the filter 441 illustrated in FIG. 19, the pixel represented by gray is the W pixel corresponding position. Others are RGB pixel corresponding positions.

The filter 441 is a filter having such a setting that the filter factor of a transform target pixel corresponding position 442 is the highest and the factor is decreased as being away to the surrounding. As the factors, the respective factors of (4/32 to 1/32) are set. By applying this filter 441, the low frequency component mW is calculated. The pixel value at the W pixel position in the input pixel unit 431 of the 5×5 pixels is multiplied by the filter factor at the corresponding pixel position for the filter 441, and the added value of the respective multiplication results is calculated as the low frequency component mW of the W signal.

It should be noted that the filter factor setting example for the filter 411 illustrated in FIG. 19 is an example, and a filter where another filter factor is set may also be applied. Other than the filter example illustrated in FIG. 19, for example, it is also possible to use another smoothing filter having a low-pass characteristic.

Next, with reference to FIG. 20 and FIG. 21, the calculation processing for the low frequency component mG of the G signal will be described.

Figure 20:
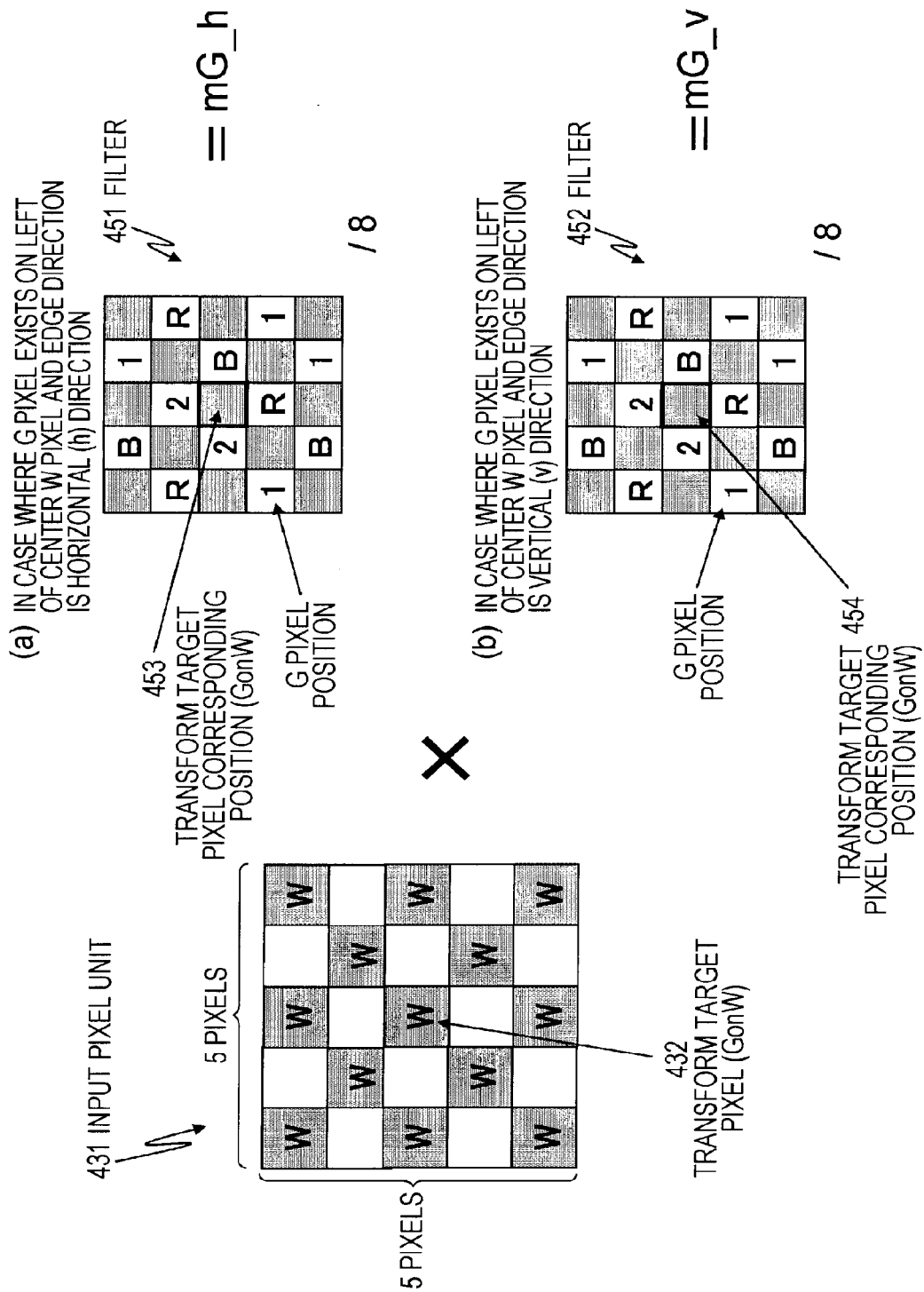
FIG. 20 is an explanatory diagram for describing the processing executed by the first pixel interpolation parameter calculation unit (GonW) 202 illustrated in FIG. 6.

(a) In a case where the G pixel is on the left of the center W pixel in the input pixel unit 431, and the edge direction is the horizontal (h) direction, by applying a filter 451 having a factor setting illustrated in FIG. 20(*a*), the low frequency component mG of the G signal_h is calculated. The pixel indicating the numeric value indicating the filter factor is the G pixel corresponding position. The center of the film 451 is a transform target pixel corresponding position 453.

(b) In a case where the G pixel is on the left of the center W pixel in the input pixel unit 431, and the edge direction is the vertical (v) direction, by applying a filter 452 having a factor setting illustrated in FIG. 20(*b*), the low frequency component mG of the G signal_v is calculated. The pixel indicating the numeric value indicating the filter factor is the G pixel corresponding position. The center of the film 452 is a transform target pixel corresponding position 454.

Figure 21:
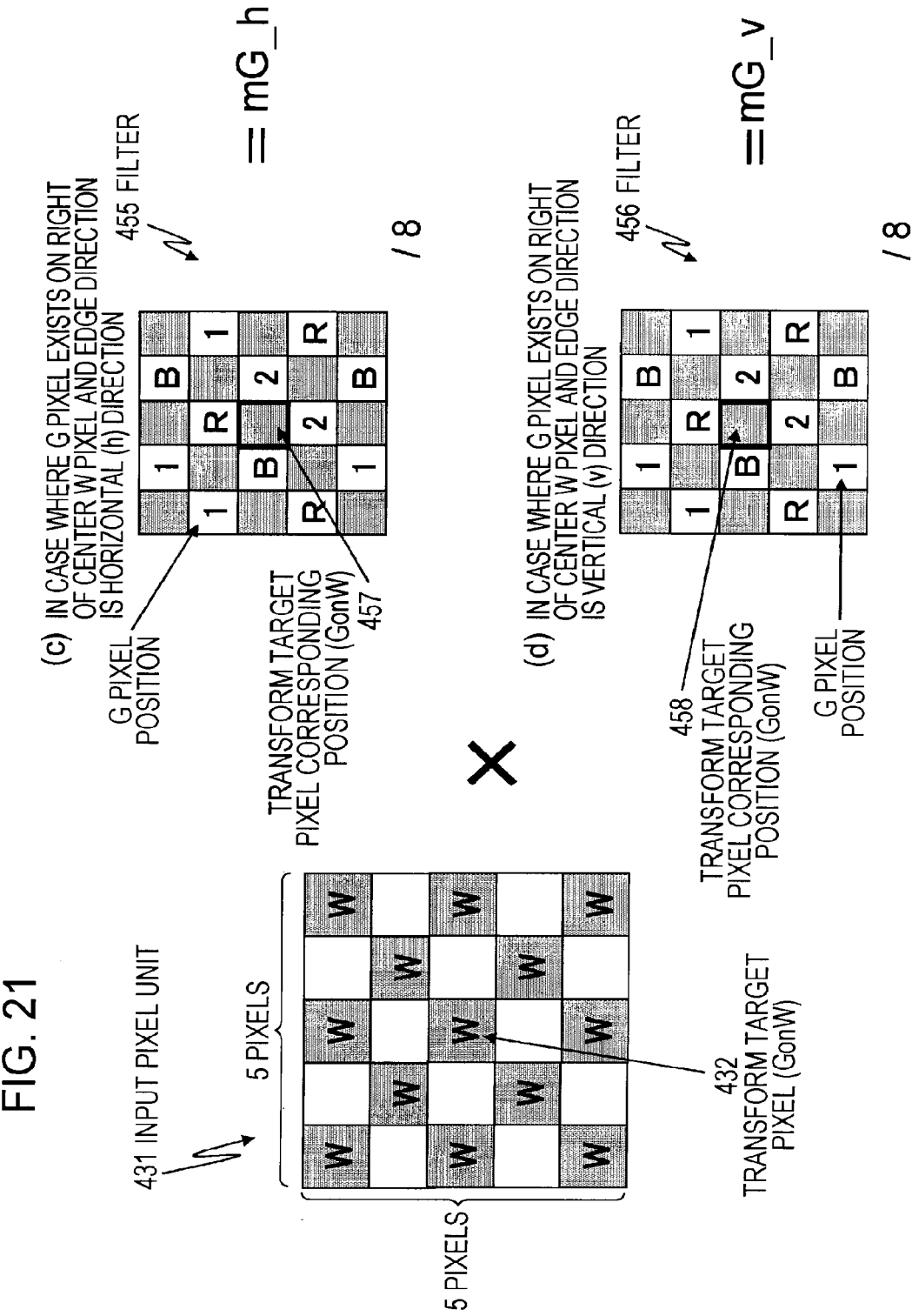
FIG. 21 is an explanatory diagram for describing the processing executed by the first pixel interpolation parameter calculation unit (GonW) 202 illustrated in FIG. 6.

(c) In a case where the G pixel is on the right of the center W pixel in the input pixel unit 431, and the edge direction is the horizontal (h) direction, by applying a filter 455 having a factor setting illustrated in FIG. 21(*c*), the low frequency component mG of the G signal_h is calculated. The pixel indicating the numeric value indicating the filter factor is the G pixel corresponding position. The center of the film 455 is a transform target pixel corresponding position 457.

(d) In a case where the G pixel is on the right of the center W pixel in the input pixel unit 431, and the edge direction is the vertical (v) direction, by applying a filter having a factor 456 setting illustrated in FIG. 21(*d*), the low frequency component mG of the G signal_v is calculated. The pixel indicating the numeric value indicating the filter factor is the G pixel corresponding position. The center of the film 456 is a transform target pixel corresponding position 458.

Any of the applied filters is set as a filter having such a setting that the filter factor at the G pixel corresponding position close to the transform target pixel corresponding position is the highest and the factor is decreased as being away to the surrounding. As the factors, the respective factors of (1/8 to 2/8) are set. By applying one of these filters 451, 452, 455, and 456, the low frequency component mG is calculated. The pixel value at the G pixel position in the input pixel unit 431 of the 5×5 pixels is multiplied by one of the filter factors of the filters 451, 452, 455, and 456, and the added value of the respective multiplication results is calculated as the low frequency component mG of the G signal.

It should be noted that the filter factor setting examples for the filters 451, 452, 455, and 456 illustrated in FIG. 20 and FIG. 21 are examples, and filters where other filter factors are set may also be applied.

In a case where the 5×5 pixel area is set as the processing unit, in this manner, while the 5×5 pixel area where the W pixel that is the transform target into the G pixel is the center pixel is set as the processing unit, the first pixel interpolation parameter calculation unit 202 calculates W the low frequency components mW and mG of the W signal and the G signal.

A processing after calculating the low frequency components mW and mG of the W signal and the G signal, the above-mentioned is similar to a case of using the 7×7 pixel area. That is, the first pixel interpolation parameter calculation unit 202 calculates the following parameters as the interpolation parameters applied to transform the W pixel in the RGBW pattern into the G pixel.

$$GonW(H)=(mG\_h/mW)w \qquad (a)$$

$$GonW(V)=(mG\_v/mW)w \qquad (b)$$

$$GonWn(H)=(mG\_h/mW)w \qquad (c)$$

$$GonWn(V)=(mG\_v/mW)w \qquad (d)$$

(3-4-2. Processing by the First Temporary Pixel Setting Unit (RBonWaroundG) 203)

Next, a processing by the first temporary pixel setting unit (RBonWaroundG) 203 will be described. As will be understood from the configuration diagram illustrated in FIG. 6, the first temporary pixel setting unit (RBonWaroundG) 203 is set in a prior stage to the second pixel interpolation parameter calculation unit (RBonGofHV) 204 and the third pixel interpolation parameter calculation unit (RBonGofAD) 205.

The second pixel interpolation parameter calculation unit (RBonGofHV) 204 and the third pixel interpolation parameter calculation unit (RBonGofAD) 205 both calculate parameters for transforming the G pixel into the R or B pixel. Prior to these processings, the first temporary pixel setting unit (RBonWaroundG) 203 executes a processing of transforming a W pixel position adjacent to RB pixels into a temporary R pixel (R') or B pixel (B').

The first temporary pixel setting unit (RBonWaroundG) 203, first, obtains the low frequency component mW of the W signal in the 5×5 pixel area of the processing unit, the low frequency component R' of the R signal, and the low frequency component B' of the B signal.

Figure 22:
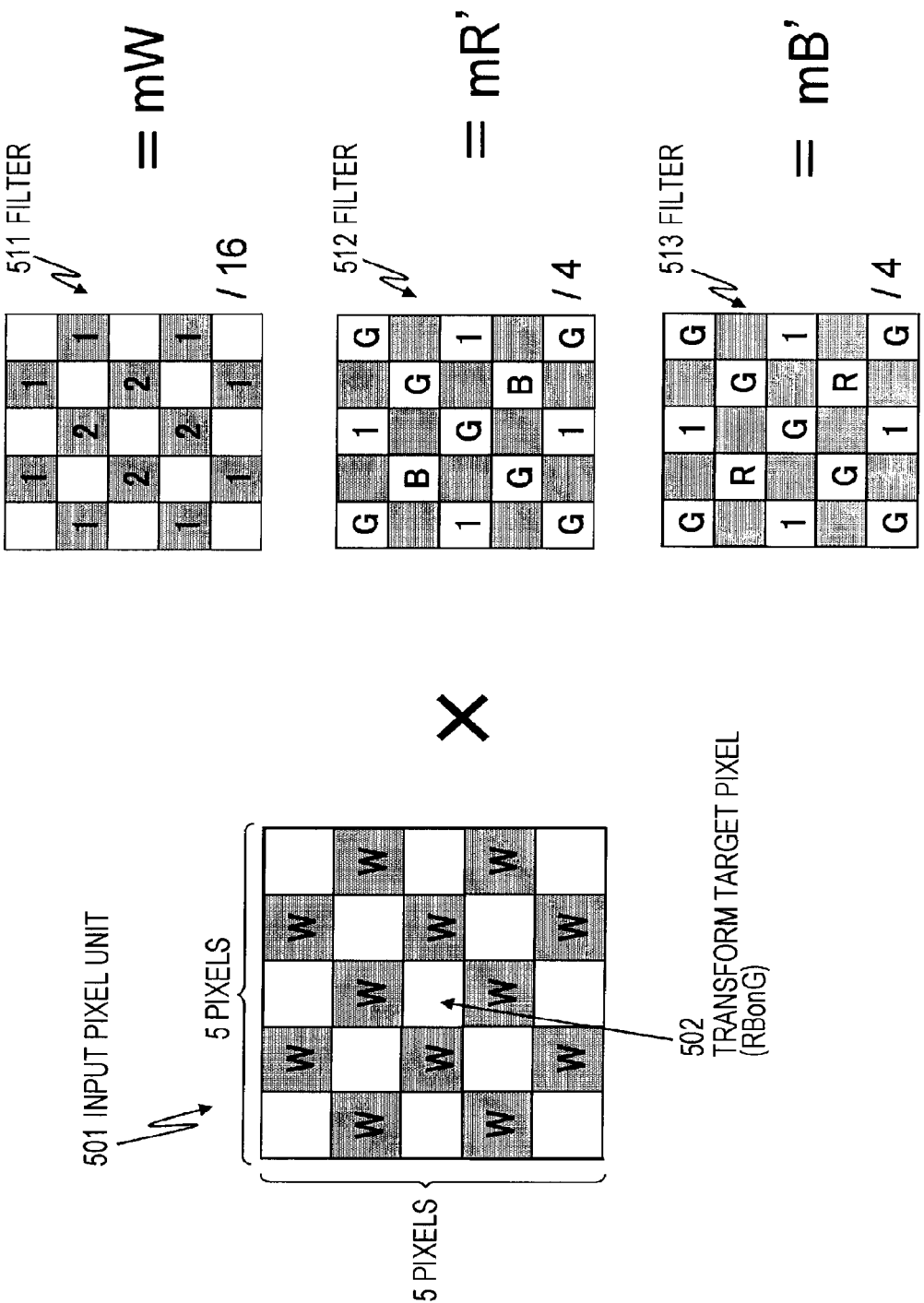
FIG. 22 is an explanatory diagram for describing a processing executed by a first temporary pixel setting unit (RBonWaroundG) 203 illustrated in FIG. 6.

As illustrated in FIG. 22, by applying filters 511 to 513 illustrated in FIG. 22 to an input pixel unit 501 of the 5×5 pixels, the low frequency component mW of the W signal, the low frequency component R' of the R signal, and the low frequency component B' of the B signal corresponding to the input pixel unit 501 of the 5×5 pixels are obtained. The center pixel in the input pixel unit 501 of the 5×5 pixels is the transform target pixel. In this case, the input pixel unit 501 is the input with respect to the second pixel interpolation parameter calculation unit (RBonGofHV) 204 and the third pixel interpolation parameter calculation unit (RBonGofAD) 205 and they are the processing units that calculate the parameters for transforming the G pixel into the R or B pixel, and thus the center pixel in the input pixel unit 501 is the G pixel.

In the filter 511, a factor setting unit is the W pixel corresponding position, and as the factors, the respective factors of (1/16 to 2/16) are set. The pixel value at the W pixel position in the input pixel unit 501 of the 5×5 pixels is multiplied by the filter factor at the corresponding pixel position for the filter 511, and the added value of the respective multiplication results is calculated as the low frequency component mW of the W signal.

In the filter 512, the factor setting unit is the R pixel corresponding position, and as the factors, the respective factors of (1/4) are set. The pixel value at the R pixel position in the input pixel unit 501 of the 5×5 pixels is multiplied by the filter factor at the corresponding pixel position for the filter 512, and the added value of the respective multiplication results is calculated as the low frequency component mR' of the R signal.

In the filter 513, the factor setting unit is the B pixel corresponding position, and as the factors, the respective factors of (1/4) are set. The pixel value at the B pixel position in the input pixel unit 501 of the 5×5 pixels is multiplied by the filter factor at the corresponding pixel position for the filter 513, and the added value of the respective multiplication results is calculated as the low frequency component mB' of the B signal.

Figure 23:
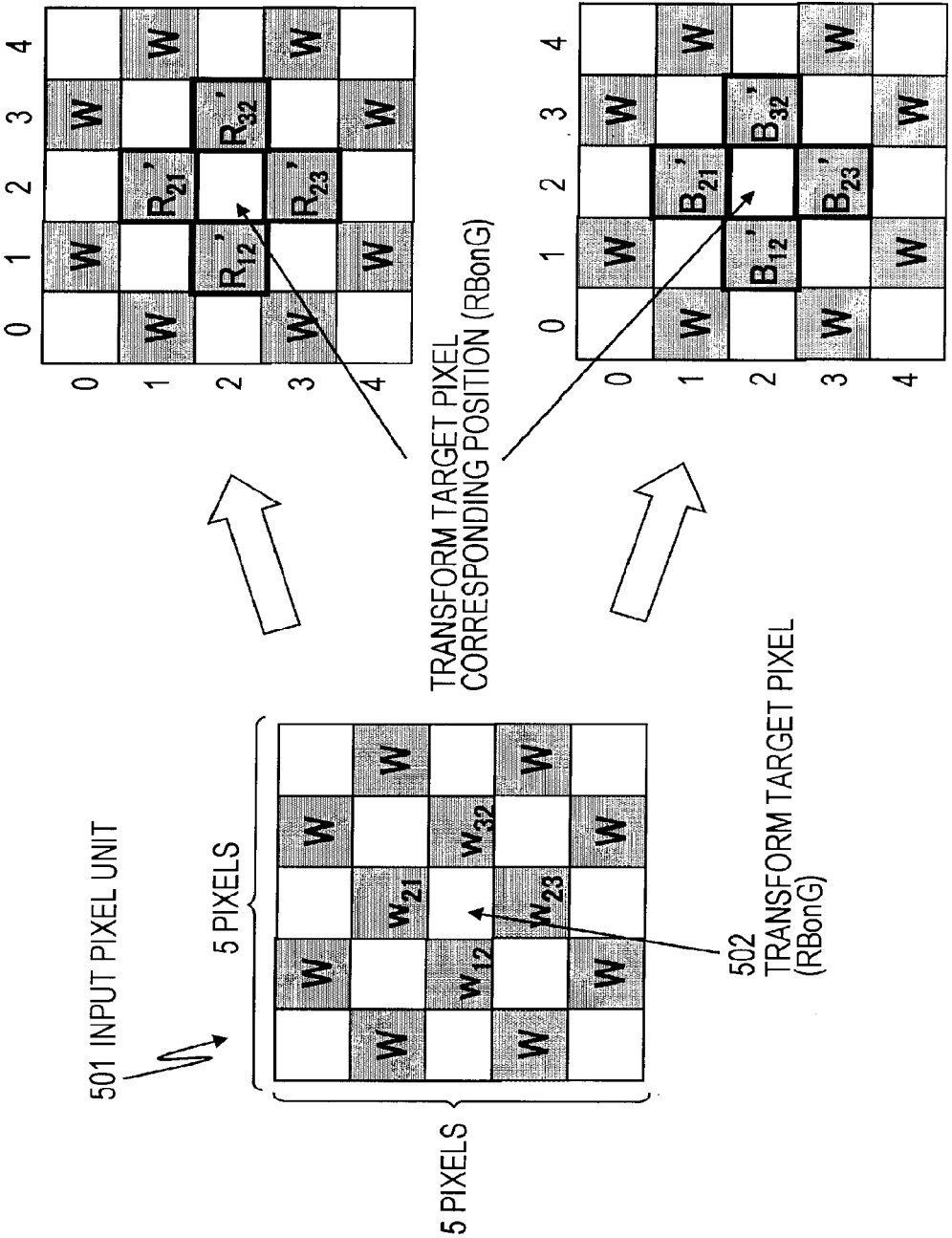
FIG. 23 is an explanatory diagram for describing the processing executed by the first temporary pixel setting unit (RBonWaroundG) 203 illustrated in FIG. 6.

Next, the first temporary pixel setting unit (RBonWaroundG) 203 estimates, as illustrated in FIG. 23, the R pixel value and the B pixel value at the W pixel positions adjacent in the surrounding of the transform target pixel 502 located at the center in the input pixel unit 501 of the 5×5 pixels.

As illustrated in FIG. 23, the number of the W pixel positions adjacent in the surrounding of the transform target pixel 502 located at the center in the input pixel unit 501 of the 5×5 pixels is 4. The R pixel value and the B pixel value at these W pixel positions are estimated. As previously described with reference to FIG. 18, the estimation processing is performed on the basis of the assumption that the ratio of mW and mR' or mW and mB' is maintained in the local area in the image.

On the basis of such an assumption, the R pixel values ($R_{xy}'=R_{12}'$, $R_{21}'$, $R_{32}'$, and $R_{23}'$) at the W pixel positions adjacent in the surrounding of the transform target pixel 502 located at the center in the input pixel unit 501 of the 5×5 pixels illustrated in FIG. 23 can be estimated as follows.

$$R_{12}'=(mR'/mW)w_{12},$$

$$R_{21}'=(mR'/mW)w_{21},$$

$$R_{32}'=(mR'/mW)w_{32},$$

$$R_{23}'=(mR'/mW)w_{23},$$

It should be noted that $w_{12}$, $w_{21}$, $w_{32}$, and $w_{23}$ are the W pixel values at the W pixel positions adjacent in the surrounding of the transform target pixel 502 located at the center in the input pixel unit 501 of the 5×5 pixels illustrated in the drawing.

Similarly, the B pixel values ($B_{xy}'=B_{12}'$, $B_{21}'$, $B_{32}'$, and $B_{23}'$) at the W pixel positions adjacent in the surrounding of the transform target pixel 502 located at the center in the input pixel unit 501 of the 5×5 pixels illustrated in FIG. 23 can be estimated as follows.

$$B_{12}'=(mB'/mW)w_{12},$$

$$B_{21}'=(mB'/mW)w_{21},$$

$$B_{32}'=(mB'/mW)w_{32},$$

$$B_{23}'=(mB'/mW)w_{23},$$

It should be noted that $w_{12}$, $w_{21}$, $w_{32}$, and $w_{23}$ are the W pixel values at the W pixel positions adjacent in the surrounding of the transform target pixel 502 located at the center in the input pixel unit 501 of the 5×5 pixels illustrated in the drawing.

In this manner, the first temporary pixel setting unit (RBonWaroundG) 203 estimates the R pixel value and the B pixel value at the W pixel positions adjacent in the surrounding of the transform target pixel 502 located at the center in the input pixel unit 501 of the 5×5 pixels and provides these to the second pixel interpolation parameter calculation unit (RBonGofHV) 204 and the third pixel interpolation parameter calculation unit (RBonGofAD) 205.

(3-4-3. Processing by the Second Pixel Interpolation Parameter Calculation Unit (RBonGofHV) 204)

Next, a processing by the second pixel interpolation parameter calculation unit (RBonGofHV) 204 will be described. The second pixel interpolation parameter calculation unit (RBonGofHV) 204 calculates the parameter corresponding to the vertical or horizontal edge as the parameter applied to the processing of transforming the G pixel into the R pixel or the B pixel.

The edge detection unit 209 generates, as described above, dirH: Horizontal gradient information
dirV: Vertical gradient information
dirA: Diagonally up right direction gradient information
dirD: Diagonally up left direction gradient information these pieces of edge information (dirH, dirV, dirA, and dirD) as the edge information corresponding to the respective pixels. The second pixel interpolation parameter calculation unit (RBonGofHV) 204 inputs these pieces of edge information corresponding to the G pixel that is set as the transform target.

The second pixel interpolation parameter calculation unit (RBonGofHV) 204 compares dirH and dirV of the edge information (dirH, dirV, dirA, and dirD) in the four directions corresponding to the G pixel that is set as the transform target to calculate the parameters corresponding to the vertical or horizontal edge in accordance with the comparison result. The parameters to be calculated are interpolation parameters for transforming the G pixel into the R pixel or the B pixel.

The second pixel interpolation parameter calculation unit (RBonGofHV) 204, first, calculates the low frequency component mW of the W signal, the low frequency component mR of the R signal, and the low frequency component mB of the B signal in the 5×5 pixel area that is the processing unit. These calculation processings will be described with reference to FIG. 24.

As illustrated in FIG. 24, by applying a filter 521 illustrated in FIG. 24 to the input pixel unit 501 of the 5×5 pixels, the low frequency component mW of the W signal corresponding to the input pixel unit 501 of the 5×5 pixels is calculated. Herein, the G pixel that becomes the target to be transformed into the R or B pixel is the transform target pixel 502 located at the center in the input pixel unit 501 of the 5×5 pixels. It should be noted that this processing is the same as the processing by the first temporary pixel setting unit (RBonWaroundG) 203 previously described with reference to FIG. 22. Therefore, a setting may be used that the low frequency component mW of the W signal calculated by the first temporary pixel setting unit (RBonWaroundG) 203 is received.

The second pixel interpolation parameter calculation unit (RBonGofHV) 204 calculates, furthermore, the low frequency component mR of the R signal, and the low frequency component mB of the B signal in the 5×5 pixel area of the processing unit. In this processing, the estimate values of the R pixel value and the B pixel value at the W pixel positions adjacent in the surrounding of the transform target pixel 502 located at the center in the input pixel unit 501 of the 5×5 pixels calculated by the first temporary pixel setting unit (RBonWaroundG) 203 are utilized.

By applying a filter 522 illustrated in FIG. 24 to the data 502 where the R pixel value estimation value calculated by the first temporary pixel setting unit (RBonWaroundG) 203 is set, the low frequency component mR of the R signal corresponding to the input pixel unit 501 of the 5×5 pixels is calculated.

In the filter 522, (3/16 to 1/16) are set as the filter factors. The setting location for the factor (1/16) corresponds to the R pixel position in the original input pixel unit 501 of the 5×5 pixels. The setting position for the factor (3/16) corresponds to the W pixel position in the original input pixel unit 501 of the 5×5 pixels and corresponds to the position where the R pixel value is estimated by the first temporary pixel setting unit (RBonWaroundG) 203.

Similarly, by applying a filter 523 illustrated in FIG. 24 to data 503 where the B pixel value estimated value calculated by the first temporary pixel setting unit (RBonWaroundG) 203 is set, the low frequency component mB of the B signal corresponding to the input pixel unit 501 of the 5×5 pixels is calculated.

In the filter 522, (3/16 to 1/16) are set as the filter factors. The setting location for the factor (1/16) corresponds to the B pixel position in the original input pixel unit 501 of the 5×5 pixels. The setting position for the factor (3/16) corresponds to the W pixel position in the original input pixel unit 501 of the 5×5 pixels and corresponds to the position where the B pixel value is estimated by the first temporary pixel setting unit (RBonWaroundG) 203.

The second pixel interpolation parameter calculation unit (RBonGofHV) 204 obtains, in this manner, the low frequency component mW of the W signal, the low frequency component mR of the R signal, and the low frequency component mB of the B signal in the 5×5 pixel area of the processing unit.

Next, the second pixel interpolation parameter calculation unit (RBonGofHV) 204 estimates the W pixel value of the transform target pixel 502 located at the center position in the input pixel unit 501 of the 5×5 pixels in accordance with the edge direction in the input pixel unit 501 of the 5×5 pixels. The edge direction information is input from the edge detection unit 209.

By comparing a magnitude between dirH (horizontal gradient information) and dirV (vertical gradient information) input from the edge detection unit 209, it is determined whether the edge direction in the input pixel unit 501 of the 5×5 pixels is the horizontal direction or the vertical direction, or the flat area where the edge direction cannot be identified. For example, the determination processing is performed by utilizing the previously set threshold. It should be noted that the transform target pixel 502 located at the center position in the input pixel unit 501 of the 5×5 pixels is originally the G pixel.

A processing of estimating the W pixel value of the transform target pixel 502 located at the center position in the input pixel unit 501 of the 5×5 pixels will be described with reference to FIG. 25.

In a case where the edge direction in the input pixel unit 501 of the 5×5 pixels is the horizontal direction, as illustrated in FIG. 25(a), by applying a filter 531, an average of the pixel values of the two W pixels horizontally adjacent to the transform target pixel 502 at the center position is calculated to be set as a W pixel value (W_h) of the transform target pixel 502.

In a case where the edge direction in the input pixel unit 501 of the 5×5 pixels is the vertical direction, as illustrated in FIG. 25(b), by applying a filter 532, an average of the pixel values of the two W pixels vertically adjacent to the transform target pixel 502 at the center position is calculated to be set as a W pixel value (W_v) of the transform target pixel 502.

In a case where the input pixel unit 501 of the 5×5 pixels is the flat area, as illustrated in FIG. 25(c), by applying a filter 533, an average of the pixel values of the four W pixels vertically and horizontally adjacent to the transform target pixel 502 at the center position is calculated to be set as a W pixel value (W_n) of the transform target pixel 502.

Figure 25:
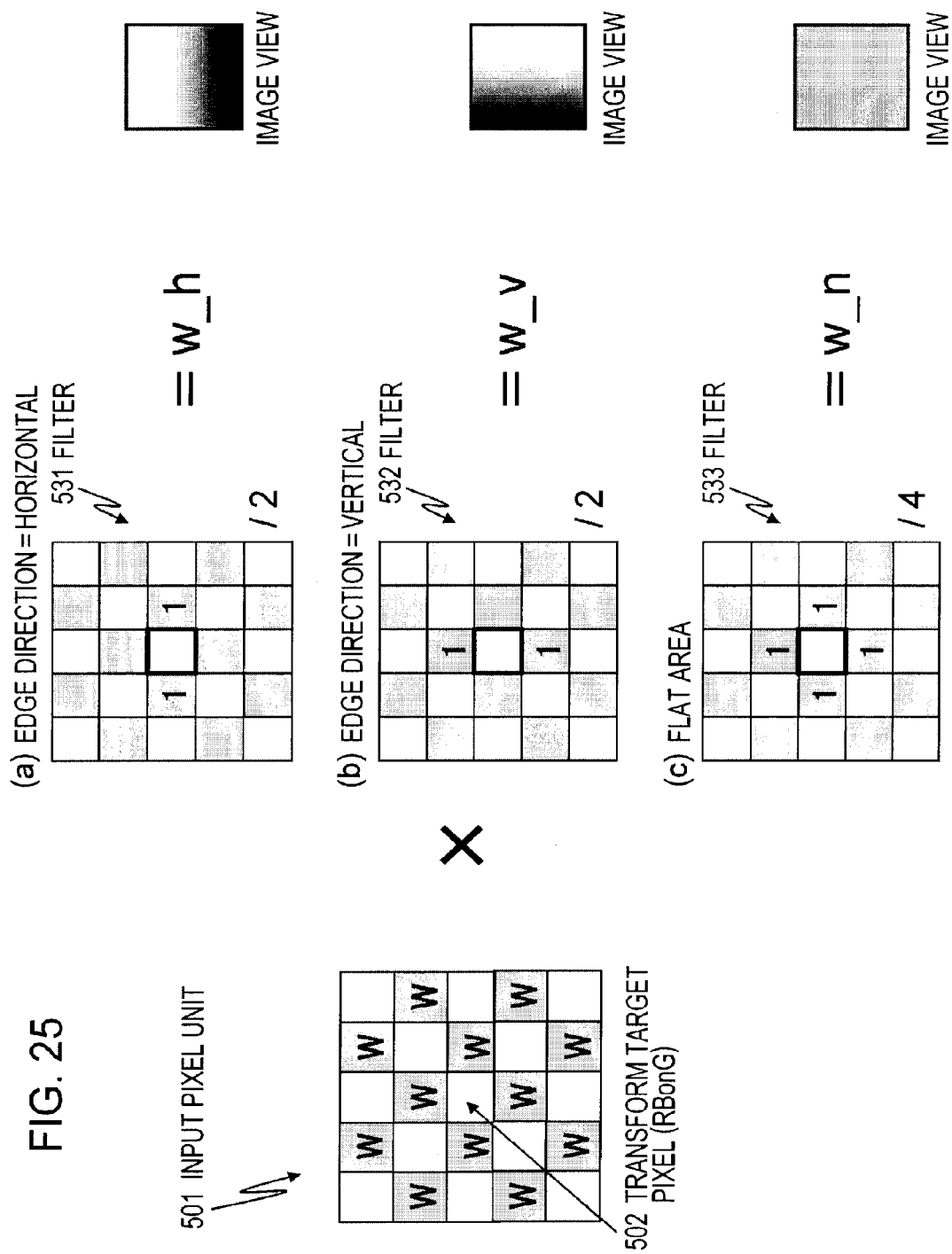
FIG. 25 is an explanatory diagram for describing the processing executed by the second pixel interpolation parameter calculation unit (RBonGofHV) 204 illustrated in FIG. 6.

It should be noted that on the right end of FIG. 25, an image view representing an edge example in the input pixel unit 501 of the 5×5 pixels which becomes the processing target is illustrated.

Next, the second pixel interpolation parameter calculation unit (RBonGofHV) 204 calculates the parameter corresponding to the vertical or horizontal edge as the parameter applied to the processing of transforming the G pixel into the R pixel or the B pixel.

First, the following parameters are calculated as the parameters applied to the processing of transforming the G pixel into the R pixel.

$RonG(H) = (mR/mW)(w\_h)$ $RonG(V) = (mR/mW)(w\_v)$ $RonGn = (mR/mW)(w\_n)$

These parameters are output to the blend processing unit 211, subjected to the blend processing in accordance with the edge state in the blend processing unit 211, and applied to the processing of deciding the R pixel value when the G pixel position that is the transform target pixel 502 located at the center position in the input pixel unit 501 of the 5×5 pixels is transformed into the R pixel. The processing by the blend processing unit 211 will be described in a later stage.

The following parameters are calculated as the parameters applied to the processing of transforming the G pixel into the B pixel.

$BonG(H) = (mB/mW)(w\_h)$ $BonG(V) = (mB/mW)(w\_v)$ $BonGn = (mB/mW)(w\_n)$

These parameters are output to the blend processing unit 211, subjected to the blend processing in accordance with the edge state in the blend processing unit 211, and applied to the processing of deciding the B pixel value when the G pixel position that is the transform target pixel 502 located at the center position in the input pixel unit 501 of the 5×5 pixels is transformed into the B pixel.

The second pixel interpolation parameter calculation unit (RBonGofHV) 204 calculates, in this manner, the parameters corresponding to the vertical or horizontal edge as the parameters applied to the processing of transforming the G pixel into the R pixel or the B pixel, that is, $RonG(H)=(mR/mW)(w\_h)$ $RonG(V)=(mR/mW)(w\_v)$ $RonGn=(mR/mW)(w\_n)$ $BonG(H)=(mB/mW)(w\_h)$ $BonG(V)=(mB/mW)(w\_v)$ $BonGn=(mB/mW)(w\_n)$ these parameters to be output to the blend processing unit 211.

(3-4-4. Processing by the Third Pixel Interpolation Parameter Calculation Unit (RBonGofAD) 205)

Next, a processing by the third pixel interpolation parameter calculation unit (RBonGofAD) 205 will be described. The third pixel interpolation parameter calculation unit (RBonGofAD) 205 calculates the parameter corresponding to the diagonal edge as the parameter applied to the processing of transforming the G pixel into the R pixel or the B pixel.

The edge detection unit 209 generates, as described above, dirH: Horizontal gradient information
dirV: Vertical gradient information
dirA: Diagonally up right direction gradient information
dirD: Diagonally up left direction gradient information these pieces of edge information (dirH, dirV, dirA, and dirD) as the edge information corresponding to the respective pixels. The third pixel interpolation parameter calculation unit (RBonGofAD) 205 inputs these pieces of edge information corresponding to the G pixel that is set as the transform target.

The third pixel interpolation parameter calculation unit (RBonGofAD) 205 compares dirA and dirD of the edge information (dirH, dirV, dirA, and dirD) in the four directions corresponding to the G pixel that is set as the transform target and executes a different processing in accordance with the comparison result to calculate the parameters corresponding to the diagonal edge. The parameters to be calculated are interpolation parameters for transforming the G pixel into the R pixel or the B pixel.

The third pixel interpolation parameter calculation unit (RBonGofAD) 205, first, obtains the low frequency component mW of the W signal, the low frequency component mR of the R signal, and the low frequency component mB of the B signal in the 5×5 pixel area of the processing unit. These calculation processings are similar to those by the second pixel interpolation parameter calculation unit (RBonGofHV) 204 and are the same as the processings previously described with reference to FIG. 24, and therefore the description will be omitted.

The third pixel interpolation parameter calculation unit (RBonGofAD) 205 estimates the W pixel value of the transform target pixel 502 located at the center position in the input pixel unit 501 of the 5×5 pixels in accordance with the edge direction in the input pixel unit 501 of the 5×5 pixels. The edge direction information is input from the edge detection unit 209.

By comparing a magnitude dirA (diagonally up right direction gradient information) and dirD (diagonally up left direction gradient information) between input from the edge detection unit 209, it is determined whether the edge direction in the input pixel unit 501 of the 5×5 pixels is the diagonally up right direction or diagonally up left direction, or the flat area where the edge direction cannot be identified. For example, the determination processing is performed by utilizing the previously set threshold. It should be noted that the transform target pixel 502 located at the center position in the input pixel unit 501 of the 5×5 pixels is originally the G pixel.

A processing of estimating the W pixel value of the transform target pixel 502 located at the center position in the input pixel unit 501 of the 5×5 pixels will be described with reference to FIG. 26.

In a case where the edge direction in the input pixel unit 501 of the 5×5 pixels is the diagonally up left direction, as illustrated in FIG. 26(a), by applying a filter 541, by applying the pixel values of the eight W pixels from the diagonally up left to the diagonally down right direction of the transform target pixel 502 at the center position, the W pixel value of the transform target pixel 502(W_d) is set.

In a case where the edge direction in the input pixel unit 501 of the 5×5 pixels is the diagonally up right direction, as illustrated in FIG. 26(b), by applying a filter 542, by applying the pixel values of the eight W pixels from the diagonally up right to the diagonally down left direction of the transform target pixel 502 at the center position, the W pixel value of the transform target pixel 502(W_a) is set.

Figure 26:
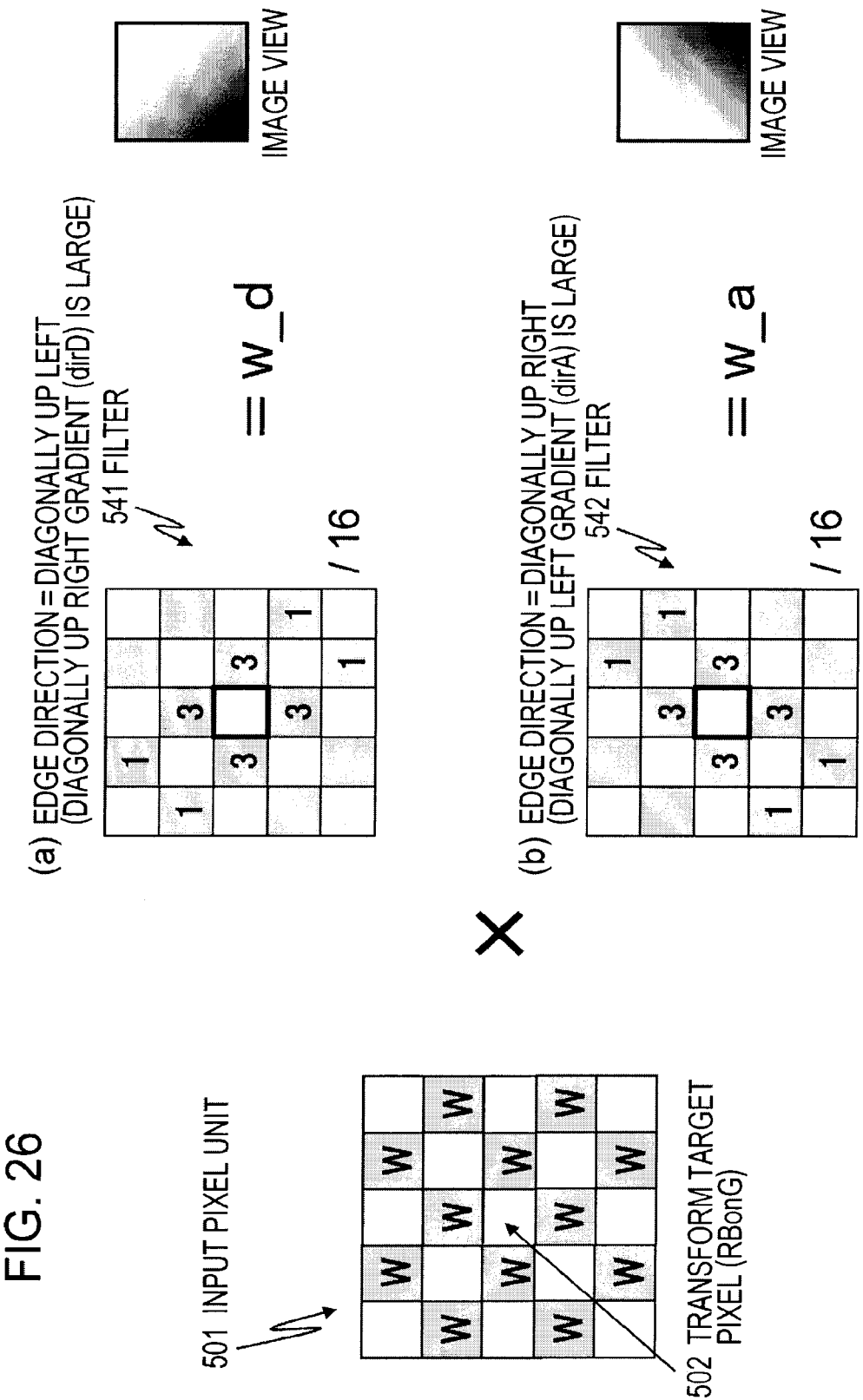
FIG. 26 is an explanatory diagram for describing a processing executed by a third pixel interpolation parameter calculation unit (RBonGofAD) 205 illustrated in FIG. 6.

It should be noted that on the right end of FIG. 26, an image view representing an edge example in the input pixel unit 501 of the 5×5 pixels which becomes the processing target is illustrated.

Next, the third pixel interpolation parameter calculation unit (RBonGofAD) 205 calculates the parameter corresponding to the diagonal edge as the parameter applied to the processing of transforming the G pixel into the R pixel or the B pixel.

First, the following parameters are calculated as the parameters applied to the processing of transforming the G pixel into the R pixel.

$RonG(A)=(mR/mW)(w\_a)$ $RonG(D)=(mR/mW)(w\_d)$

These parameters are output to the blend processing unit 211, subjected to the blend processing in accordance with the edge state in the blend processing unit 211, and applied to the processing of deciding the R pixel value when the G pixel position that is the transform target pixel 502 located at the center position in the input pixel unit 501 of the 5×5 pixels is transformed into the R pixel. The processing by the blend processing unit 211 will be described in a later stage.

The following parameters are calculated as the parameters applied to the processing of transforming the G pixel into the B pixel.

$BonG(A)=(mB/mW)(w\_a)$ $BonG(D)=(mB/mW)(w\_d)$

These parameters are output to the blend processing unit 211, subjected to the blend processing in accordance with the edge state in the blend processing unit 211, and applied to the processing of deciding the B pixel value when the G pixel position that is the transform target pixel 502 located at the center position in the input pixel unit 501 of the 5×5 pixels is transformed into the B pixel.

The third pixel interpolation parameter calculation unit (RBonGofAD) 205 calculates, in this manner, the parameters applied to the processing of transforming the G pixel on the diagonal edge into the R pixel or the B pixel, that is, $$RonG(A)=(mR/mW)(w\_a)$$

$$RonG(D)=(mR/mW)(w\_d)$$

$$BonG(A)=(mB/mW)(w\_a)$$

$$BonG(D)=(mB/mW)(w\_d)$$

these parameters to be output to the blend processing unit 211.

(3-4-5. Processing by the Second Temporary Pixel Setting Unit (RBonWaroundRB) 206)

Next, a processing by the second temporary pixel setting unit (RBonWaroundRB) 206 will be described. As will be understood from the configuration diagram illustrated in FIG. 6, the second temporary pixel setting unit (RBon-WaroundRB) 206 is set in a prior stage to the fourth pixel interpolation parameter calculation unit (RBonRBofHV) 207 and the fifth pixel interpolation parameter calculation unit (RBonRBofAD) 208.

The fourth pixel interpolation parameter calculation unit (RBonRBofHV) 207 and the fifth pixel interpolation parameter calculation unit (RBonRBofAD) 208 both calculate the parameters for transforming (correcting) the R or B pixel into the same R or B pixel. Prior to these processings, the second temporary pixel setting unit (RBonWaroundRB) 206 executes the processing of transforming the W pixel position adjacent to the RB pixels into the temporary R pixel (R') or B pixel (B').

The second temporary pixel setting unit (RBonWaroundRB) 206, first, obtains the low frequency component mW of the W signal in the 5×5 pixel area of the processing unit, the low frequency component R' of the R signal, and the low frequency component B' of the B signal.

Figure 27:
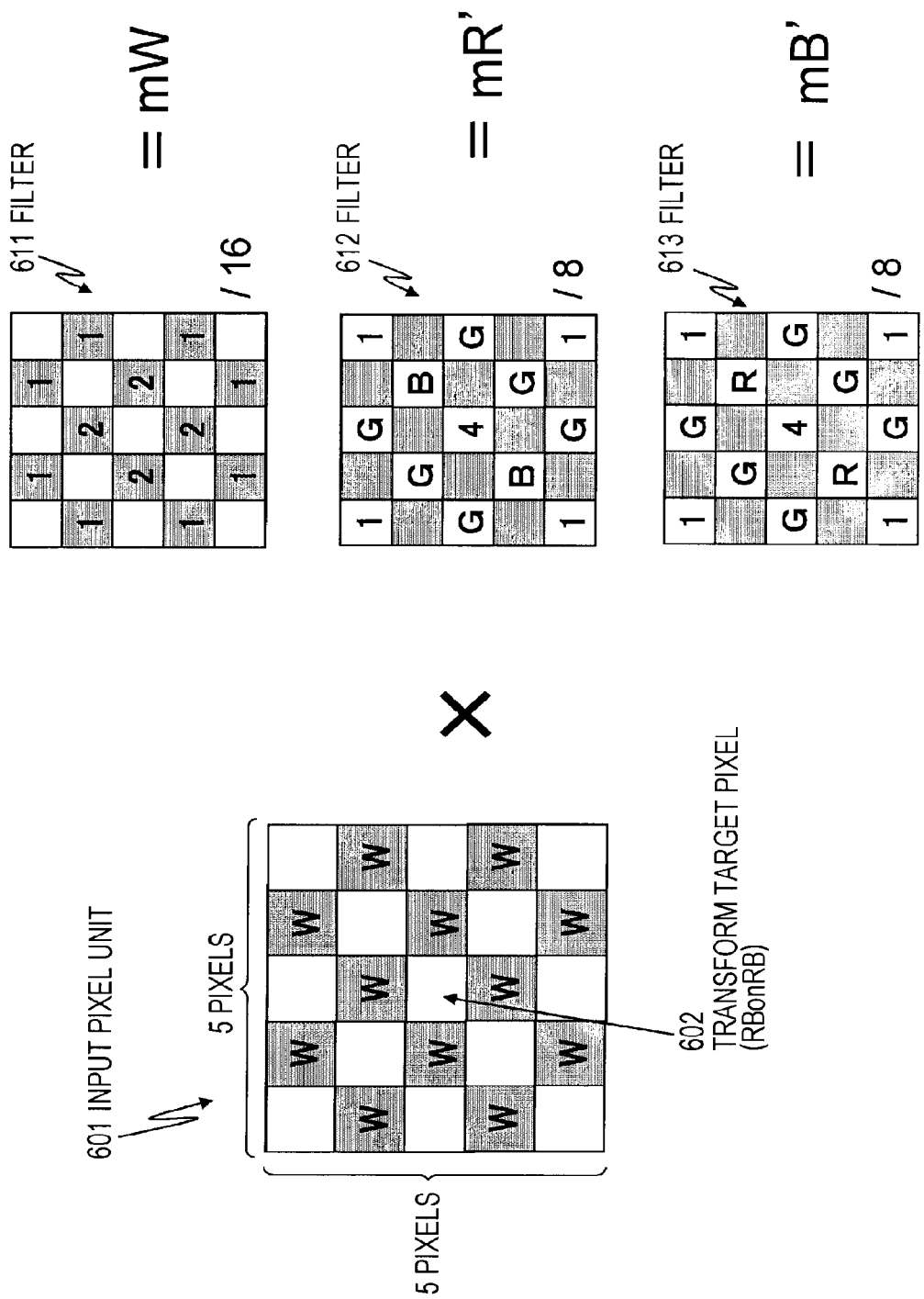
FIG. 27 is an explanatory diagram for describing a processing executed by a second temporary pixel setting unit (RBonWaroundRB) 206 illustrated in FIG. 6.

As illustrated in FIG. 27, by applying filters 611 to 613 illustrated in FIG. 27 to an input pixel unit 601 of 5×5 pixels, the low frequency component mW of the W signal, the low frequency component R' of the R signal, and the low frequency component B' of the B signal corresponding to the input pixel unit 601 of the 5×5 pixels are obtained. The center pixel in the input pixel unit 601 of the 5×5 pixels is the transform target pixel. In this case, as the input pixel unit 601 is the input with respect to the fourth pixel interpolation parameter calculation unit (RBonRBofHV) 207 and the fifth pixel interpolation parameter calculation unit (RBonRBofAD) 208 and they are the processing units that calculate the parameters for transforming (correcting) the R or B pixel into the R or B pixel, the center pixel in the input pixel unit 601 is the R or B pixel.

In the filter 611, the factor setting unit is the W pixel corresponding position, and as the factors, the respective factors of (1/16 to 2/16) are set. The pixel value at the W pixel position in the input pixel unit 501 of the 5×5 pixels is multiplied by the filter factor at the corresponding pixel position for the filter 511, and the added value of the respective multiplication results is calculated as the low frequency component mW of the W signal.

The filter 612 is applied when the center pixel in the input pixel unit 601 is the R pixel. The factor setting unit is the R pixel corresponding position, and as the factors, the respective factors of (1/8 to 4/8) are set. The pixel value at the R pixel position in the input pixel unit 601 of the 5×5 pixels is multiplied by the filter factor at the corresponding pixel position for the filter 612, and the added value of the respective multiplication results is calculated as the low frequency component mR' of the R signal.

The filter 613 is applied when the center pixel in the input pixel unit 601 is the R pixel. The factor setting unit is the B pixel corresponding position, and as the factors, the respective factors of (1/8 to 4/8) are set. The pixel value at the B pixel position in the input pixel unit 601 of the 5×5 pixels is multiplied by the filter factor at the corresponding pixel position for the filter 613, and the added value of the respective multiplication results is calculated as the low frequency component mB' of the B signal.

Figure 28:
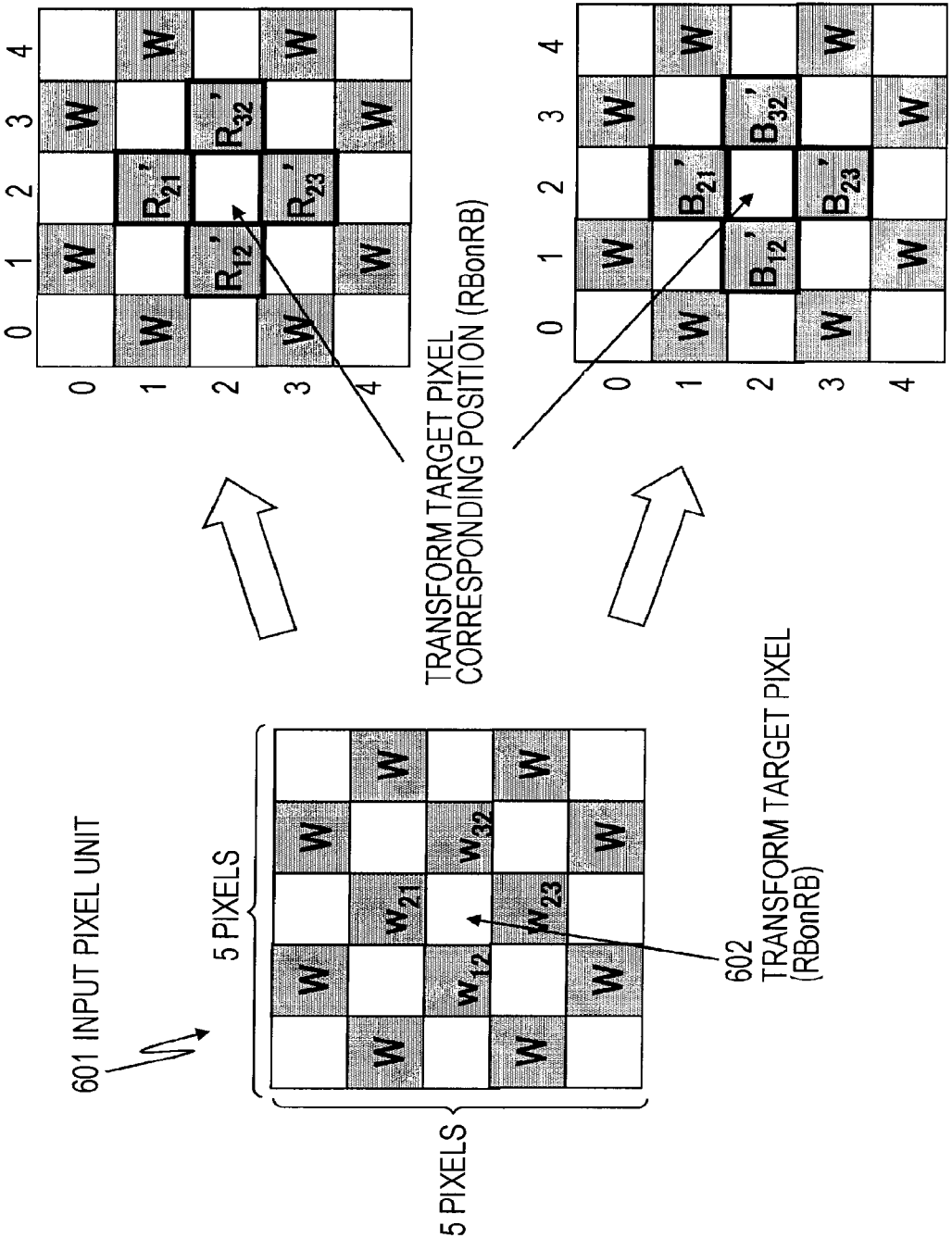
FIG. 28 is an explanatory diagram for describing the processing executed by the second temporary pixel setting unit (RBonWaroundRB) 206 illustrated in FIG. 6.

Next, the second temporary pixel setting unit (RBon-WaroundRB) 206 estimates, as illustrated in FIG. 28, the R pixel value and the B pixel value at the W pixel positions adjacent in the surrounding of a transform target pixel 602 located at the center in the input pixel unit 601 of the 5×5 pixels.

As illustrated in FIG. 28, the number of the W pixel positions adjacent in the surrounding of the transform target pixel 602 located at the center in the input pixel unit 601 of the 5×5 pixels is 4. The R pixel value and the B pixel value at these W pixel positions are estimated. As previously described with reference to FIG. 18, the estimation processing is performed on the basis of the assumption that the ratio of mW and mR' or mW and mB' is maintained in the local area in the image.

On the basis of such an assumption, the R pixel values ($R_{xy}'=R_{12}'$, $R_{21}'$, $R_{32}'$, and $R_{23}'$) at the W pixel positions adjacent in the surrounding of the transform target pixel 602 located at the center in the input pixel unit 601 of the 5×5 pixels illustrated in FIG. 28 can be estimated as follows.

$$R_{12}'=(mR'/mW)w_{12},$$

$$R_{21}'=(mR'/mW)w_{21},$$

$$R_{32}'=(mR'/mW)w_{32},$$

$$R_{23}'=(mR'/mW)w_{23},$$

It should be noted that $w_{12}$, $w_{21}$, $w_{32}$, and $w_{23}$ are the W pixel values at the W pixel positions adjacent in the surrounding of the transform target pixel 602 located at the center in the input pixel unit 601 of the 5×5 pixels illustrated in the drawing.

Similarly, the B pixel values ($B_{xy}'=B_{12}'$, $B_{21}'$, $B_{32}'$, and $B_{23}'$) at the W pixel positions adjacent in the surrounding of the transform target pixel 602 located at the center in the input pixel unit 601 of the 5×5 pixels illustrated in FIG. 28 can be estimated as follows.

$$B_{12}'=(mB'/mW)w_{12},$$

$$B_{21}'=(mB'/mW)w_{21},$$

$$B_{32}'=(mB'/mW)w_{32},$$

$$B_{23}'=(mB'/mW)w_{23},$$

It should be noted that $w_{12}$, $w_{21}$, $w_{32}$, and $w_{23}$ are the W pixel values at the W pixel positions adjacent in the surrounding of the transform target pixel 602 located at the center in the input pixel unit 601 of the 5×5 pixels illustrated in the drawing.

In this manner, the second temporary pixel setting unit (RBonWaroundRB) 206 estimates the R pixel value and the B pixel value at the W pixel positions adjacent in the surrounding of the transform target pixel 602 located at the center in the input pixel unit 601 of the 5×5 pixels and provides these to the fourth pixel interpolation parameter calculation unit (RBonRBofHV) 207 and the third pixel interpolation parameter calculation unit (RBonRBofAD) 208.

(3-4-6. Processing by the Fourth Pixel Interpolation Parameter Calculation Unit (RBonRBofHV) 207)

Next, a processing by the fourth pixel interpolation parameter calculation unit (RBonRBofHV) 207 will be described. The fourth pixel interpolation parameter calculation unit (RBonRBofHV) 207 calculates the parameter corresponding to the vertical or horizontal edge as the parameter applied to the processing of transforming the R pixel into the R pixel or the B pixel into the B pixel.

The edge detection unit 209 generates, as described above, dirH: Horizontal gradient information
dirV: Vertical gradient information
dirA: Diagonally up right direction gradient information
dirD: Diagonally up left direction gradient information these pieces of edge information (dirH, dirV, dirA, and dirD) as the edge information corresponding to the respective pixels. The fourth pixel interpolation parameter calculation unit (RBonRBofHV) 207 inputs these pieces of edge information corresponding to the R or B pixel set as the transform target.

The fourth pixel interpolation parameter calculation unit (RBonRBofHV) 207 compares dirH and dirV of the edge information in the four direction (dirH, dirV, dirA, and dirD) corresponding to the R/B pixel set as the transform target to calculate the parameters corresponding to the vertical or horizontal edge in accordance with the comparison result. The parameters to be calculated are parameters applied to the processing of transforming the R pixel into the R pixel or the B pixel into the B pixel.

The fourth pixel interpolation parameter calculation unit (RBonRBofHV) 207, first, obtains the low frequency component mW of the W signal, the low frequency component mR of the R signal, and the low frequency component mB of the B signal in the 5×5 pixel area of the processing unit. These calculation processings will be described with reference to FIG. 29.

Figure 29:
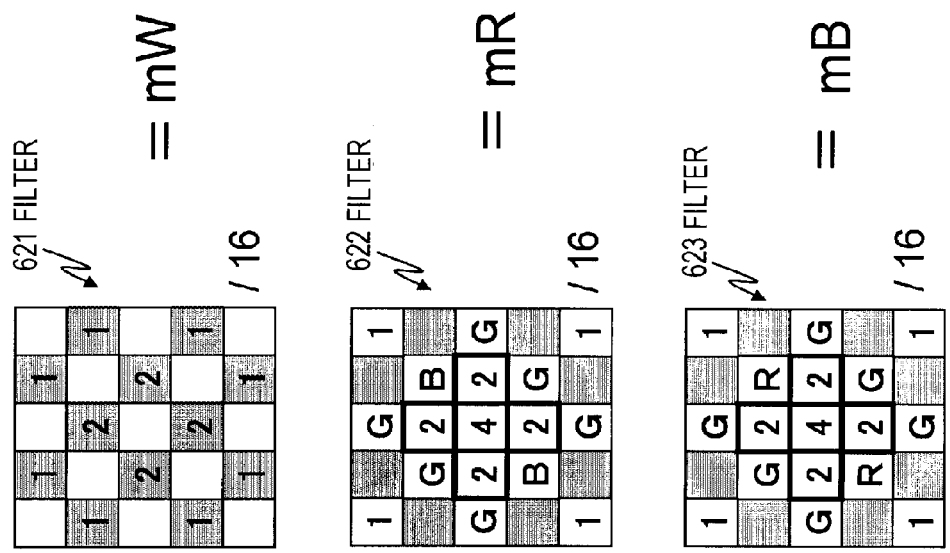
FIG. 29 is an explanatory diagram for describing a processing executed by a fourth pixel interpolation parameter calculation unit (RBonRBofHV) 207 illustrated in FIG. 6.

As illustrated in FIG. 29, by applying a filter 621 illustrated in FIG. 29 to the input pixel unit 601 of the 5×5 pixels, the low frequency component mW of the W signal corresponding to the input pixel unit 501 of the 5×5 pixels is calculated. Herein, the R or B pixel that becomes the target to be transformed into the R or B pixel is the transform target pixel 602 located at the center in the input pixel unit 601 of the 5×5 pixels. It should be noted that this processing is the same processing as the processing by the second temporary pixel setting unit (RBonWaroundRB) 206 previously described with reference to FIG. 27. Therefore, a setting may be used that the low frequency component mW of the W signal calculated by the second temporary pixel setting unit (RBonWaroundRB) 206 is received.

The fourth pixel interpolation parameter calculation unit (RBonRBofHV) 207, furthermore, obtains the low frequency component mR of the R signal, and the low frequency component mB of the B signal in the 5×5 pixel area of the processing unit. In this processing, the estimate values of the R pixel value and the B pixel value at the W pixel positions adjacent in the surrounding of the transform target pixel 602 at the center in the input pixel unit 601 of the 5×5 pixels calculated by the second temporary pixel setting unit (RBonWaroundRB) 206 are utilized.

By applying a filter 622 illustrated in FIG. 29 to data 611 where the R pixel value estimation value calculated by the second temporary pixel setting unit (RBonWaroundRB) 206 is set, the low frequency component mR of the R signal corresponding to the input pixel unit 601 of the 5×5 pixels is calculated.

In the filter 622, (4/16 to 1/16) are set as the filter factors. The setting positions for the factors (1/16) and (4/16) correspond to the R pixel position in the original input pixel unit 601 of the 5×5 pixels. The setting position for the factor (2/16) corresponds to the W pixel position in the original input pixel unit 601 of the 5×5 pixels and corresponds to the position where the R pixel value is estimated by the second temporary pixel setting unit (RBonWaroundRB) 206.

Similarly, by applying a filter 623 illustrated in FIG. 29 to data 612 where the B pixel value estimated value calculated by the second temporary pixel setting unit (RBonWaroundRB) 206 is set, and the low frequency component mB of the B signal corresponding to the input pixel unit 601 of the 5×5 pixels is calculated.

In the filter 622, (4/16 to 1/16) are set as the filter factors. The setting positions for the factors (1/16) and (4/16) correspond to the B pixel position in the original input pixel unit 601 of the 5×5 pixels. The setting position for the factor (2/16) corresponds to the position where the B pixel value is estimated by the W pixel position in the original input pixel unit 601 of the 5×5 pixels and corresponds to the second temporary pixel setting unit (RBonWaroundRB) 206.

The fourth pixel interpolation parameter calculation unit (RBonRBofHV) 207 obtains, in this manner, the low frequency component mW of the W signal, the low frequency component mR of the R signal, and the low frequency component mB of the B signal in the 5×5 pixel area of the processing unit.

Next, the fourth pixel interpolation parameter calculation unit (RBonRBofHV) 207 estimates the W pixel value of the transform target pixel 602 located at the center position in the input pixel unit 601 of the 5×5 pixels in accordance with the edge direction in the input pixel unit 601 of the 5×5 pixels. The edge direction information is input from the edge detection unit 209.

By comparing a magnitude between dirH (horizontal gradient information) and dirV (vertical gradient information) input from the edge detection unit 209, it is determined whether the edge direction in the input pixel unit 601 of the 5×5 pixels is the horizontal direction or the vertical direction, or the flat area where the edge direction cannot be identified. For example, the determination processing is performed by utilizing the previously set threshold. It should be noted that the transform target pixel 602 located at the center position in the input pixel unit 601 of the 5×5 pixels is originally the R or B pixel.

The transform target pixel 602 located at the center position in the input pixel unit 601 of the 5×5 pixels is the R pixel or the B pixel. This processing will be described with reference to FIG. 30.

In a case where the edge direction in the input pixel unit 601 of the 5×5 pixels is the horizontal direction, as illustrated in FIG. 30(a), by applying a filter 631, an average of the pixel values of the two W pixels horizontally adjacent to the transform target pixel 602 at the center position is calculated and set as a W pixel value (W_h) of the transform target pixel 602.

Figure 30:
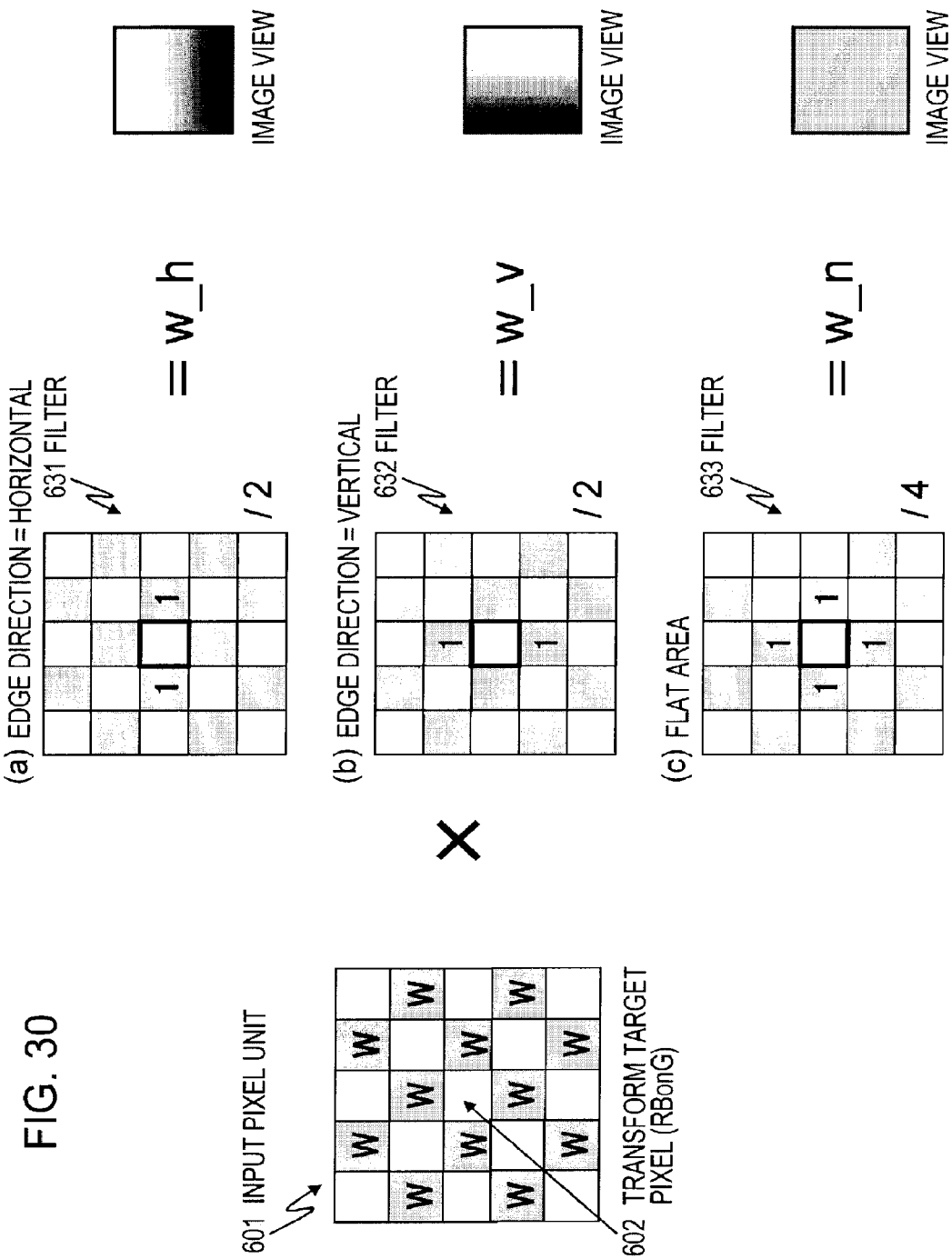
FIG. 30 is an explanatory diagram for describing the processing executed by the fourth pixel interpolation parameter calculation unit (RBonRBofHV) 207 illustrated in FIG. 6.

In a case where the edge direction in the input pixel unit 601 of the 5×5 pixels is the vertical direction, as illustrated in FIG. 30(*b*), by applying a filter 632, an average of the pixel values of the two W pixels vertically adjacent to the transform target pixel 602 at the center position is calculated and set as a W pixel value (W_v) of the transform target pixel 602.

In a case where the edge direction in the input pixel unit 601 of the 5×5 pixels is the flat area, as illustrated in FIG. 30(*c*), by applying a filter 633, an average of the pixel values of the four W pixels vertically and horizontally adjacent to the transform target pixel 602 at the center position is calculated and set as a W pixel value (W_n) of the transform target pixel 602.

It should be noted that on the right end of FIG. 30, an image view representing an edge example in the input pixel unit 601 of the 5×5 pixels which becomes the processing target is illustrated.

Next, the fourth pixel interpolation parameter calculation unit (RBonRBofHV) 207 calculates the parameters corresponding to the vertical or horizontal edge as the parameters applied to the processing of transforming the R pixel into the corrected R pixel and the B pixel into the corrected B pixel.

First, the following parameters are calculated as the parameters applied to the processing of transforming the R pixel into the corrected R pixel.

$RonR(H)=(mR/mW)(w\_h)$ $RonR(V)=(mR/mW)(w\_v)$ $RonRn=(mR/mW)(w\_n)$

These parameters are output to the blend processing unit 211, subjected to the blend processing in accordance with the edge state in the blend processing unit 211, and applied to the processing of deciding the corrected R pixel value when the R pixel position that is the transform target pixel 602 located at the center position in the input pixel unit 601 of the 5×5 pixels into the R pixel. The processing by the blend processing unit 211 will be described in a later stage.

The following parameters are calculated as the parameters applied to the processing of transforming the B pixel into the corrected B pixel.

$BonB(H)=(mB/mW)(w\_h)$ $BonB(V)=(mB/mW)(w\_v)$ $BonBn=(mB/mW)(w\_n)$

These parameters are output to the blend processing unit 211, subjected to the blend processing in accordance with the edge state in the blend processing unit 211, and applied to the processing of deciding the corrected B pixel value when the B pixel position that is the transform target pixel 602 located at the center position in the input pixel unit 601 of the 5×5 pixels is transformed into the B pixel.

The fourth pixel interpolation parameter calculation unit (RBonRBofHV) 207 calculates, in this manner, the parameters corresponding to the vertical or horizontal edge as the parameters applied to the processing of transforming the R pixel into the corrected R pixel and the B pixel into the corrected B pixel, that is, $RonR(H)=(mR/mW)(w\_h)$ $RonR(V)=(mR/mW)(w\_v)$ $RonRn=(mR/mW)(w\_n)$ $BonB(H)=(mB/mW)(w\_h)$ $BonB(V)=(mB/mW)(w\_v)$ $BonBn=(mB/mW)(w\_n)$ these parameters to be output to the blend processing unit 211.

(3-4-7. Processing by the Fifth Pixel Interpolation Parameter Calculation Unit (RBonRBofAD) 208)

Next, a processing by the fifth pixel interpolation parameter calculation unit (RBonRBofAD) 208 will be described. The fifth pixel interpolation parameter calculation unit (RBonRBofAD) 208 calculates the parameters corresponding to the diagonal edge as the parameters applied to the processing of transforming the R pixel into the corrected R pixel and the B pixel into the corrected B pixel.

The edge detection unit 209 generates, as described above, dirH: Horizontal gradient information dirV: Vertical gradient information dirA: Diagonally up right direction gradient information dirD: Diagonally up left direction gradient information these pieces of edge information (dirH, dirV, dirA, and dirD) as the edge information corresponding to the respective pixels. The fifth pixel interpolation parameter calculation unit (RBonRBofAD) 208 inputs these pieces of edge information corresponding to the R or B pixel set as the transform target.

The fifth pixel interpolation parameter calculation unit (RBonRBofAD) 208, first, obtains the low frequency component mW of the W signal, the low frequency component mR of the R signal, and the low frequency component mB of the B signal in the 5×5 pixel area of the processing unit. These calculation processings are similar to those by the fourth pixel interpolation parameter calculation unit (RBonRBofHV) 207 and are the same as the processings previously described with reference to FIG. 29, and therefore the description will be omitted.

The fifth pixel interpolation parameter calculation unit (RBonRBofAD) 208 estimates the W pixel value of the transform target pixel 602 located at the center position in the input pixel unit 601 of the 5×5 pixels in accordance with the edge direction in the input pixel unit 601 of the 5×5 pixels. The edge direction information is input from the edge detection unit 209.

By comparing a magnitude between dirA (diagonally up right direction gradient information) and dirD (diagonally up left direction gradient information) input from the edge detection unit 209, it is determined whether the edge direction in the input pixel unit 601 of the 5×5 pixels is the diagonally up right direction or the diagonally up left direction, or the flat area where the edge direction cannot be identified. For example, the determination processing is performed by utilizing the previously set threshold. It should be noted that the transform target pixel 602 located at the center position in the input pixel unit 601 of the 5×5 pixels is originally the R or B pixel.

A processing of estimating the W pixel value of the transform target pixel 602 located at the center position in the input pixel unit 601 of the 5×5 pixels will be described with reference to FIG. 31.

In a case where the edge direction in the input pixel unit 601 of the 5×5 pixels is the diagonally up left direction, as illustrated in FIG. 31(*a*), by applying a filter 641, by applying the pixel values of the eight W pixels from the diagonally up left to the diagonally down right direction of the transform target pixel 602 at the center position, the W pixel value (W_d) of the transform target pixel 602 is set.

In a case where the edge direction in the input pixel unit 601 of the 5×5 pixels is the diagonally up right direction, as illustrated in FIG. 31(*b*), by applying a filter 642, by applying the pixel values of the eight W pixels from the diagonally up right to the diagonally down left direction of the transform target pixel 602 at the center position, the W pixel value (W_a) of the transform target pixel 602 is set.

It should be noted that on the right end of FIG. 31, an image view representing an edge example in the input pixel unit 501 of the 5×5 pixels which becomes the processing target is illustrated.

Next, the fifth pixel interpolation parameter calculation unit (RBonRBofAD) 208 calculates the parameters corresponding to the diagonal edge as the parameters applied to the processing of transforming the R pixel into the corrected R pixel and the B pixel into the corrected B pixel.

First, the following parameters are calculated as the parameters applied to the processing of transforming the R pixel into the corrected R pixel.

$$RonR(A)=(mR/mW)(w\_a)$$

$$RonR(D)=(mR/mW)(w\_d)$$

These parameters are output to the blend processing unit 211, subjected to the blend processing in accordance with the edge state in the blend processing unit 211, and applied to the processing of deciding the R pixel value when the R pixel that is the transform target pixel 602 located at the center position in the input pixel unit 601 of the 5×5 pixels is transformed into the corrected R pixel. The processing by the blend processing unit 211 will be described in a later stage.

The following parameters are calculated as the parameters applied to the processing of transforming the B pixel into the corrected B pixel.

$$BonB(A)=(mB/mW)(w\_a)$$

$$BonB(D)=(mB/mW)(w\_d)$$

These parameters are output to the blend processing unit 211, subjected to the blend processing in accordance with the edge state in the blend processing unit 211, and applied to the processing of deciding the B pixel value when the B pixel position that is the transform target pixel 602 located at the center position in the input pixel unit 601 of the 5×5 pixels is transformed into the corrected B pixel.

The fifth pixel interpolation parameter calculation unit (RBonRBofAD) 208 calculates, in this manner, the parameters applied to the processing of transforming the R pixel on the diagonal edge into the corrected R pixel and the B pixel into the corrected B pixel, that is, $$RonR(A)=(mR/mW)(w\_a)$$

$$RonR(D)=(mR/mW)(w\_d)$$

$$BonB(A)=(mB/mW)(w\_a)$$

$$BonB(D)=(mB/mW)(w\_d)$$

these parameters to be output to the blend processing unit 211.

(3-5. Regarding a Processing by a Blend Processing Unit)

Next, a processing by the blend processing unit 211 will be described. The blend processing unit 211 inputs the pixel interpolation parameters generated by the first to fifth pixel interpolation parameter calculation units and further inputs the edge information detected by the edge detection unit 209 and the texture information detected by the texture detection unit 210 to calculate the final transform pixel value.

The edge information input from the edge detection unit 209 is the following information.

dirH: Horizontal gradient information
dirV: Vertical gradient information
dirA: Diagonally up right direction gradient information
dirD: Diagonally up left direction gradient information These pieces of edge information (dirH, dirV, dirA, and dirD) are input.

Also, the texture information input from the texture detection unit 210 is the following flatness weight (weightFlat) information calculated while following the previously described expression (Expression 7).

$$weightFlat(x,y)=f_{flat}(W_{TX}(p)) \qquad \text{(Expression 7)}$$

It should be noted that as described above, in the above-mentioned expression (Expression 7), $f_{flat}(r)$ can use a linearly approximated function illustrated, for example, in FIG. 14. While 0<Th0<Th1<1 is set as the threshold, the linearly approximated function illustrated in FIG. 14 is a linearly approximated function with such a setting.

r=0 to Th0→φ(r)=0
r=Th0 to Th1→φ(r)=0 to 1.0 (linear change)
r=larger than or equal to Th1→φ(r)=1

As the value of the flatness weight (weightFlat) is smaller, a probability is higher that the image area has a low flatness and a large texture, and as the value of the flatness weight (weightFlat) is higher, the image area has a high flatness and a small texture.

The blend processing unit 211 inputs these pieces of information and decides final transform pixel values for transforming the RGBW pattern into the RGB pattern.

A processing sequence executed by the blend processing unit 211 will be described with reference to flow charts described in FIG. 32 and FIG. 33.

The blend processing unit 211 determines, first, an edge direction attribute in the pixel unit in step S11 illustrated in FIG. 32.

The blend processing unit 211 uses the following determination expression by using the edge direction in the pixel unit (dirH, dirV, dirA, and dirD) input from the edge detection unit 209 to determine the edge direction attribute in the pixel unit.

First, dirHV is defined as follows.
In the case of dirH≤dirV,
dirHV=H
In the case of dirH>dirV,
dirHV=V
dirHV is either H (horizontal direction) or V (vertical direction).

Furthermore, dirAD is defined as follows.
In the case of dirA≤dirD,
dirAD=A
In the case of dirA>dirD,
dirAD=D
dirAD is either A (diagonally up right direction) or D (diagonally up left direction).

These dirHV and dirAD are attribute information indicating the edge directions in the respective pixels.

Next, in step S12 illustrated in FIG. 32, from these dirHV and dirAD, while following the expression below, the blend processing unit 211 obtains an edge direction ratio (ratioHV) of the vertical horizontal direction edge and the diagonal direction edge.

In the case of dirA≤dirD, ratio*HV*=(*dirD*+offset)/(*dirA*+offset)

In the case of dirA>dirD, ratio*HV*=(*dirA*+offset)/(*dirD*+offset)

It should be noted that, (offset) in the above-mentioned expression is a non-negative value and is a parameter for avoiding division by zero and adjusting the detection sensitivity.

Figure 34:
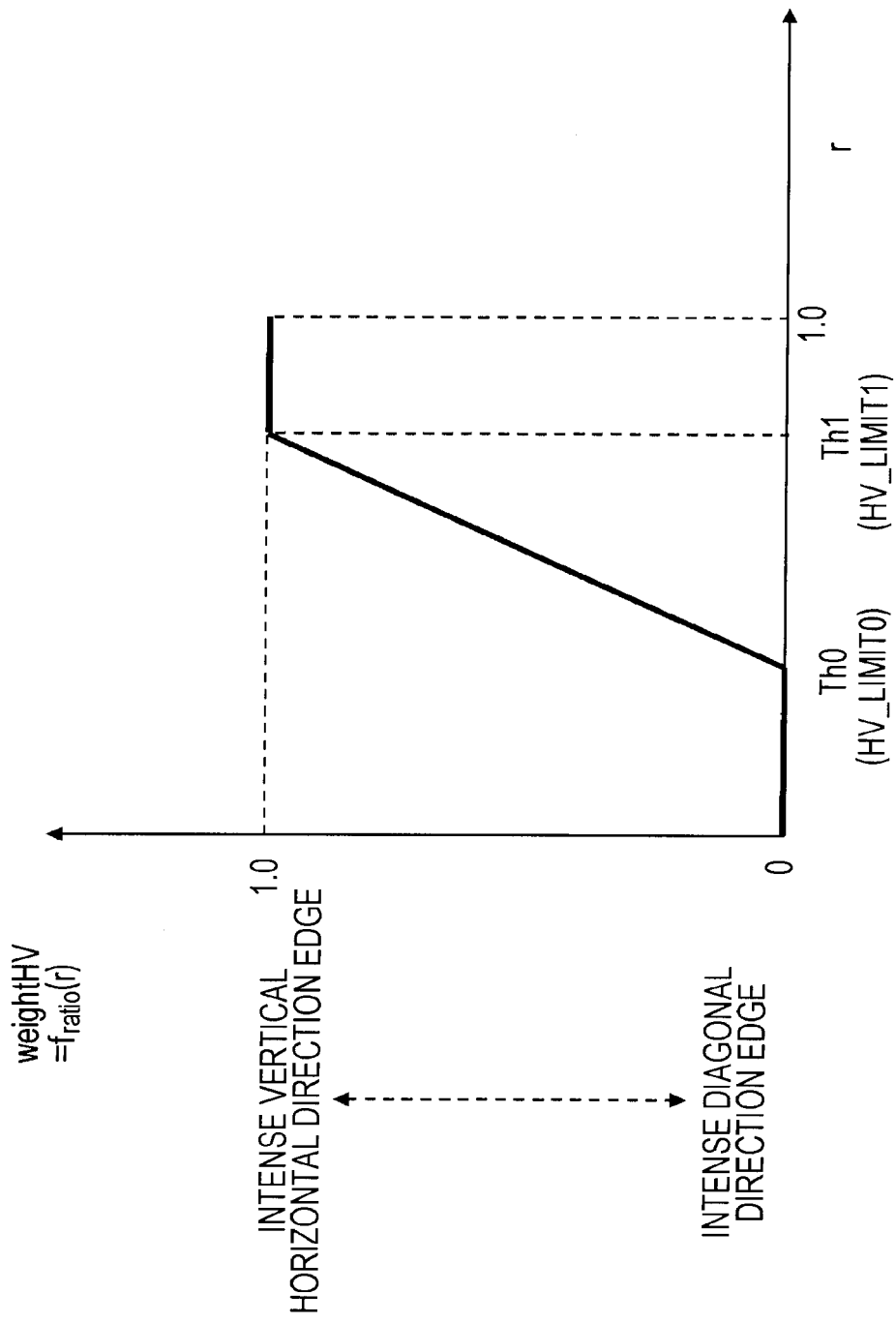
FIG. 34 is an explanatory diagram for describing the processing executed by the blend processing unit 211 illustrated in FIG. 6.

Furthermore, the edge direction ratio (ratioHV) calculated through the above-mentioned expression calculates a vertical horizontal direction edge direction weight (weightHV) through a nonlinearization processing by a function $f_{ratio}$ (ratioHV) illustrated in FIG. 34, for example. It should be noted that thresholds Th0(HV_LIMIT0) and Th1 (HV_LIMIT1) are parameters for adjustment applied to the nonlinearization processing.

While 0<Th0(HV_LIMIT0)<Th1(HV_LIMIT1)<1 is set as a threshold, a linear approximation function $f_{ratio}(r)$ illustrated in FIG. 32 is a linear approximation function with such a setting.

r=0 to Th0(HV_LIMIT0)→$f_{ratio}(r)$=0 r=Th0(HV_LIMIT0) to Th1(HV_LIMIT1)→$f_{ratio}(r)$=0 to 1.0 (linear change)

r=Th1(HV_LIMIT1) or larger→$f_{ratio}(r)$=1

It should be noted that the vertical horizontal direction edge direction weight (weightHV) indicates the intensity of the vertical horizontal direction edge with respect to the diagonal direction edge, it is indicated that as the value of the vertical horizontal direction edge direction weight (weightHV) is larger, the vertical horizontal direction edge is more intense than the diagonal direction edge, and as the value of the vertical horizontal direction edge direction weight (weightHV) is smaller, the diagonal direction edge is more intense than the vertical horizontal direction edge.

Next, in step S13 illustrated in FIG. 33, the blend processing unit 211 decides the final transform pixel value (RGB pixel value) for transforming the RGBW pattern into the RGB pattern.

As previously described with reference to FIG. 2, the data transform processing unit 200 of the image processing apparatus of the present invention executes the transform processing from the RGBW pattern 181 to the RGB pattern 182. At the time of this transform processing, as described above, these five transform and correction processings are executed:

Transform W pixel position into G pixel (estimate G pixel value)=(GonW)

Transform G pixel position into R pixel (estimate R pixel value)=(RonG)

Transform G pixel position into B pixel (estimate B pixel value)=(BonG)

Transform R pixel position into R pixel (correct R pixel value)=(RonR)

Transform B pixel position into B pixel (correct B pixel value)=(BonB).

The blend processing unit 211 decides these final transform pixel values.

The G pixel value (GonW) set in the transform processing from the W pixel position into the G pixel is calculated by the following expression (Expression 11).

*GonW*=(1−weightFlat)·(*GonW*(*dirHV*))+(weightFlat)·(*GonWn*(*dirHV*))  (Expression 11)

It should be noted that in the above-mentioned expression (Expression 11),

GonW(dirHV),

GonWn(dirHV)

they are the interpolation parameters calculated by the previously described first pixel interpolation parameter calculation unit (GonW) 202, and $GonW(H)=(mG\_h/mW)w$ (a)

$GonW(V)=(mG\_v/mW)w$ (b)

$GonWn(H)=(mG\_h/mW)w$ (c)

$GonWn(V)=(mG\_v/mW)w$ (d)

that is one of these values.

In the case of dirH≤dirV, as illustrated in step S11, dirHV=H is established, and $GonW(dirHV)=GonW(H)=(mG\_h/mW)w$ and $GonWn(dirHV)=GonWn(H)=(mG\_h/mW)w$ are established.

Also, in the case of dirH>dirV, as illustrated in step S11, dirHV=V is established, and $GonW(dirHV)=GonW(V)=(mG\_v/mW)w$ and $GonWn(dirHV)=GonWn(V)=(mG\_v/mW)w$ are established.

In this manner, the G pixel value (GonW) in a case where the W pixel position in the RGBW pattern is transformed into the G pixel is calculated.

It should be noted that the G pixel value (GonW) calculation expression illustrated in the above-mentioned expression (Expression 11) is an expression for calculating the final transformed G pixel value in accordance with the flatness weight (weightFlat) of the transform target pixel by changing the blend ratio of these values.

(GonW(dirHV)): transformed G pixel value calculated by applying the contrast emphasis (GonWn(dirHV)): transformed G pixel value calculated without applying the contrast emphasis In the case of the flat area as the flatness weight (weightFlat) of the transform target pixel is large, the blend ratio of (GonWn(dirHV)) equivalent to the transformed G pixel value without the contrast emphasis becomes high, and in the case of the area as the flatness weight (weightFlat) is small, the flatness is low, and the texture is large, the blend ratio of (GonW(dirHV)) equivalent to the transform pixel value after the contrast emphasis becomes high.

In this manner, by changing the blend ratio in accordance with the flatness of the transform target pixel, the final G pixel value (GonW) is decided.

Next, a calculation processing for the R pixel value (RonG) in a processing of transforming the G pixel position in the RGBW pattern into the R pixel will be described.

First, while following the expressions (Expression 21) and (Expression 22) below, a transform pixel value (RonG_hv) corresponding to the vertical horizontal direction edge and a transform pixel value (RonG_ad) corresponding to the diagonal direction edge are obtained.

$$RonG\_hv = (1-\text{weightFlat}) \cdot (RonG(dirHV)) + (\text{weightFlat}) \cdot (RonGn) \quad \text{(Expression 21)}$$

$$RonG\_ad = (RonG(dirAD)) \quad \text{(Expression 22)}$$

Furthermore, by executing the blend processing on (RonG_hv) and (RonG_ad) calculated through the above-mentioned expressions (Expression 21) and (Expression 22) while following the expression (Expression 23) below to calculate the final R pixel value (RonG).

$$RonG = (\text{weight}HV) \cdot (RonG\_hv) + (1-\text{weight}HV) RonG\_ad \quad \text{(Expression 23)}$$

In this manner, the calculation processing for the R pixel value (RonG) in a case where the G pixel position in the RGBW pattern is transformed into the R pixel is performed.

The above-mentioned expression will be described.
In the above-mentioned expression (Expression 21),
RonG(dirHV),
RonGn
they are interpolation parameters calculated by the second pixel interpolation parameter calculation unit (RBonGofHV) 204 previously described and are the following parameters applied to the processing of transforming the G pixel on the vertical or horizontal edge into the R pixel.

$$RonG(H) = (mR/mW)(w\_h)$$

$$RonG(V) = (mR/mW)(w\_v)$$

$$RonGn = (mR/mW)(w\_n)$$

In the case of dirH≤dirV, as illustrated in step S11, dirHV=H is established and $$RonG(dirHV) = RonG(H) = (mR/mW)(w\_h), \text{ and}$$

also, in the case of dirH>dirV, as illustrated in step S11, dirHV=V is established, and $$RonG(dirHV) = RonG(V) = (mR/mW)(w\_v)$$

is established.
Also, in the above-mentioned expression (Expression 22), RonG(dirAD)
this is the interpolation parameter calculated by the third pixel interpolation parameter calculation unit (RBonGofAD) 205 and is the following parameters applied to the processing of transforming the G pixel on the diagonal direction edge into the R pixel.

$$RonG(A) = (mR/mW)(w\_a)$$

$$RonG(D) = (mR/mW)(w\_d)$$

In the case of dirA≤dirD, as illustrated in step S11, dirAD=A is established and $$RonG(dirAD) = RonG(A) = (mR/mW)(w\_a), \text{ and}$$

also, in the case of dirA>dirD, as illustrated in step S11, dirAD=D is established, and $$RonG(dirAD) = RonG(D) = (mR/mW)(w\_d)$$

is established.
The expression (Expression 21) is a calculation expression for calculating the R pixel value (RonG_hv) relying on the vertical horizontal direction edge in accordance with the vertical horizontal direction edge information of the transform target pixel and the flatness weight (weightFlat).
In the case of the flat area as the flatness weight (weightFlat) of the transform target pixel is large, the R pixel value estimated by utilizing the W pixel value (w_n) that is calculated by applying the filter 533 illustrated in FIG. 25(c) previously described, that is, $$RonGn = (mR/mW)(w\_n)$$

the weight of this value is increased.
On the other hand, in the case of the area where the flatness weight (weightFlat) of the transform target pixel is small, the flatness is low, and the texture is large, the R pixel value estimated by utilizing the W pixel value (w_h) or (w_v) that is calculated by applying the filter 531 or 532 illustrated in FIG. 25(a) or (b) previously described, that is, $$RonG(H) = (mR/mW)(w\_h)$$

$$RonG(V) = (mR/mW)(w\_v)$$

the weight of these value is increased.
It should be noted that for the value of RonG(dirHV),
in the case of the horizontal direction edge, dirH≤dirV is established, and the R pixel value estimated by utilizing the W pixel value (w_h) that is calculated by applying the filter 531 illustrated in FIG. 25(a) previously described, that is, $$RonG(dirHV) = RonG(H) = (mR/mW)(w\_h),$$

this value is applied.
Also, in the case of the vertical direction edge, dirH>dirV is established, and the R pixel value estimated by utilizing the W pixel value (w_v) that is calculated by applying the filter 532 illustrated in FIG. 25(b) previously described, that is, $$RonG(dirHV) = RonG(H) = (mR/mW)(w\_v),$$

this value is applied.
In this manner, the expression (Expression 21) is a calculation expression for calculating the R pixel value (RonG_hv) relying on the vertical horizontal direction edge in accordance with the vertical horizontal direction edge information of the transform target pixel and the flatness weight (weightFlat).
The expression (Expression 22) is $$RonG\_ad = (RonG(dirAD))$$

and is an expression for selecting the following parameters applied to the processing of transforming the G pixel on the interpolation parameter diagonal direction edge calculated by the third pixel interpolation parameter calculation unit (RBonGofAD) 205 into the R pixel, that is, $$RonG(A) = (mR/mW)(w\_a)$$

$$RonG(D) = (mR/mW)(w\_d)$$

In the case of dirA>dirD, the R pixel value estimated by utilizing the W pixel value (w_d) that is calculated by applying the filter 541 illustrated in FIG. 26(a) previously described, that is, $$RonG(dirAD) = RonG(D) = (mR/mW)(w\_d), \text{ and}$$

in the case of dirA≤dirD, the R pixel value estimated by utilizing the W pixel value (w_a) that is calculated by applying the filter 542 illustrated in FIG. 26(b) previously described, that is, $$RonG(dirAD) = RonG(A) = (mR/mW)(w\_a),$$

these are selected.
In this manner, the expression (Expression 22) is a calculation expression for calculating the R pixel value (RonG_hv) relying on the diagonal direction edge in accordance with the diagonal direction edge direction information of the transform pixel.

The blend processing unit 211 executes, further, the blend processing on (RonG_hv) and (RonG_ad) calculated through the above-mentioned expressions (Expression 21) and (Expression 22) while following the expression (Expression 23) below to calculate the final R pixel value (RonG).

$$RonG = (weightHV) \cdot (RonG\_hv) + (1 - weightHV) RonG\_ad$$

The above-mentioned expression (Expression 23) is a calculation expression for calculating the final R pixel value (RonG) by blending the R pixel value (RonG_hv) relying on the vertical horizontal direction edge calculated through the expression 21 and the R pixel value (RonG_ad) relying on the diagonal direction edge calculated through the expression 22 in accordance with the vertical horizontal direction edge direction weight (weightHV) calculated in step S12.

As previously described, the vertical horizontal direction edge direction weight (weightHV) indicates the intensity of the vertical horizontal direction edge with respect to the diagonal direction edge, and it is indicated that as the value of the vertical horizontal direction edge direction weight (weightHV) is larger, the vertical horizontal direction edge is more intense than the diagonal direction edge, and as the value of the vertical horizontal direction edge direction weight (weightHV) is smaller, the diagonal direction edge is more intense than the vertical horizontal direction edge.

Therefore, in the expression (Expression 23), in a case where the vertical horizontal direction edge is intense and the value of the vertical horizontal direction edge direction weight (weightHV) is large, the weight of the R pixel value (RonG_hv) relying on the vertical horizontal direction edge calculated through the expression 21 is set to be large.

Also, in a case where the diagonal direction edge is intense and the value of the vertical horizontal direction edge direction weight (weightHV) is small, the weight of the R pixel value (RonG_ad) relying on the diagonal direction edge calculated through the expression 22 is set to be large.

In this manner, the final R pixel value (RonG) is decided by changing the blend ratio in accordance with the edge direction of the transform target pixel.

Next, a calculation processing for the B pixel value (BonG) in the processing of transforming the G pixel position in the RGBW pattern into the B pixel will be described.

The blend processing unit 211, first, obtains a transform pixel value (BonG_hv) corresponding to the vertical horizontal direction edge and a transform pixel value (BonG_ad) corresponding to the diagonal direction edge while following the expression (Expression 31) and (Expression 32) below.

$$BonG\_hv = (1 - weightFlat) \cdot (BonG(dirHV)) + (weight\text{-}Flat) \cdot (BonGn) \quad \text{(Expression 31)}$$

$$BonG\_ad = (BonG(dirAD)) \quad \text{(Expression 32)}$$

Furthermore, the blend processing is performed on (BonG_hv) and (BonG_ad) calculated through the above-mentioned expressions (Expression 31) and (Expression 32) while following the expression (Expression 33) below to calculate the final B pixel value (BonG).

$$BonG = (weightHV) \cdot (BonG\_hv) + (1 - weightHV) BonG\_ad \quad \text{(Expression 33)}$$

In this manner, the calculation processing for the B pixel value (BonG) in a case where the G pixel position in the RGBW pattern is transformed into the B pixel is performed.

These expressions 31 to 33 are expressions in which R is changed into B in the above-mentioned expressions 21 to 23, that is, the expressions applied to the calculation processing for the R pixel value (RonG) in a case where the G pixel position in the RGBW pattern is transformed into the R pixel, and the processing is a similar processing except for changing R into B.

In the above-mentioned expression (Expression 31),
BonG(dirHV),
BonGn they are interpolation parameters calculated by the previously described second pixel interpolation parameter calculation unit (RBonGofHV) 204 and are the following parameters applied to the processing of transforming the G pixel on the vertical or horizontal edge into the B pixel.

$$BonG(H) = (mB/mW)(w\_h)$$

$$BonG(V) = (mB/mW)(w\_v)$$

$$BonGn = (mB/mW)(w\_n)$$

Also, in the above-mentioned expression (Expression 32),
BonG(dirAD)

This is the interpolation parameter calculated by the third pixel interpolation parameter calculation unit (RBonGofAD) 205 and is the following parameters applied to the processing of transforming the G pixel on the diagonal direction edge into the R pixel.

$$BonG(A) = (mB/mW)(w\_a)$$

$$BonG(D) = (mB/mW)(w\_d)$$

The above-mentioned expression (Expression 33) is an expression for calculating the final B pixel value (BonG) by blending the B pixel value (BonG_hv) relying on the vertical horizontal direction edge calculated through Expression 31 and the B pixel value (BonG_ad) relying on the diagonal direction edge calculated through Expression 32 in accordance with the vertical horizontal direction edge direction weight (weightHV) calculated through step S12.

In the expression (Expression 33), in a case where the vertical horizontal direction edge is intense and the value of the vertical horizontal direction edge direction weight (weightHV) is large, the weight of the B pixel value (BonG_hv) relying on the vertical horizontal direction edge calculated through Expression 31 is set to be large.

Also, in a case where the diagonal direction edge is intense and the value of the vertical horizontal direction edge direction weight (weightHV) is small, the weight of the B pixel value (BonG_ad) relying on the diagonal direction edge calculated through Expression 32 is set to be large.

In this manner, the final B pixel value (BonG) is decided by changing the blend ratio in accordance with the edge direction of the transform target pixel.

Next, a calculation processing for the R pixel value (RonR) in the processing of transforming (correcting) the R pixel position in the RGBW pattern into the R pixel will be described.

The blend processing unit 211, first, obtains a vertical horizontal direction edge corresponding transform pixel value (RonR_hv) and a diagonal direction edge corresponding transform pixel value (RonR_ad) while following expression (Expression 41) and (Expression 42) below.

$$RonR\_hv = (1-\text{weightFlat}) \cdot (RonR(dirHV)) + (\text{weightFlat}) \cdot (RonRn) \quad \text{(Expression 41)}$$

$$RonR\_ad = (RonR(dirAD)) \quad \text{(Expression 42)}$$

Furthermore, the blend processing is executed on (RonR_hv) and (RonR_ad) calculated through the above-mentioned expressions (Expression 41) and (Expression 42) while following the expression (Expression 43) below to calculate the final R pixel value (RonR).

$$RonR = (\text{weight}HV) \cdot (RonR\_hv) + (1-\text{weight}HV) RonR\_ad \quad \text{(Expression 43)}$$

In this manner, the calculation processing for the R pixel value (RonR) in a case where the R pixel position in the RGBW pattern is transformed (corrected) into the R pixel is performed.

These expressions 41 to 43 are expressions where G is changed into R in the above-mentioned expressions 21 to 23, that is, the expressions applied to the calculation processing for the R pixel value (RonG) in a case where the G pixel position in the RGBW pattern is transformed into the R pixel, and the processing is a similar processing except for changing R into R.

In the above-mentioned expression (Expression 41),
RonR(dirHV),
RonRn
they are interpolation parameters calculated by the previously described fourth pixel interpolation parameter calculation unit (RBonRBofHV) 207 and are the following parameters applied to the processing of transforming the R pixel on the vertical or horizontal edge into the R pixel.

$$RonR(H) = (mR/mW)(w\_h)$$

$$RonR(V) = (mR/mW)(w\_v)$$

$$RonRn = (mR/mW)(w\_n)$$

Also, in the above-mentioned expression (Expression 42),
RonR(dirAD)
this is the interpolation parameter calculated by the fifth pixel interpolation parameter calculation unit (RBonRBofAD) 208 and is the following parameter applied to the processing of transforming the R pixel on the diagonal direction edge into the R pixel.

$$RonR(A) = (mB/mW)(w\_a)$$

$$RonR(D) = (mB/mW)(w\_d)$$

The above-mentioned expression (Expression 43) is an expression for calculating the final R pixel value (RonR) by blending
the R pixel value (RonG_hv) relying on the vertical horizontal direction edge calculated through Expression 41 and
the R pixel value (RonG_ad) relying on the diagonal direction edge calculated through Expression 42
in accordance with the vertical horizontal direction edge direction weight (weightHV) calculated through step S12.
In the expression (Expression 43), in a case where the vertical horizontal direction edge is intense and the value of the vertical horizontal direction edge direction weight (weightHV) is large,
the weight of the R pixel value (RonR_hv) relying on the vertical horizontal direction edge calculated through Expression 41 is set to be large.
Also, in a case where the diagonal direction edge is intense and the value of the vertical horizontal direction edge direction weight (weightHV) is small,
the weight of the R pixel value (RonR_ad) relying on the diagonal direction edge calculated through Expression 42 is set to be large.
In this manner, the final R pixel value (RonR) is decided by changing the blend ratio in accordance with the edge direction of the transform target pixel.

Next, a calculation processing for the B pixel value (BonB) in the processing of transforming (correcting) the B pixel position in the RGBW pattern into the B pixel will be described.

The blend processing unit 211, first, obtains a vertical horizontal direction edge corresponding transform pixel value (BonB_hv) and a diagonal direction edge corresponding transform pixel value (BonB_ad) while following the expressions (Expression 51) and (Expression 52) below.

$$BonB\_hv = (1-\text{weightFlat}) \cdot (BonB(dirHV)) + (\text{weightFlat}) \cdot (BonBn) \quad \text{(Expression 51)}$$

$$BonB\_ad = (BonB(dirAD)) \quad \text{(Expression 52)}$$

Furthermore, the blend processing is executed on (BonB_hv) and (BonB_ad) calculated through the above-mentioned expressions (Expression 51) and (Expression 52) while following expression (Expression 53) below to calculate the final B pixel value (BonB).

$$BonB = (\text{weight}HV) \cdot (BonB\_hv) + (1-\text{weight}HV) BonB\_ad \quad \text{(Expression 53)}$$

In this manner, the calculation processing for the B pixel value (BonB) in a case where the B pixel position in the RGBW pattern is transformed (corrected) into the B pixel is performed.

These Expressions 51 to 53 are expressions in which R is changed into B in the above-mentioned Expression 41 to 43, that is, the expressions applied to the calculation processing for the R pixel value (RonR) in a case where the R pixel position in the RGBW pattern is transformed into the R pixel, and the processing is a similar processing except for except for changing R into B.

In the above-mentioned expression (Expression 51),
BonB(dirHV),
BonBn
they are interpolation parameters calculated by the previously described fourth pixel interpolation parameter calculation unit (RBonRBofHV) 207 and are the following parameters applied to the processing of transforming the B pixel on the vertical or horizontal edge into the B pixel.

$$BonB(H) = (mB/mW)(w\_h)$$

$$BonB(V) = (mB/mW)(w\_v)$$

$$BonBn = (mB/mW)(w\_n)$$

Also, in the above-mentioned expression (Expression 52),
BonB (dirAD)
this is the interpolation parameter calculated by the fifth pixel interpolation parameter calculation unit (RBonRBofAD) 208 is the following parameters applied to the processing transforming the B pixel on the diagonal direction edge into the B pixel.

$BonB(A)=(mB/mW)(w\_a)$ $BonB(D)=(mB/mW)(w\_d)$

The above-mentioned expression (Expression 53) is an expression for calculating the final B pixel value (BonB) by blending the B pixel value (BonG_hv) relying on the vertical horizontal direction edge calculated through Expression 51 and the B pixel value (BonG_ad) relying on the diagonal direction edge calculated through Expression 52 in accordance with the vertical horizontal direction edge direction weight (weightHV) calculated through step S12.

In the expression (Expression 53), in a case where the vertical horizontal direction edge is intense and the value of the vertical horizontal direction edge direction weight (weightHV) is large, the weight of the B pixel value (BonB_hv) relying on the vertical horizontal direction edge calculated through Expression 51 is set to be large.

Also, in a case where the diagonal direction edge is intense and the value of the vertical horizontal direction edge direction weight (weightHV) is small, the weight of the B pixel value (BonB_ad) relying on the diagonal direction edge calculated through Expression 52 is set to be large.

In this manner, the final B pixel value (BonB) is decided by changing the blend ratio in accordance with the edge direction of the transform target pixel.

As described above, the blend processing unit 211 inputs the pixel interpolation parameters generated by the first to fifth pixel interpolation parameter calculation units and further inputs the edge information detected by the edge detection unit 209 and the texture information detected by the texture detection unit 210 to calculate the final transform pixel value. That is, the following transform pixel values in the transform processing from the RGBW pattern to the RGB pattern are decided.

G pixel value when transforming W pixel position into G pixel (estimating G pixel value) (GonW)

R pixel value when transforming G pixel position into R pixel (estimating R pixel value) (RonG)

B pixel value when transforming G pixel position into B pixel (estimating B pixel value) (BonG)

R pixel value when transforming R pixel position into R pixel (correcting R pixel value) (RonR)

B pixel value when transforming B pixel position into B pixel (correcting B pixel value) (BonB)

These five transform and correction pixel values are decided.

The blend processing unit 211 decides the blend ratio of the pixel interpolation parameters generated by the first to fifth pixel interpolation parameter calculation units in accordance with the edge information corresponding to the transform target pixel, that is, the edge intensity and the edge direction to calculate the final pixel value. The calculation expressions for the respective pixel values will be collectively represented below.

$GonW=(1-\text{weightFlat})\cdot(GonW(dirHV))+(\text{weightFlat})\cdot(GonWn(dirHV))$ $RonG=(\text{weightHV})\cdot(RonG\_hv)+(1-\text{weightHV})RonG\_ad$ $BonG=(\text{weightHV})\cdot(BonG\_hv)+(1-\text{weightHV})BonG\_ad$ $RonR=(\text{weightHV})\cdot(RonR\_hv)+(1-\text{weightHV})RonR\_ad$ $BonB=(\text{weightHV})\cdot(BonB\_hv)+(1-\text{weightHV})BonB\_ad$

[4. Remosaic Processing Sequence Executed by the Data Transform Processing Unit of the Image Processing Apparatus]

Next, with reference to a flow chart illustrated in FIG. 35, a remosaic processing sequence executed by the data transform processing unit of the image processing apparatus will be described. The flow chart illustrated in FIG. 35 is a flow chart illustrating a whole sequence of the transform processing from the RGBW pattern to the RGB pattern which is executed in the image processing apparatus illustrated in FIG. 5, that is, the remosaic processing. This is the sequence of the entire processing described thus far. It should be noted that the flow illustrated in FIG. 35 can be executed while, for example, the control unit 140 of the image processing apparatus illustrated in FIG. 5 executes a program stored in the memory 130 and controls the respective processing units.

Respective steps in the flow chart illustrated in FIG. 35 will be described.

First, in step S101, by applying the W pixel included in the RGBW pattern, the edge direction is determined.

This processing is a processing executed by the edge detection unit 209 illustrated in FIG. 6. As previously described, the edge detection unit 209 utilizes the white (W) signal among the signals of the input RGBW pattern to determine the edge direction and the edge intensity.

The edge detection unit 209 calculates the edge information corresponding to the pixel (dirH, dirV, dirA, and dirD) through the edge detection processing to be output to the blend processing unit 211 and the plurality of pixel interpolation parameter calculation units.

Next, in step S102, the texture detection processing is performed by applying the W pixel included in the RGBW pattern.

This processing is a processing executed by the texture detection unit 210 illustrated in FIG. 6. As previously described, the texture detection unit 210 utilizes the white (W) signal among the signals of the input RGBW pattern to calculate the pixel corresponding texture information, to be specific, the flatness weight (weightFlat).

$\text{weightFlat}(x,y)=f_{flat}(W_{TX}(p))$ $f_{flat}(r)$ is, for example, a linearly approximated function illustrated in FIG. 14, and the flatness weight (weightFlat) with such a setting is calculated to be output to the blend processing unit 211.

r=0 to Th0→$f_{flat}(r)$=0 r=Th0 to Th1→$f_{flat}(r)$=0 to 1.0 (linear change)

r=larger than or equal to Th1→$f_{flat}(r)$=1

Next, in step S103, the noise removal on the W pixel at the center in the input pixel unit is executed.

This processing is a processing by the noise removal unit 201 illustrated in FIG. 6. As previously described, the noise removal unit 201 executes the noise removal on the W pixel located at the center in the input pixel unit.

As previously described with reference to FIG. 7, the noise removal unit 201 calculates the noise reduction pixel value $I_{NR}(p)$ while following, for example, the above-mentioned expression (Expression 1) in a case where the W pixel is set at the center in the input pixel unit (5×5 pixels) by applying the bilateral filter. The calculated noise reduction W pixel value ($I_{NR}(p)$) is output to the first pixel interpolation parameter calculation unit (GonW) 202 illustrated in FIG. 6.

Next, in step S104, interpolation parameters applied for transforming the W pixel in the RGBW pattern into the G pixel are calculated.

This processing is a processing by the first pixel interpolation parameter calculation unit (GonW) 202 illustrated in FIG. 6.

The first pixel interpolation parameter calculation unit (GonW) 202 calculates the following parameters as the interpolation parameters for transforming the W pixel in the RGBW pattern into the G pixel.

$$GonW(H) = (mG\_h/mW)w \quad (a)$$

$$GonW(V) = (mG\_v/mW)w \quad (b)$$

$$GonWn(H) = (mG\_h/mW)w \quad (c)$$

$$GonWn(V) = (mG\_v/mW)w \quad (d)$$

In the above-mentioned expression, mG: Low frequency component of the G signal in the input pixel unit mW: Low frequency component of the W signal in the input pixel unit w: Pixel value of the W pixel at the center in the input pixel unit are set.

It should be noted that with regard to mG, as previously described with reference to FIG. 16 and FIG. 17, in accordance with the adjacent position of the G pixel of the W pixel at the center in the input pixel unit and the edge direction, by applying filters with different factor settings, mG_v or mG_h is calculated as the low frequency component of the G signal.

In (a) to (d) described above, $$GonW(H) = (mG\_h/mW)w \quad (a)$$

$$GonW(V) = (mG\_v/mW)w \quad (b)$$

they are values to be calculated by applying the contrast emphasis.

$$GonWn(H) = (mG\_h/mW)w \quad (c)$$

$$GonWn(V) = (mG\_v/mW)w \quad (d)$$

They are values to be calculated without applying the contrast emphasis.

These parameters of (a) to (d) are the interpolation parameters applied to transform the W pixel in the RGBW pattern into the G pixel and output to the blend processing unit 211.

Next, in step S105, R and B at the W positions adjacent to the G pixel are interpolated from the R/W and B/W correlations.

This processing is a processing by the first temporary pixel setting unit (RBonWaroundG) 203 illustrated in FIG. 6.

The first temporary pixel setting unit (RBonWaroundG) 203 estimates, as previously described with reference to FIG. 23, the R pixel value and the B pixel value at the W pixel positions adjacent in the surrounding of the transform target pixel 502 located at the center in the input pixel unit 501 of the 5×5 pixels. The R pixel values ($R_{xy}' = R_{12}'$, $R_{21}'$, $R_{32}'$, and $R_{23}'$) at the W pixel positions adjacent in the surrounding of the transform target pixel 502 located at the center in the input pixel unit 501 of the 5×5 pixels illustrated in FIG. 23 can be estimated as follows.

$$R_{12}' = (mR'/mW)w_{12},$$

$$R_{21}' = (mR'/mW)w_{21},$$

$$R_{32}' = (mR'/mW)w_{32},$$

$$R_{23}' = (mR'/mW)w_{23},$$

It should be noted that $w_{12}$, $w_{21}$, $w_{32}$, and $w_{23}$ are the W pixel values at the W pixel positions adjacent in the surrounding of the transform target pixel 502 located at the center in the input pixel unit 501 of the 5×5 pixels illustrated in the drawing.

Similarly, the B pixel values ($B_{xy}' = B_{12}'$, $B_{21}'$, $B_{32}'$, and $B_{23}'$) at the W pixel positions adjacent in the surrounding of the transform target pixel 502 located at the center in the input pixel unit 501 of the 5×5 pixels illustrated in FIG. 23 can be estimated as follows.

$$B_{12}' = (mB'/mW)w_{12},$$

$$B_{21}' = (mB'/mW)w_{21},$$

$$B_{32}' = (mB'/mW)w_{32},$$

$$B_{23}' = (mB'/mW)w_{23},$$

It should be noted that $w_{12}$, $w_{21}$, $w_{32}$, and $w_{23}$ are the W pixel values at the W pixel positions adjacent in the surrounding of the transform target pixel 502 located at the center in the input pixel unit 501 of the 5×5 pixels illustrated in the drawing.

It should be noted that mW: Low frequency component of the W signal in the input pixel unit w: Pixel value of the W pixel at the center in the input pixel unit mR': Low frequency component of the R signal calculated by applying the temporary R pixel (R') set at the W pixel position adjacent to the RB pixels mB': Low frequency component of the B signal calculated by applying the temporary B pixel (B') set at the W pixel position adjacent to the RB pixels are set.

Next, in step S106, R and B at the G positions in the vertical horizontal direction are interpolated by utilizing the R/W and B/W correlations.

This processing is a processing by the second pixel interpolation parameter calculation unit (RBonGofHV) 204 illustrated in FIG. 6. The second pixel interpolation parameter calculation unit (RBonGofHV) 204 executes the calculation processing for the parameters applied to the processing of transforming the G pixel mainly on the vertical or horizontal edge into the R pixel or the B pixel.

The second pixel interpolation parameter calculation unit (RBonGofHV) 204 calculates the parameters applied to the processing of transforming the G pixel on the vertical or horizontal edge into the R pixel or the B pixel, that is, $$RonG(H) = (mR/mW)(w\_h)$$

$$RonG(V) = (mR/mW)(w\_v)$$

$$RonGn = (mR/mW)(w\_n)$$

$$BonG(H) = (mB/mW)(w\_h)$$

$$BonG(V) = (mB/mW)(w\_v)$$

$$BonGn = (mB/mW)(w\_n)$$

these parameters to be output to the blend processing unit 211.

It should be noted that mR: Low frequency component of the R signal in the input pixel unit mB: Low frequency component of the BR signal in the input pixel unit mW: Low frequency component of the W signal in the input pixel unit As previously described with reference to FIG. 25, (w_h), (w_v), and (w_n) are the W pixel values set at the center pixel position in the input pixel unit which is calculated by applying the filter selected in accordance with the edge direction.

Next, in step S107, R and B at the G positions in the diagonal direction are interpolated by utilizing the R/W and B/W correlations.

This processing is a processing by the third pixel interpolation parameter calculation unit (RBonGofAD) 205 illustrated in FIG. 6. The third pixel interpolation parameter calculation unit (RBonGofAD) 205 executes the calculation processing for the parameters applied to the processing of transforming the G pixel on the diagonal edge into the R pixel or the B pixel.

The third pixel interpolation parameter calculation unit (RBonGofAD) 205 calculates the parameters applied to the processing of transforming the G pixel on the diagonal edge into the R pixel or the B pixel, that is, $RonG(A)=(mR/mW)(w\_a)$ $RonG(D)=(mR/mW)(w\_d)$ $BonG(A)=(mB/mW)(w\_a)$ $BonG(D)=(mB/mW)(w\_d)$ these parameters to be output to the blend processing unit 211.

Next, in step S108, by utilizing the R/W and B/W correlations, R and B at the W positions adjacent to the R and B pixels are interpolated.

This processing is a processing by the second temporary pixel setting unit (RBonWaroundRB) 206 illustrated in FIG. 6.

Next, the second temporary pixel setting unit (RBonWaroundRB) 206 estimates, as previously described with reference to FIG. 28, the R pixel value and the B pixel value at the W pixel positions adjacent in the surrounding of the transform target pixel 602 located at the center in the input pixel unit 601 of the 5×5 pixels.

The R pixel values ($R_{xy}'=R_{12}'$, $R_{21}'$, $R_{32}'$, and $R_{23}'$) at the W pixel positions adjacent in the surrounding of the transform target pixel 602 located at the center in the input pixel unit 601 of the 5×5 pixels illustrated in FIG. 28 can be estimated as follows.

$R_{12}'=(mR'/mW)w_{12}$, $R_{21}'=(mR'/mW)w_{21}$, $R_{32}'=(mR'/mW)w_{32}$, $R_{23}'=(mR'/mW)w_{23}$,

It should be noted that $w_{12}$, $w_{21}$, $w_{32}$, and $w_{23}$ are the W pixel values at the W pixel positions adjacent in the surrounding of the transform target pixel 602 located at the center in the input pixel unit 601 of the 5×5 pixels illustrated in the drawing.

Similarly, the B pixel values ($B_{xy}'=B_{12}'$, $B_{21}'$, $B_{32}'$, and $B_{23}'$) at the W pixel positions adjacent in the surrounding of the transform target pixel 602 located at the center in the input pixel unit 601 of the 5×5 pixels illustrated in FIG. 28 can be estimated as follows.

$B_{12}'=(mB'/mW)w_{12}$, $B_{21}'=(mB'/mW)w_{21}$, $B_{32}'=(mB'/mW)w_{32}$, $B_{23}'=(mB'/mW)w_{23}$,

It should be noted that $w_{12}$, $w_{21}$, $w_{32}$, and $w_{23}$ are the W pixel values at the W pixel positions adjacent in the surrounding of the transform target pixel 602 located at the center in the input pixel unit 601 of the 5×5 pixels illustrated in the drawing.

Next, in step S109, by utilizing the R/W and B/W correlations, R and B at the R and B positions in the vertical horizontal direction are interpolated. This processing is a processing by the fourth pixel interpolation parameter calculation unit (RBonRBofHV) 207 illustrated in FIG. 6. The fourth pixel interpolation parameter calculation unit (RBonRBofHV) 207 executes the calculation processing for the following parameter as the parameters applied to the processing of transforming the R pixel on the vertical or horizontal edge into the corrected R pixel and the B pixel into the corrected B pixel.

$RonR(H)=(mR/mW)(w\_h)$ $RonR(V)=(mR/mW)(w\_v)$ $RonRn=(mR/mW)(w\_n)$ $BonB(H)=(mB/mW)(w\_h)$ $BonB(V)=(mB/mW)(w\_v)$ $BonBn=(mB/mW)(w\_n)$

These parameters are calculated to be output to the blend processing unit 211.

Next, in step S110, by utilizing the R/W and B/W correlations, R and B at the R and B positions in the diagonal direction are interpolated.

This processing is a processing by the fifth pixel interpolation parameter calculation unit (RBonRBofAD) 208 illustrated in FIG. 6. The fifth pixel interpolation parameter calculation unit (RBonRBofAD) 208 executes the calculation processing for the parameters applied to the processing of transforming the R pixel on the diagonal edge into the corrected R pixel and the B pixel into the corrected pixel.

The fifth pixel interpolation parameter calculation unit (RBonRBofAD) 208 calculates, in this manner, the parameters applied to the processing of transforming the R pixel on the diagonal edge into the corrected R pixel and the B pixel into the corrected pixel, that is, $RonR(A)=(mR/mW)(w\_a)$ $RonR(D)=(mR/mW)(w\_d)$ $BonB(A)=(mB/mW)(w\_a)$ $BonB(D)=(mB/mW)(w\_d)$ these parameters to be output to the blend processing unit 211.

Next, in step S111, the blend processing is executed while following the edge direction attribute to decide the RGB pixel value constituting the RGB pattern after the transform of the RGBW pattern. This processing is a processing by the blend processing unit 211 illustrated in FIG. 6.

The blend processing unit 211 inputs the pixel interpolation parameters generated by the first to fifth pixel interpolation parameter calculation units and further inputs the edge information detected by the edge detection unit 209 and the texture information detected by the texture detection unit 210 to calculate the final transform pixel value.

The blend processing unit 211 decides the blend ratio of the pixel interpolation parameters generated by the first to fifth pixel interpolation parameter calculation units in accordance with the edge information corresponding to the transform target pixel, that is, the edge intensity and the edge direction to calculate the final pixel value. This processing is a processing described with reference to the flows described in FIG. 32 and FIG. 33. The calculation expressions for the respective transform pixel values will be collectively represented below.

$$GonW=(1-\text{weightFlat})\cdot(GonW(dirHV))+(\text{weightFlat})\cdot(GonWn(dirHV))$$

$$RonG=(\text{weight}HV)\cdot(RonG\_hv)+(1-\text{weight}HV)RonG\_ad$$

$$BonG=(\text{weight}HV)\cdot(BonG\_hv)+(1-\text{weight}HV)BonG\_ad$$

$$RonR=(\text{weight}HV)\cdot(RonR\_hv)+(1-\text{weight}HV)RonR\_ad$$

$$BonB=(\text{weight}HV)\cdot(BonB\_hv)+(1-\text{weight}HV)BonB\_ad$$

In this manner, in the image processing apparatus according to the present invention, each of the interpolation parameter calculation unit executes the interpolation processing in which the applied pixel position is changed in accordance with the edge direction corresponding to the transform pixel and generates the parameter equivalent to the interpolation pixel value. Furthermore, the blend processing unit inputs the parameters generated by the respective interpolation parameter calculation units, the edge information, and the texture information, in accordance with the edge information and the texture information corresponding to the transform pixel, changes the blend ratio of the parameters calculated by the parameter calculation unit, executes the blend processing, and decides the transform pixel value. Through these processings, it is possible to generate the RGB pattern data in which the high quality color image with little false color can be generated.

In the above, with reference to the particular embodiments, the present invention has been described in detail. However, it is obvious that the skilled in the art can realize modifications and alterations of the embodiments in a range without departing from the gist of the present invention. That is, the present invention has been disclosed in a mode of exemplifications and should not be construed in a limited manner. To determine the gist of the present invention, the section of claims should be considered.

Also, the series of processings can be executed described in the specification can be executed by hardware or software, or a combined configuration of both. In a case where the processing is executed by the software, it is possible that a program recording the processing sequence is installed into a memory in a computer which is incorporated in dedicated-use hardware and executed or the program is installed in a general-use computer capable of executing various processings and executed. For example, the program can be previously recorded on a recording medium. In addition to an installment from the recording medium into the computer, the program can be received via a network such as a LAN (Local Area Network) or the internet and installed into a recording medium such as a built-in hard disc.

It should be noted that not only the various processings described in the specification are performed in a time-series manner while following the description but also may be executed in a parallel manner or individually in accordance with a processing performance of the apparatus that executes the processing or when requested. Also, a system in the present specification is a logical aggregate configuration of a plurality of apparatuses, and the apparatuses of the respective configurations are not limited to ones in a same casing.

INDUSTRIAL APPLICABILITY

As described above, according to the configuration of the embodiment of the present invention, it is possible to generate the RGB pattern data for generating the high quality color image with little false color by inputting the obtained data of the image pickup element (image sensor) including white (W: White), for example, having the RGBW-type color filter. To be specific, the edge detection unit analyzes the output signal of the image pickup element of the RGBW pattern to obtain the edge information corresponding to the respective pixels, and the texture detection unit generates the texture information. Furthermore, the parameter calculation unit executes the interpolation processing in which the applied pixel position is changed in accordance with the edge direction of the transform pixel to generate the parameters equivalent to the interpolation pixel values. In the blend processing unit, the parameters generated by the parameter calculation unit, the edge information, and the texture information are input, in accordance with the edge information and the texture information corresponding to the transform pixel, the blend ratio of the parameters calculated by the parameter calculation unit is changed, the blend processing is executed, and the transform pixel value is decided. Through these processings, it is possible to generate the RGB pattern data for generating the high quality color image with little false color.

REFERENCE SIGNS LIST 100 image pickup apparatus
105 optical lens
110 image pickup element (image sensor)
120 signal processing unit
130 memory
140 control unit
181 RGBW pattern
182 RGB pattern
183 color image
200 data transform processing unit
201 noise removal processing unit
202 first pixel interpolation parameter calculation unit (GonW)
203 first temporary pixel setting unit (RBonWaroundG)
204 second pixel interpolation parameter calculation unit (RBonGofHV)
205 third pixel interpolation parameter calculation unit (RBonGofAD)
206 second temporary pixel setting unit (RBonWaroundRB)

207 fourth pixel interpolation parameter calculation unit (RBonRBofHV)
208 fifth pixel interpolation parameter calculation unit (RBonRBofAD)
209 edge detection unit
210 texture detection unit
211 blend processing unit

The invention claimed is:

1. An image processing apparatus comprising:
a computer; and
a non-transitory computer readable storage medium coupled to the computer and storing a program that, when executed by the computer, causes the apparatus to:
perform a pixel transform by analyzing two-dimensional pixel array signals where pixels functioning as a main component of a luminance signal are arranged in a checkered manner and pixels of a plurality of colors functioning as color information components are arranged in a rest of a part;
generate edge information, wherein the generated edge information includes an edge direction and intensity information corresponding to respective pixels, and wherein generating the edge information includes analyzing the two-dimensional pixel array signals and analyzing RGBW pattern signals composed of RGB and white (W) pixels;
generate texture information;
calculate parameters applied to a pixel transform processing, wherein calculating the parameters applied to the pixel transform processing includes:
analyzing the two-dimensional pixel array signals for transforming an RGBW pattern into an RGB pattern;
generating parameters equivalent to interpolation pixel values calculated through an interpolation processing in which an applied pixel position is changed in accordance with the edge direction corresponding to the transform pixel; and
generating the parameters through the interpolation processing utilizing a correlation in a local area between W pixels and the other RGB pixels constituting the RGBW pattern; and
input the parameters applied to the pixel transform processing, the edge information, and the texture information, change a blend ratio of the parameters applies to the pixel transform processing in accordance with the edge information and the texture information corresponding to a transformation pixel, and execute a blend processing to decide a transform pixel value.

2. The image processing apparatus according to claim 1, wherein the main component of the luminance signal is green or white.

3. The image processing apparatus according to claim 1, wherein the generated texture information includes a texture ratio corresponding to respective pixels, and wherein generating the texture information includes analyzing the two-dimensional pixel array signals.

4. The image processing apparatus according to claim 1, wherein the calculated parameters are generated through the interpolation processing in which the pixel position applied to the interpolation processing is set to a pixel position along the edge direction.

5. The image processing apparatus according to claim 1, wherein the program, when executed by the computer, causes the apparatus to:
set a pixel value of one of the RGB pixels with respect to a W pixel position through the interpolation processing utilizing the correlation in the local area between W pixels constituting the RGBW pattern and the other RGB pixels,
wherein the calculated parameters are generated through the interpolation processing applying the temporary pixel setting data.

6. The image processing apparatus according to claim 1, wherein the program, when executed by the computer, causes the apparatus to:
generate a plurality of parameters equivalent to the interpolation pixel values calculated through the interpolation processing in which an applied pixel position is set at a pixel position along the edge direction in accordance with edge directions being four types of vertical, horizontal, diagonally up left, and diagonally up right edge directions, and
execute an intensity comparison among the four types of vertical, horizontal, diagonally up left, and diagonally up right edge directions and execute the blend processing in which the blend ratio of the plurality of parameters is changed in accordance with a comparison result.

7. An image processing apparatus comprising:
a computer; and
a non-transitory computer readable storage medium coupled to the computer and storing a program that, when executed by the computer, causes the apparatus to:
perform a pixel transform by analyzing two-dimensional pixel array signals where pixels functioning as a main component of a luminance signal are arranged in a checkered manner and pixels of a plurality of colors functioning as color information components are arranged in a rest of a part;
generate edge information;
generate texture information;
calculate parameters applied to a pixel transform processing; and
input the parameters applied to the pixel transform processing, the edge information, and the texture information, change a blend ratio of the parameters applied to the pixel transform processing in accordance with the edge information and the texture information corresponding to a transform pixel, and execute a blend processing to decide a transform pixel value, wherein the program, when executed by the computer, causes the apparatus to:
calculate an edge direction ratio (ratioFlat) of a vertical horizontal direction edge and a diagonal direction edge corresponding to the transform pixel;
calculate a vertical horizontal direction edge direction weight (weightHV) indicating that the vertical horizontal direction edge is more intense than the diagonal direction edge as the value is larger and the diagonal direction edge is more intense than the vertical horizontal direction edge as the value is smaller on the basis of the edge direction ratio (ratioFlat); and
execute the blend processing by:
increasing the blend ratio of the parameters calculated while the edge direction is set as the vertical or horizontal direction in a case where the vertical horizontal direction edge corresponding to the transform pixel is more intense than the diagonal direction edge; and increasing the blend ratio of the parameters calculated while the edge direction is set as the diagonal direction in a case where the vertical horizontal direction edge corresponding to the transform pixel is weaker than the diagonal direction edge.

8. An image processing apparatus comprising:
a computer; and
a non-transitory computer readable storage medium coupled to the computer and storing a program that, when executed by the computer, causes the apparatus to:
perform a pixel transform by analyzing two-dimensional pixel array signals where pixels functioning as a main component of a luminance signal are arranged in a checkered manner and pixels of a plurality of colors functioning as color information components are arranged in a rest of a part;
generate edge information;
generate texture information;
calculate parameters applied to a pixel transform processing; and
input the parameters applied to the pixel transform processing, the edge information, and the texture information, change a blend ratio of the parameters applied to the pixel transform processing in accordance with the edge information and the texture information corresponding to a transform pixel, and execute a blend processing to decide a transform pixel value, wherein the program, when executed by the computer, causes the apparatus to:
calculate a flatness weight (weightFlat) corresponding to the respective pixels which indicates a high value with regard to a pixel area with a small texture and a high flatness and indicates a low value with regard to a pixel area with a large texture and a low flatness as the texture information;
calculate a contrast emphasis processing applicable parameter in which a contrast emphasis processing is executed on the interpolation pixel value and a contrast emphasis processing non-applicable parameter in which the contrast emphasis processing is not executed on the interpolation pixel value; and
execute the blend processing by setting the blend ratio of the contrast emphasis processing non-applicable parameter to be large with regard to the pixel with the large flatness weight, and setting the blend ratio of the contrast emphasis processing applicable parameter to be large with regard to the pixel with the small flatness weight.

9. An image processing apparatus comprising:
a computer; and
a non-transitory computer readable storage medium coupled to the computer and storing a program that, when executed by the computer, causes the apparatus to:
perform a pixel transform by analyzing two-dimensional pixel array signals where pixels functioning as a main component of a luminance signal are arranged in a checkered manner and pixels of a plurality of colors functioning as color information components are arranged in a rest of a part;
generate edge information, wherein the generated edge information includes an edge direction and intensity information corresponding to respective pixels, and wherein generating the edge information includes analyzing the two-dimensional pixel array signals and analyzing RGBW pattern signals composed of RGB and white (W) pixels;
generate texture information;
calculate parameters applied to a pixel transform processing; and
input the parameters applied to the pixel transform processing, the edge information, and the texture information, change a blend ratio of the parameters applied to the pixel transformation processing in accordance with the edge information and the texture information corresponding to a transform pixel, and execute a blend processing to decide a transform pixel value, wherein the program, when executed by the computer, causes the apparatus to:
generate the edge information corresponding to the respective pixels through an analysis processing utilizing only the white (W) pixel of the RGBW pattern signals; and
generate the edge information including the edge direction and the intensity information corresponding to the respective pixels by calculating a signal value gradient of a W pixel in a vicinity of a processing target pixel.

10. An image processing method of executing an image signal processing in an image processing apparatus, the image processing method comprising:
an edge detection step of generating edge information;
a texture detection step of generating texture information, wherein the texture information indicates a texture ratio corresponding to respective pixels, and wherein generating the texture information includes analyzing only the white (W) pixel of the RGBW pattern signals;
a parameter calculation step of generating parameters; and
a blend processing step comprising inputting the generated parameters, the edge information, and the texture information, changing a blend ratio of the generated parameters in accordance with the edge information and the texture information corresponding to the transform pixel, and executing the blend processing to decide the transform pixel value by a blend processing unit.

11. An image processing method of executing an image signal processing in an image processing apparatus, the image processing method comprising:
an edge detection step of generating edge information, wherein the edge information includes an edge direction and intensity information corresponding to respective pixels, and wherein generating the edge information includes analyzing RGBW pattern signals composed of RGB pixels and white (W) pixels;
a texture detection step of generating texture information;
a parameter calculation step of generating parameters, wherein the generated parameters are equivalent to interpolation pixel values calculated through an interpolation processing in which an applied pixel position is changed in accordance with the edge direction corresponding to the transform pixel that calculates parameters for transforming an RGBW pattern into an RGB pattern, and
wherein generating the parameters includes utilizing a correlation in a local area between W pixels and the other RGB pixels constituting the RGBW pattern; and
a blend processing step comprising inputting the generated parameters, the edge information, and the texture information, changing a blend ratio of the generated parameters in accordance with the edge information and the texture information corresponding to the transform pixel, and executing the blend processing to decide the transform pixel value by a blend processing unit.

12. A non-transitory computer-readable storage medium storing instructions that, when executed by a processor, cause an image processing apparatus to execute an image processing method, the image processing method comprising:
- an edge detection step of generating edge information;
- a texture detection step of generating texture information, wherein the texture information indicates a texture ratio corresponding to respective pixels, and
- wherein generating the texture information includes analyzing only the white (W) pixel of the RGBW pattern signals;
- a parameter calculation step of generating parameters; and
- a blend processing step comprising inputting the generated parameters, the edge information, and the texture information, changing a blend ratio of the generated parameters in accordance with the edge information and the texture information corresponding to the transformation pixel, and executing the blend processing to decide the transform pixel value by a blend processing unit.

13. The non-transitory computer-readable storage medium according to claim 12,
- wherein the edge information includes an edge direction and intensity information corresponding to respective pixels, and
- wherein generating the edge information includes analyzing RGBW pattern signals composed of RGB pixels and white (W) pixels.

14. The non-transitory computer-readable storage medium according to claim 12,
- wherein the generated parameters are equivalent to interpolation pixel values calculated through an interpolation processing in which an applied pixel position is changed in accordance with the edge direction corresponding to the transform pixel that calculates parameters for transforming an RGBW pattern into an RGB pattern, and
- wherein generating the parameters includes utilizing a correlation in a local area between W pixels and the other RGB pixels constituting the RGBW pattern.

15. The non-transitory computer-readable storage medium according to claim 14, wherein the instructions, when executed by the computer, causes the apparatus to:
- set a pixel value of one of the RGB pixels with respect to a W pixel position through the interpolation processing utilizing the correlation in the local area between W pixels constituting the RGBW pattern and the other RGB pixels,
- wherein the generated parameters are generated through the interpolation processing applying the temporary pixel setting data.

* * * * *